(12) United States Patent
Li et al.

(10) Patent No.: US 11,262,537 B2
(45) Date of Patent: Mar. 1, 2022

(54) CAMERA LENS ASSEMBLY INCLUDING SIX LENSES EACH HAVING REFRACTIVE POWER

(71) Applicant: Zhejiang Sunny Optical Co., Ltd, Ningbo (CN)

(72) Inventors: Ming Li, Ningbo (CN); Lingbo He, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 715 days.

(21) Appl. No.: 16/067,081

(22) PCT Filed: Jun. 15, 2017

(86) PCT No.: PCT/CN2017/088356
§ 371 (c)(1),
(2) Date: Jun. 28, 2018

(87) PCT Pub. No.: WO2018/149064
PCT Pub. Date: Aug. 23, 2018

(65) Prior Publication Data
US 2021/0063694 A1 Mar. 4, 2021

(30) Foreign Application Priority Data

Feb. 17, 2017 (CN) .......................... 201710085722.5
Feb. 17, 2017 (CN) .......................... 201720143731.0

(51) Int. Cl.
*G02B 13/00* (2006.01)
*G02B 9/62* (2006.01)

(52) U.S. Cl.
CPC .......... *G02B 13/0045* (2013.01); *G02B 9/62* (2013.01)

(58) Field of Classification Search
CPC .............................. G02B 13/0045; G02B 9/62
See application file for complete search history.

(56) References Cited

U.S. PATENT DOCUMENTS

| 4,792,218 A | * | 12/1988 | Nakajima | G02B 13/16 359/649 |
|---|---|---|---|---|
| 2016/0018627 A1 | | 1/2016 | Lee | |
| 2016/0033743 A1 | | 2/2016 | Chen | |
| 2016/0062083 A1 | | 3/2016 | Hsueh et al. | |
| 2017/0363841 A1 | * | 12/2017 | Chen | G02B 9/62 |
| 2018/0164544 A1 | * | 6/2018 | Kwak | G02B 9/60 |

(Continued)

FOREIGN PATENT DOCUMENTS

| CN | 104133283 A | 11/2014 |
|---|---|---|
| CN | 105487206 A | 4/2016 |
| CN | 106168700 A | 11/2016 |

(Continued)

*Primary Examiner* — Wen Huang
(74) *Attorney, Agent, or Firm* — Hauptman Ham, LLP

(57) ABSTRACT

The present disclosure provides a camera lens assembly. The camera lens assembly includes a first lens, a second lens, a third lens, a fourth lens, a fifth lens and a sixth lens arranged in sequence from an object side to an image side along an optical axis. The first lens, the second lens and the fifth lens have positive refractive powers, and the third lens and the sixth lens have negative refractive powers. A total effective focal length f of the camera lens assembly and an entrance pupil diameter EPD of the camera lens assembly satisfy: f/EPD≤1.7.

16 Claims, 35 Drawing Sheets

(56) References Cited

U.S. PATENT DOCUMENTS

2020/0150395 A1* 5/2020 Huh .................. G02B 13/0045

FOREIGN PATENT DOCUMENTS

| CN | 106646832 A | | 5/2017 | |
| GN | 106338815 A | | 1/2017 | |
| JP | 2014044372 A | | 3/2014 | |
| KR | 101504035 B1 | * | 3/2015 | ......... G02B 13/0045 |
| TW | 201600879 A | | 1/2016 | |

* cited by examiner

CAMERA LENS ASSEMBLY INCLUDING SIX LENSES EACH HAVING REFRACTIVE POWER

RELATED APPLICATIONS

The present application is a National Phase of International Application Number PCT/CN2017/088356, filed Jun. 15, 2017, and claims the priority of China Application No. 201710085722.5, filed Feb. 17, 2017; and China Application No. 201720143731.0, filed Feb. 17, 2017.

TECHNICAL FIELD

The present disclosure relates to a camera lens assembly and a camera device equipped with the camera lens assembly.

BACKGROUND

As the science and technology develop, there is an increasing demand for high-pixel mobile phone lens assemblies on the mobile phone market. Since the thickness of the mobile phone is reduced, the total length of the lens assembly is limited, thereby increasing the difficulty in designing the mobile phone lens assembly. Currently, often used photosensitive elements in optical systems include a charge-coupled device (CCD) and a complementary metal-oxide semiconductor (CMOS). As the CCD and CMOS imaging sensors are having higher performances and smaller sizes, corresponding camera lens assemblies also need to satisfy requirements on the high image quality and the miniaturization.

To satisfy the miniaturization requirement, a typical configuration of an existing lens assembly has a F-number of 2.0 or above. As shown in Patent Application No. CN201310360753.9, the F-number as configured is 2.2, which reduces the size of the lens assembly while achieving a good optical performance. However, with the constant development of smart phones and other portable electronic products, higher requirements on imaging lens assemblies are brought forward, especially in situations such as lack of light (e.g., cloudy and rainy days, dusk, etc.) and hand trembling. Thus, the F-number of 2.2 or above has been unable to meet higher order imaging requirements.

SUMMARY

The present disclosure intends to provide a camera device suitable for portable electronic products and having a large ultra-thin aperture, a good image quality and a low sensitivity.

According to an aspect of the present disclosure, a camera lens assembly is provided. The camera lens assembly may include a first lens, a second lens, a third lens, a fourth lens, a fifth lens and a sixth lens arranged in sequence from an object side to an image side along an optical axis. The first lens, the second lens and the fifth lens may have positive refractive powers, and the third lens and the sixth lens may have negative refractive powers. A total effective focal length f of the camera lens assembly and an entrance pupil diameter EPD of the camera lens assembly may satisfy: f/EPD≤1.7, for example, f/EPD≤1.69.

In implementations of the present disclosure, an object-side surface of the first lens may be a convex surface.

In the implementations of the present disclosure, an object-side surface of the fifth lens may be an aspheric surface and may have at least one inflection point.

In the implementations of the present disclosure, an object-side surface and an image-side surface of the sixth lens may both be aspheric surfaces, and at least one of the object-side surface and the image-side surface may have at least one inflection point.

In the implementations of the present disclosure, a total track length TTL from the object-side surface of the first lens to an image plane and half of a diagonal length ImgH of an effective pixel area on the image plane may satisfy: TTL/ImgH≤1.7, for example, TTL/ImgH≤1.69.

In the implementations of the present disclosure, an effective focal length $f_3$ of the third lens and the total effective focal length f may satisfy: $-3.0<f_3/f\leq-1.5$, for example, $-2.66\leq f_3/f\leq-1.5$.

In the implementations of the present disclosure, an effective focal length $f_5$ of the fifth lens and the total effective focal length f may satisfy: $0<f/f_5<1.2$, for example, $0.46\leq f/f_5\leq 1.09$.

In the implementations of the present disclosure, an effective focal length $f_6$ of the sixth lens and the total effective focal length f may satisfy: $-1.5<f/f_6<-0.4$, for example, $-1.42\leq f/f_6\leq-0.45$.

In the implementations of the present disclosure, an effective focal length $f_1$ of the first lens and the total effective focal length f may satisfy: $f/f_1\leq 0.7$, for example, $f/f_1\leq 0.66$.

In the implementations of the present disclosure, an effective focal length $f_2$ of the second lens and the effective focal length $f_5$ of the fifth lens may satisfy: $0<f_2/f_5<1.5$, for example, $0.20\leq f_2/f_5\leq 1.37$.

In the implementations of the present disclosure, a center thickness $CT_1$ of the first lens and a center thickness $CT_2$ of the second lens may satisfy: $0.5<CT_1/CT_2<1.5$, for example, $0.69\leq CT_1/CT_2\leq 1.42$.

In the implementations of the present disclosure, a center thickness $CT_4$ of the fourth lens and a center thickness $CT_6$ of the sixth lens may satisfy: $0.5<CT_4/CT_6<1.5$, for example, $0.54\leq CT_4/CT_6\leq 1.27$.

In the implementations of the present disclosure, a center thickness $CT_5$ of the fifth lens and the center thickness $CT_6$ of the sixth lens may satisfy: $CT_6/CT_5\leq 1$, for example, $CT_6/CT_5\leq 0.98$.

In the implementations of the present disclosure, a radius of curvature $R_1$ of the object-side surface of the first lens and a radius of curvature $R_2$ of an image-side surface of the first lens may satisfy: $R_1/R_2\leq 1$, for example, $R_1/R_2\leq 0.90$.

In the implementations of the present disclosure, a radius of curvature $R_3$ of an object-side surface of the second lens and a radius of curvature $R_6$ of an image-side surface of the third lens may satisfy: $0.5<R_3/R_6<1.5$, for example, $0.67\leq R_3/R_6\leq 1.11$.

In the implementations of the present disclosure, a radius of curvature $R_{11}$ of the object-side surface of the sixth lens and a radius of curvature $R_{12}$ of the image-side surface of the sixth lens may satisfy: $(R_{11}-R_{12})/(R_{11}+R_{12})<1$, for example, $(R_{11}-R_{12})/(R_{11}+R_{12})\leq 0.59$.

According to another aspect of the present disclosure, a camera lens assembly is provided. The camera lens assembly may include a first lens, a second lens, a third lens, a fourth lens, a fifth lens and at least one subsequent lens arranged in sequence from an object side to an image side along an optical axis. The first lens, the second lens and the fifth lens may have positive refractive powers, and the third lens may have a negative refractive power. An effective focal length $f_5$ of the fifth lens and a total effective focal length f of the camera lens assembly may satisfy: $0<f/f_5<1.2$, for example, $0.46 \leq f/f_5 \leq 1.09$.

In implementations of the present disclosure, an object-side surface of the first lens may be a convex surface.

In the implementations of the present disclosure, an object-side surface of the fifth lens may be an aspheric surface and may have at least one inflection point.

In the implementations of the present disclosure, a total track length TTL from the object-side surface of the first lens to an image plane and half of a diagonal length ImgH of an effective pixel area on the image plane may satisfy: TTL/ImgH≤1.7, for example, TTL/ImgH≤1.69.

In the implementations of the present disclosure, an effective focal length $f_3$ of the third lens and the total effective focal length f may satisfy: $-3.0<f_3/f \leq -1.5$, for example, $-2.66 \leq f_3/f \leq -1.5$.

In the implementations of the present disclosure, an effective focal length $f_1$ of the first lens and the total effective focal length f may satisfy: $f/f_1 \leq 0.7$, for example, $f/f_1 \leq 0.66$.

In the implementations of the present disclosure, an effective focal length $f_2$ of the second lens and the effective focal length $f_5$ of the fifth lens may satisfy: $0<f_2/f_5<1.5$, for example, $0.20 f_2/f_5 \leq 1.37$.

In the implementations of the present disclosure, a center thickness $CT_1$ of the first lens and a center thickness $CT_2$ of the second lens may satisfy: $0.5<CT_1/CT_2<1.5$, for example, $0.69 \leq CT_1/CT_2 \leq 1.42$.

In the implementations of the present disclosure, a radius of curvature $R_1$ of the object-side surface of the first lens and a radius of curvature $R_2$ of an image-side surface of the first lens may satisfy: $R_1/R_2 \leq 1$, for example, $R_1/R_2 \leq 0.90$.

In the implementations of the present disclosure, a radius of curvature $R_3$ of an object-side surface of the second lens and a radius of curvature $R_6$ of an image-side surface of the third lens may satisfy: $0.5<R_3/R_6<1.5$, for example, $0.67 \leq R_3/R_6 \leq 1.11$.

In the implementations of the present disclosure, the at least one subsequent lens may include a sixth lens, and the sixth lens may have a negative refractive power.

In the implementations of the present disclosure, an object-side surface and an image-side surface of the sixth lens may both be aspheric surfaces, and at least one of the object-side surface and the image-side surface may have at least one inflection point.

In the implementations of the present disclosure, an effective focal length $f_6$ of the sixth lens and the total effective focal length f may satisfy: $-1.5<f/f_6<-0.4$, for example, $-1.42 \leq f/f_6 \leq -0.45$.

In the implementations of the present disclosure, a center thickness $CT_4$ of the fourth lens and a center thickness $CT_6$ of the sixth lens may satisfy: $0.5<CT_4/CT_6<1.5$, for example, $0.54 \leq CT_4/CT_6 \leq 1.27$.

In the implementations of the present disclosure, a center thickness $CT_5$ of the fifth lens and the center thickness $CT_6$ of the sixth lens may satisfy: $CT_6/CT_5 \leq 1$, for example, $CT_6/CT_5 \leq 0.98$.

In the implementations of the present disclosure, a radius of curvature $R_{11}$ of the object-side surface of the sixth lens and a radius of curvature $R_{12}$ of the image-side surface of the sixth lens may satisfy: $(R_{11}-R_{12})/(R_{11}+R_{12})<1$, for example, $(R_{11}-R_{12})/(R_{11}+R_{12}) \leq 0.59$.

According to another aspect of the present disclosure, a camera lens assembly is further provided. The camera lens assembly may include a first lens, a second lens, a third lens, a fourth lens, a fifth lens and a sixth lens arranged in sequence from an object side to an image side along an optical axis. The first lens, the second lens and the fifth lens may have positive refractive powers, and the third lens and the sixth lens may have negative refractive powers. An effective focal length $f_6$ of the sixth lens and a total effective focal length f of the camera lens assembly may satisfy: $-1.5<f/f_6<-0.4$, for example, $-1.42 \leq f/f_6 \leq -0.45$.

In implementations of the present disclosure, an object-side surface of the first lens may be a convex surface.

In the implementations of the present disclosure, an object-side surface of the fifth lens may be an aspheric surface and may have at least one inflection point.

In the implementations of the present disclosure, an object-side surface and an image-side surface of the sixth lens may both be aspheric surfaces, and at least one of the object-side surface and the image-side surface may have at least one inflection point.

In the implementations of the present disclosure, a total track length TTL from the object-side surface of the first lens to an image plane and half of a diagonal length ImgH of an effective pixel area on the image plane may satisfy: TTL/ImgH≤1.7, for example, TTL/ImgH≤1.69.

In the implementations of the present disclosure, an effective focal length $f_3$ of the third lens and the total effective focal length f may satisfy: $-3.0<f_3/f \leq -1.5$, for example, $-2.66 \leq f_3/f \leq -1.5$.

In the implementations of the present disclosure, the effective focal length $f_6$ of the sixth lens and the total effective focal length f may satisfy: $-1.5<f/f_6<-0.4$, for example, $-1.42 \leq f/f_6 \leq -0.45$.

In the implementations of the present disclosure, an effective focal length $f_1$ of the first lens and the total effective focal length f may satisfy: $f/f_1 0.7$, for example, $f/f_1 \leq 0.66$.

In the implementations of the present disclosure, an effective focal length $f_2$ of the second lens and an effective focal length $f_5$ of the fifth lens may satisfy: $0<f_2/f_5<1.5$, for example, $0.20 f_2/f_5 \leq 1.37$.

In the implementations of the present disclosure, a center thickness $CT_1$ of the first lens and a center thickness $CT_2$ of the second lens may satisfy: $0.5<CT_1/CT_2<1.5$, for example, $0.69 \leq CT_1/CT_2 \leq 1.42$.

In the implementations of the present disclosure, a center thickness $CT_4$ of the fourth lens and a center thickness $CT_6$ of the sixth lens may satisfy: $0.5<CT_4/CT_6<1.5$, for example, $0.54 \leq CT_4/CT_6 \leq 1.27$.

In the implementations of the present disclosure, a center thickness $CT_5$ of the fifth lens and the center thickness $CT_6$ of the sixth lens may satisfy: $CT_6/CT_5 \leq 1$, for example, $CT_6/CT_5 \leq 0.98$.

In the implementations of the present disclosure, a radius of curvature $R_1$ of the object-side surface of the first lens and a radius of curvature $R_2$ of an image-side surface of the first lens may satisfy: $R_1/R_2 \leq 1$, for example, $R_1/R_2 \leq 0.90$.

In the implementations of the present disclosure, a radius of curvature $R_3$ of an object-side surface of the second lens and a radius of curvature $R_6$ of an image-side surface of the third lens may satisfy: $0.5<R_3/R_6<1.5$, for example, $0.67 \leq R_3/R_6 \leq 1.11$.

In the implementations of the present disclosure, the radius of curvature $R_3$ of the object-side surface of the second lens and the radius of curvature $R_6$ of the image-side surface of the third lens may satisfy: $0.5<R_3/R_6<1.5$, for example, $0.67 \leq R_3/R_6 \leq 1.11$.

In the implementations of the present disclosure, a radius of curvature $R_{11}$ of the object-side surface of the sixth lens and a radius of curvature $R_{12}$ of the image-side surface of the sixth lens may satisfy: $(R_{11}-R_{12})/(R_{11}+R_{12})<1$, for example, $(R_{11}-R_{12})/(R_{11}+R_{12}) \leq 0.59$.

According to another aspect of the present disclosure, a camera lens assembly is further provided. The camera lens assembly may include a first lens, a second lens, a third lens, a fourth lens, a fifth lens and at least one subsequent lens arranged in sequence from an object side to an image side along an optical axis. The first lens, the second lens and the fifth lens may have positive refractive powers, and the third lens may have a negative refractive power. An effective focal length $f_2$ of the second lens and an effective focal length $f_5$ of the fifth lens may satisfy: $0<f_2/f_5<1.5$, for example, $0.20f_2/f_5 \leq 1.37$.

In implementations of the present disclosure, an object-side surface of the first lens may be a convex surface.

In the implementations of the present disclosure, an object-side surface of the fifth lens may be an aspheric surface and may have at least one inflection point.

In the implementations of the present disclosure, a total track length TTL from the object-side surface of the first lens to an image plane and half of a diagonal length ImgH of an effective pixel area on the image plane may satisfy: TTL/ImgH$\leq$1.7, for example, TTL/ImgH$\leq$1.69.

In the implementations of the present disclosure, an effective focal length $f_3$ of the third lens and a total effective focal length f may satisfy: $-3.0<f_3\leq-1.5$, for example, $-2.66\leq f_3/f \leq -1.5$.

In the implementations of the present disclosure, an effective focal length $f_1$ of the first lens and the total effective focal length f may satisfy: $f/f_1 \leq 0.7$, for example, $f/f_1 \leq 0.66$.

In the implementations of the present disclosure, a center thickness $CT_1$ of the first lens and a center thickness $CT_2$ of the second lens may satisfy: $0.5<CT_1/CT_2<1.5$, for example, $0.69 \leq CT_1/CT_2 \leq 1.42$.

In the implementations of the present disclosure, a radius of curvature $R_1$ of the object-side surface of the first lens and a radius of curvature $R_2$ of an image-side surface of the first lens may satisfy: $R_1/R_2 \leq 1$, for example, $R_1/R_2 \leq 0.90$.

In the implementations of the present disclosure, a radius of curvature $R_3$ of an object-side surface of the second lens and a radius of curvature $R_6$ of an image-side surface of the third lens may satisfy: $0.5<R_3/R_6<1.5$, for example, $0.67 \leq R_3/R_6 \leq 1.11$.

In the implementations of the present disclosure, the at least one subsequent lens may include a sixth lens, and the sixth lens may have a negative refractive power.

In the implementations of the present disclosure, an object-side surface and an image-side surface of the sixth lens may both be aspheric surfaces, and at least one of the object-side surface and the image-side surface may have at least one inflection point.

In the implementations of the present disclosure, a center thickness $CT_4$ of the fourth lens and a center thickness $CT_6$ of the sixth lens may satisfy: $0.5<CT_4/CT_6<1.5$, for example, $0.54 \leq CT_4/CT_6 \leq 1.27$.

In the implementations of the present disclosure, a center thickness $CT_5$ of the fifth lens and the center thickness $CT_6$ of the sixth lens may satisfy: $CT_6/CT_5 \leq 1$, for example, $CT_6/CT_5 \leq 0.98$.

In the implementations of the present disclosure, a radius of curvature $R_{11}$ of the object-side surface of the sixth lens and a radius of curvature $R_{12}$ of the image-side surface of the sixth lens may satisfy: $(R_{11}-R_{12})/(R_{11}+R_{12})<1$, for example, $(R_{11}-R_{12})/(R_{11}+R_{12}) \leq 0.59$.

According to another aspect of the present disclosure, a camera device that may be equipped with the above camera lens assembly is further provided.

BRIEF DESCRIPTION OF THE DRAWINGS

The above and other advantages of the implementations of the present disclosure will become apparent through the detailed description made with reference to the following accompanying drawings, which are intended to illustrate exemplary implementations of the present disclosure rather than limit the exemplary implementations. In the accompanying drawings.

DETAILED DESCRIPTION OF EMBODIMENTS

Figure 1:
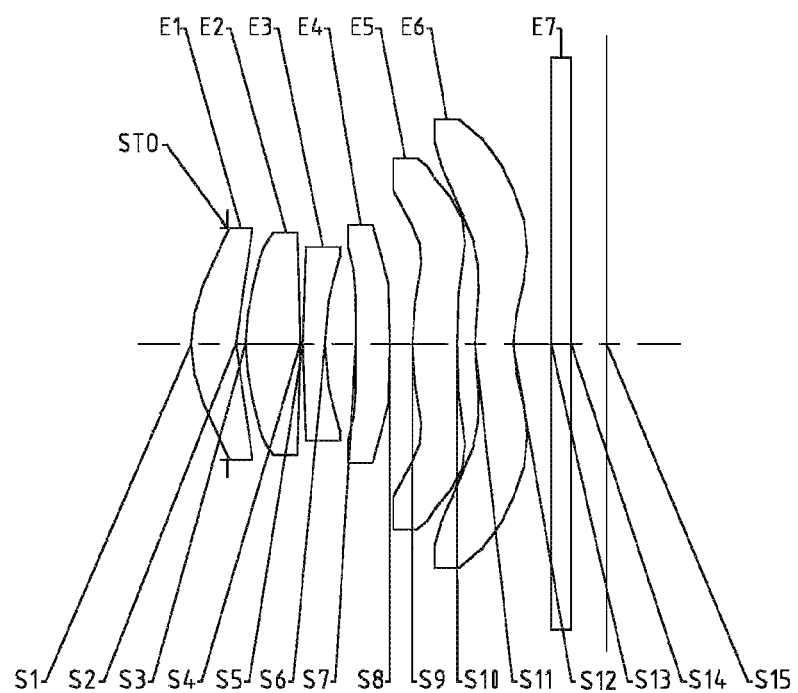
FIG. 1 is a schematic structural diagram illustrating a camera lens assembly according to Embodiment 1 of the present disclosure.

To better understand the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals refer to the same elements. The expression "and/or" includes any and all combinations of one or more of the associated listed items.

It should be noted that in the specification, the expressions, such as "first," "second" and "third" are only used to distinguish one feature from another, rather than represent any limitations to the feature. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. However, it should be understood that the size of each component may be properly adjusted within a certain range and is not limited by the accompanying drawings. Specifically, shapes of spherical surfaces or aspheric surfaces shown in the accompanying drawings are shown byway of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near an optical axis. The first lens is a lens closest to an object and the sixth lens is a lens closest to a photosensitive element. In this text, the surface closest to the object in each lens is referred to as the object-side surface, and the surface closest to the image plane in each lens is referred to as the image-side surface.

It should be further understood that the terms "comprising," "including," "having" and variants thereof, when used in this specification, specify the presence of stated features, entireties, steps, operations, elements and/or components, but do not exclude the presence or addition of one or more other features, entireties, steps, operations, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

The features, principles and other aspects of the present disclosure are described in detail below.

The present disclosure provides a camera lens assembly. The camera lens assembly according to exemplary implementations of the present disclosure may include a first lens, a second lens, a third lens, a fourth lens, a fifth lens and a sixth lens arranged in sequence from an object side to an image side along an optical axis. The camera lens assembly may have a total effective focal length f and an entrance pupil diameter EPD.

In the exemplary implementations, the first lens, the second lens and the fifth lens may have positive refractive powers, and the third lens and the sixth lens may have negative refractive powers. The total effective focal length f of the camera lens assembly and the entrance pupil diameter EPD of the camera lens assembly may satisfy: f/EPD≤1.7, and more specifically, satisfy: f/EPD≤1.69. By reasonably selecting the focal length of each lens and properly adjusting the total effective focal length and the entrance pupil diameter of the camera lens assembly, the camera lens assembly can be thinned as much as possible, and simultaneously having a large aperture and a low sensitivity, and a camera system can also be miniaturized as much as possible.

In the exemplary implementations, an object-side surface of the first lens may be a convex surface.

In the exemplary implementations, an object-side surface of the fifth lens may be an aspheric surface and may have at least one inflection point.

In the exemplary implementations, an object-side surface and an image-side surface of the sixth lens may both be aspheric surfaces, and at least one of the object-side surface and the image-side surface may have at least one inflection point.

In the exemplary implementations, a total track length TTL from the object-side surface of the first lens to an image plane and half of a diagonal length ImgH of an effective pixel area on the image plane may satisfy: TTL/ImgH≤1.7, and more specifically, satisfy: TTL/ImgH≤1.69. In the process of increasing an amount of light admitted, the camera lens assembly designed in this way makes the camera system have a large-aperture advantage, enhances an imaging effect in a dark environment, and simultaneously reduces aberrations of an edge field-of-view.

In the exemplary implementations, an effective focal length $f_3$ of the third lens and the total effective focal length f may satisfy: $-3.0<f_3/f\leq-1.5$, and more specifically, satisfy: $-2.66\leq f_3/f\leq-1.5$. The camera lens assembly having this configuration can reasonably distribute the refractive power of the third lens to reduce a tolerance sensitivity and maintain the miniaturization of the camera system.

In the exemplary implementations, an effective focal length $f_5$ of the fifth lens and the total effective focal length f may satisfy: $0<f/f_5<1.2$, and more specifically, satisfy: $0.46\leq f/f_5\leq1.09$, which is helpful to shorten the total length of the camera system, reduce the sensitivity of the camera system, and take into account both a high image quality and a good technology at the same time.

In the exemplary implementations, an effective focal length $f_6$ of the sixth lens and the total effective focal length f may satisfy: $-1.5<f/f_6<-0.4$, and more specifically, satisfy: $-1.42\leq f/f_6\leq-0.45$, which helps to correct chromatic aberrations of the system. In the camera lens assembly, if the ratio of $f/f_6$ is too large, it is not conductive to correcting the chromatic aberrations, and if the ratio is too small, it results in a poor technology for the fifth lens. If $-1.5<f/f6<-0.4$ is satisfied, the camera lens assembly can take into account both the image quality and the technology.

In the exemplary implementations, an effective focal length $f_1$ of the first lens and the total effective focal length f may satisfy: $f/f_1\leq0.7$, and more specifically, satisfy: $f/f_1\leq0.66$. This allocation of the effective focal length of the first lens and the total effective focal length is conductive to the assembling, which may disperse refractive powers of chief rays of an external field-of-view and can simultaneously correct spherical aberrations.

In the exemplary implementations, an effective focal length $f_2$ of the second lens and the effective focal length $f_5$ of the fifth lens may satisfy: $0<f_2/f_5<1.5$, and more specifically, satisfy: $0.20\leq f_2/f_5\leq1.37$. By properly distributing the refractive powers of the second lens and the fifth lens, it may effectively reduce the aberrations of the entire camera system, and reduce the sensitivity of the camera system.

In the exemplary implementations, a center thickness $CT_1$ of the first lens and a center thickness $CT_2$ of the second lens may satisfy: $0.5<CT_1/CT_2<1.5$, and more specifically, satisfy: $0.69\leq CT_1/CT_2\leq1.42$. This configuration of the first lens and the second lens can compensate for a correction effect of high-order aberrations of the first lens with the second lens, which is helpful to ensure the lens molding technology and the stability of the assembly.

In the exemplary implementations, a center thickness $CT_4$ of the fourth lens and a center thickness $CT_6$ of the sixth lens may satisfy: $0.5<CT_4/CT_6<1.5$, and more specifically, satisfy: $0.54\leq CT_4/CT_6\leq1.27$. Moreover, a center thickness $CT_5$ of the fifth lens and the center thickness $CT_6$ of the sixth lens may satisfy: $CT_6/CT_5\leq1$, and more specifically, satisfy: $CT_6/CT_5\leq0.98$. This configuration of the fourth lens, the fifth lens and the sixth lens is conductive to uniformly distributing the sizes of the lenses, ensuring the assembly stability, reducing the aberrations of the entire camera system, and shortening the total length of the camera system.

In the exemplary implementations, a radius of curvature $R_1$ of the object-side surface of the first lens and a radius of curvature $R_2$ of an image-side surface of the first lens may satisfy: $R_1/R_2\leq1$, and more specifically, satisfy: $R_1/R_2\leq0.90$, which is helpful to reduce the spherical aberrations and the generation of an astigmatism.

In the exemplary implementations, a radius of curvature $R_3$ of an object-side surface of the second lens and a radius of curvature $R_6$ of an image-side surface of the third lens may satisfy: $0.5<R_3/R_6<1.5$, and more specifically, satisfy: $0.67\leq R_3/R_6\leq1.11$. The cooperation between the second lens and the third lens may correct the chromatic aberrations of the system. However, when the deviations of the radii of curvature of the second lens and the third lens are too large, it is not conducive to the correction on the chromatic aberrations. When the radii of curvature are too close, it is not conducive to the correction on monochromatic aberrations. When the radius of curvature $R_3$ of the object-side surface of the second lens and the radius of curvature $R_6$ of the image-side surface of the third lens satisfy: $0.5<R_3/R_6<1.5$, the balance between the various aberrations can be achieved.

In the exemplary implementations, a radius of curvature $R_{11}$ of the object-side surface of the sixth lens and a radius of curvature $R_{12}$ of the image-side surface of the sixth lens may satisfy: $(R_{11}-R_{12})/(R_{11}+R_{12})<1$, and more specifically, satisfy: $(R_{11}-R_{12})/(R_{11}+R_{12})\leq 0.59$, which is helpful to correct an overall aberration of the camera system.

The present disclosure further provides another camera lens assembly. The camera lens assembly may include a first lens, a second lens, a third lens, a fourth lens, a fifth lens and at least one subsequent lens arranged in sequence from an object side to an image side along an optical axis. The first lens, the second lens and the fifth lens may have positive refractive powers, and the third lens may have a negative refractive power. An effective focal length $f_5$ of the fifth lens and a total effective focal length f of the camera lens assembly may satisfy: $0<f/f_5<1.2$, and more specifically, satisfy: $0.46\leq f/f_5\leq 1.09$, which is helpful to shorten the total length of a camera system, reduce the sensitivity of the camera system, and take into account both a high image quality and a good technology at the same time.

In another exemplary implementation, an object-side surface of the first lens may be a convex surface.

In another exemplary implementation, an object-side surface of the fifth lens may be an aspheric surface and may have at least one inflection point.

In another exemplary implementation, a total track length TTL from the object-side surface of the first lens to an image plane and half of a diagonal length ImgH of an effective pixel area on the image plane may satisfy: TTL/ImgH≤1.7, and more specifically, satisfy: TTL/ImgH≤1.69. In the process of increasing an amount of light admitted, the camera lens assembly having the configuration makes the camera system have a large-aperture advantage, enhances an imaging effect in a dark environment, and simultaneously reduces aberrations of an edge field-of-view.

In another exemplary implementation, an effective focal length $f_3$ of the third lens and the total effective focal length f may satisfy: $-3.0<f_3/f\leq -1.5$, and more specifically, satisfy: $-2.66\leq f_3/f\leq -1.5$. The camera lens assembly having this configuration can reasonably distribute the refractive power of the third lens to reduce a tolerance sensitivity and maintain the miniaturization of the camera system.

In another exemplary implementation, an effective focal length $f_1$ of the first lens and the total effective focal length f may satisfy: $f/f_1\leq 0.7$, and more specifically, satisfy: $f/f_1\leq 0.66$. This allocation of the effective focal length of the first lens and the total effective focal length is conductive to the assembling, which may disperse refractive powers of chief rays of an external field-of-view and can simultaneously correct spherical aberrations.

In another exemplary implementation, an effective focal length $f_2$ of the second lens and the effective focal length $f_5$ of the fifth lens may satisfy: $0<f_2/f_5<1$, and more specifically, satisfy: $0.20\leq f_2/f_5\leq 1.37$. By properly distributing the refractive powers of the second lens and the fifth lens, it may effectively reduce the aberrations of the entire camera system, and reduce the sensitivity of the camera system.

In another exemplary implementation, a center thickness $CT_1$ of the first lens and a center thickness $CT_2$ of the second lens may satisfy: $0.5<CT_1/CT_2<1.5$, and more specifically, satisfy: $0.69\leq CT_1/CT_2\leq 1.42$. This configuration of the first lens and the second lens can compensate for a correction effect of high-order aberrations of the first lens with the second lens, which is helpful to ensure the lens molding technology and the stability of the assembly.

In another exemplary implementation, a radius of curvature $R_1$ of the object-side surface of the first lens and a radius of curvature $R_2$ of an image-side surface of the first lens may satisfy: $R_1/R_2\leq 1$, and more specifically, satisfy: $R_1/R_2\leq 0.90$, which is helpful to reduce the spherical aberrations and the generation of an astigmatism.

In another exemplary implementation, a radius of curvature $R_3$ of an object-side surface of the second lens and a radius of curvature $R_6$ of an image-side surface of the third lens may satisfy: $0.5<R_3/R_6<1.5$, and more specifically, satisfy: $0.67\leq R_3/R_6\leq 1.11$. The cooperation between the second lens and the third lens may correct the chromatic aberrations of the system. However, when the deviations of the radii of curvature of the second lens and the third lens are too large, it is not conducive to the correction on the chromatic aberrations. When the radii of curvature are too close, it is not conducive to the correction on monochromatic aberrations. When the radius of curvature $R_3$ of the object-side surface of the second lens and the radius of curvature $R_6$ of the image-side surface of the third lens satisfy: $0.5<R_3/R_6<1.5$, the balance between the various aberrations can be achieved.

In another exemplary implementation, the at least one subsequent lens may include a sixth lens, and the sixth lens may have a negative refractive power.

In another exemplary implementation, an object-side surface and an image-side surface of the sixth lens may both be aspheric surfaces, and at least one of the object-side surface and the image-side surface may have at least one inflection point.

In another exemplary implementation, an effective focal length $f_6$ of the sixth lens and the total effective focal length f may satisfy: $-1.5<f/f_6<-0.4$, and more specifically, satisfy: $-1.42\leq f/f_6\leq -0.45$. In the camera lens assembly, if the ratio of $f/f_6$ is too large, it is not conductive to correcting the chromatic aberrations, and if the ratio is too small, it results in a poor technology for the fifth lens. If $-1.5<f/f6<-0.4$ is satisfied, the camera lens assembly can take into account both the image quality and the technology.

In another exemplary implementation, a center thickness $CT_4$ of the fourth lens and a center thickness $CT_6$ of the sixth lens may satisfy: $0.5<CT_4/CT_6<1.5$, and more specifically, satisfy: $0.54\leq CT_4/CT_6\leq 1.27$. A center thickness $CT_5$ of the fifth lens and the center thickness $CT_6$ of the sixth lens may satisfy: $CT_6/CT_5\leq 1$, and more specifically, satisfy: $CT_6/CT_5\leq 0.98$. This configuration of the fourth lens, the fifth lens and the sixth lens is conductive to uniformly distributing the sizes of the lenses, ensuring the assembly stability, reducing the aberrations of the entire camera system, and shortening the total length of the camera system.

In another exemplary implementation, a radius of curvature $R_{11}$ of the object-side surface of the sixth lens and a radius of curvature $R_{12}$ of the image-side surface of the sixth lens may satisfy: $(R_{11}-R_{12})/(R_{11}+R_{12})<1$, and more specifically, satisfy: $(R_{11}-R_{12})/(R_{11}+R_{12})\leq 0.59$, which is helpful to correct an overall aberration of the camera system.

The present disclosure further provides another camera lens assembly. The camera lens assembly may include a first lens, a second lens, a third lens, a fourth lens, a fifth lens and a sixth lens arranged in sequence from an object side to an image side along an optical axis. The first lens, the second lens and the fifth lens may have positive refractive powers, and the third lens and the sixth lens may have negative refractive powers. An effective focal length $f_6$ of the sixth lens and a total effective focal length f of the camera lens assembly may satisfy: $-1.5<f/f_6<-0.4$, and more specifically, satisfy: $-1.42 \leq f/f_6 \leq -0.45$. In the camera lens assembly, if the ratio of $f/f_6$ is too large, it is not conductive to correcting chromatic aberrations, and if the ratio is too small, it is not favorable for the technology of the fifth lens. If $-1.5<f/f_6<-0.4$ is satisfied, the camera lens assembly can take into account both the image quality and the technology.

In another exemplary implementation, an object-side surface of the first lens may be a convex surface.

In another exemplary implementation, an object-side surface of the fifth lens may be an aspheric surface and may have at least one inflection point.

In another exemplary implementation, an object-side surface and an image-side surface of the sixth lens may both be aspheric surfaces, and at least one of the object-side surface and the image-side surface may have at least one inflection point.

In another exemplary implementation, a total track length TTL from the object-side surface of the first lens to an image plane and half of a diagonal length ImgH of an effective pixel area on the image plane may satisfy: TTL/ImgH$\leq$1.7, and more specifically, satisfy: TTL/ImgH$\leq$1.69. In the process of increasing an amount of light admitted, the camera lens assembly with this configuration makes a camera system have a large-aperture advantage, enhances an imaging effect in a dark environment, and simultaneously reduces aberrations of an edge field-of-view.

In another exemplary implementation, an effective focal length $f_3$ of the third lens and the total effective focal length f may satisfy: $-3.0<f_3/f\leq-1.5$, and more specifically, satisfy: $-2.66\leq f_3/f\leq-1.5$. The camera lens assembly having this configuration can reasonably distribute the refractive power of the third lens to reduce a tolerance sensitivity and maintain the miniaturization of the camera system.

In another exemplary implementation, an effective focal length $f_6$ of the sixth lens and the total effective focal length f may satisfy: $-1.5<f/f_6<-0.4$, and more specifically, satisfy: $-1.42\leq f/f_6\leq-0.45$, which is helpful to correct chromatic aberrations of the system. In the camera lens assembly, if the ratio of $f/f_6$ is too large, it is not conductive to correcting the chromatic aberrations, and if the ratio is too small, it results in a poor technology for the fifth lens. If $-1.5<f/f6<-0.4$ is satisfied, the camera lens assembly can take into account both the image quality and the technology.

In another exemplary implementation, an effective focal length $f_1$ of the first lens and the total effective focal length f may satisfy: $f/f_1\leq0.7$, and more specifically, satisfy: $f/f_1\leq0.66$. This allocation of the effective focal length of the first lens and the total effective focal length is conductive to the assembling, which may disperse refractive powers of chief rays of an external field-of-view and can simultaneously correct spherical aberrations.

In another exemplary implementation, an effective focal length $f_2$ of the second lens and an effective focal length $f_5$ of the fifth lens may satisfy: $0<f_2/f_5<1.5$, and more specifically, satisfy: $0.20\leq f_2/f_5\leq1.37$. By properly distributing the refractive powers of the second lens and the fifth lens, it may effectively reduce aberrations of the entire camera system, and reduce the sensitivity of the camera system.

In another exemplary implementation, a center thickness $CT_1$ of the first lens and a center thickness $CT_2$ of the second lens may satisfy: $0.5<CT_1/CT_2<1.5$, and more specifically, satisfy: $0.69\leq CT_1/CT_2\leq1.42$. This configuration of the first lens and the second lens can compensate for a correction effect of high-order aberrations of the first lens with the second lens, which is helpful to ensure the lens molding technology and the stability of the assembly.

In another exemplary implementation, a center thickness $CT_4$ of the fourth lens and a center thickness $CT_6$ of the sixth lens may satisfy: $0.5<CT_4/CT_6<1.5$, and more specifically, satisfy: $0.54\leq CT_4/CT_6\leq1.27$. A center thickness $CT_5$ of the fifth lens and the center thickness $CT_6$ of the sixth lens may satisfy: $CT_6/CT_5\leq1$, and more specifically, satisfy: $CT_6/CT_5\leq0.98$. This configuration of the fourth lens, the fifth lens and the sixth lens is conductive to uniformly distributing the sizes of the lenses, ensuring the assembly stability, reducing the aberrations of the entire camera system, and shortening the total length of the camera system.

In another exemplary implementation, a radius of curvature $R_1$ of the object-side surface of the first lens and a radius of curvature $R_2$ of an image-side surface of the first lens may satisfy: $R_1/R_2\leq1$, and more specifically, satisfy: $R_1/R_2\leq0.90$, which is helpful to reduce the spherical aberrations and the generation of an astigmatism.

In another exemplary implementation, a radius of curvature $R_3$ of an object-side surface of the second lens and a radius of curvature $R_6$ of an image-side surface of the third lens may satisfy: $0.5<R_3/R_6<1.5$, and more specifically, satisfy: $0.67\leq R_3/R_6\leq1.11$. The cooperation between the second lens and the third lens may correct the chromatic aberrations of the system. However, when the deviations of the radii of curvature of the second lens and the third lens are too large, it is not conductive to the correction on the chromatic aberrations. When the radii of curvature are too close, it is not conductive to the correction on monochromatic aberrations. When the radius of curvature $R_3$ of the object-side surface of the second lens and the radius of curvature $R_6$ of the image-side surface of the third lens satisfy: $0.5<R_3/R_6<1.5$, the balance between the various aberrations can be achieved.

In another exemplary implementation, a radius of curvature $R_{11}$ of the object-side surface of the sixth lens and a radius of curvature $R_{12}$ of the image-side surface of the sixth lens may satisfy: $(R_{11}-R_{12})/(R_{11}+R_{12})<1$, and more specifically, satisfy: $(R_{11}-R_{12})/(R_{11}+R_{12})\leq0.59$, which is helpful to correct an overall the aberrations of the camera system.

The present disclosure further provides another camera lens assembly. The camera lens assembly may include a first lens, a second lens, a third lens, a fourth lens, a fifth lens and at least one subsequent lens arranged in sequence from an object side to an image side along an optical axis. The first lens, the second lens and the fifth lens may have positive refractive powers, and the third lens may have a negative refractive power. An effective focal length $f_2$ of the second lens and an effective focal length $f_5$ of the fifth lens may satisfy: $0<f_2/f_5<1.5$, and more specifically, satisfy: $0.20\leq f_2/f_5\leq1.37$. By properly distributing the refractive powers of the second lens and the fifth lens, it may effectively reduce aberrations of an entire camera system, and reduce the sensitivity of the camera system.

In another exemplary implementation, an object-side surface of the first lens may be a convex surface.

In another exemplary implementation, an object-side surface of the fifth lens may be an aspheric surface and may have at least one inflection point.

In another exemplary implementation, a total track length TTL from the object-side surface of the first lens to an image plane and half of a diagonal length ImgH of an effective pixel area on the image plane may satisfy: TTL/ImgH≤1.7, and more specifically, satisfy: TTL/ImgH≤1.69. In the process of increasing an amount of light admitted, the camera lens assembly having this configuration makes the camera system have a large-aperture advantage, enhances an imaging effect in a dark environment, and simultaneously reduces aberrations of an edge field-of-view.

In another exemplary implementation, an effective focal length $f_3$ of the third lens and the total effective focal length f may satisfy: $-3.0<f_3/f\leq-1.5$, and more specifically, satisfy: $-2.66\leq f_3/f\leq-1.5$. The camera lens assembly having this configuration can reasonably distribute the refractive power of the third lens to reduce a tolerance sensitivity and maintain the miniaturization of the camera system.

In another exemplary implementation, an effective focal length $f_1$ of the first lens and the total effective focal length f may satisfy: $f/f_1\leq0.7$, and more specifically, satisfy: $f/f_1\leq0.66$. The allocation of the effective focal length of the first lens and the total effective focal length is conductive to the assembling, which may disperse refractive powers of chief rays of an external field-of-view and can simultaneously correct spherical aberrations.

In another exemplary implementation, a center thickness $CT_1$ of the first lens and a center thickness $CT_2$ of the second lens may satisfy: $0.5<CT_1/CT_2<1.5$, and more specifically, satisfy: $0.69\leq CT_1/CT_2\leq1.42$. This configuration of the first lens and the second lens can compensate for a correction effect of high-order aberrations of the first lens with the second lens, which is helpful to ensure the lens molding technology and the stability of the assembly.

In another exemplary implementation, a radius of curvature $R_1$ of the object-side surface of the first lens and a radius of curvature $R_2$ of an image-side surface of the first lens may satisfy: $R_1/R_2\leq1$, and more specifically, satisfy: $R_1/R_2\leq0.90$, which is helpful to reduce the spherical aberrations and the generation of an astigmatism.

In another exemplary implementation, a radius of curvature $R_3$ of an object-side surface of the second lens and a radius of curvature $R_6$ of an image-side surface of the third lens may satisfy: $0.5<R_3/R_6<1.5$, and more specifically, satisfy: $0.67\leq R_3/R_6\leq1.11$. The cooperation between the second lens and the third lens may correct the chromatic aberrations of the system. However, when the deviations of the radii of curvature of the second lens and the third lens are too large, it is not conductive to the correction on the chromatic aberrations. When the radii of curvature are too close, it is not conductive to the correction on monochromatic aberrations. When the radius of curvature $R_3$ of the object-side surface of the second lens and the radius of curvature $R_6$ of the image-side surface of the third lens satisfy: $0.5<R_3/R_6<1.5$, the balance between the various aberrations can be achieved.

In another exemplary implementation, the at least one subsequent lens may include a sixth lens, and the sixth lens may have a negative refractive power.

In another exemplary implementation, an object-side surface and an image-side surface of the sixth lens may both be aspheric surfaces, and at least one of the object-side surface and the image-side surface may have at least one inflection point.

In another exemplary implementation, a center thickness $CT_4$ of the fourth lens and a center thickness $CT_6$ of the sixth lens may satisfy: $0.5<CT_4/CT_6<1.5$, and more specifically, satisfy: $0.54\leq CT_4/CT_6\leq1.27$. A center thickness $CT_5$ of the fifth lens and the center thickness $CT_6$ of the sixth lens may satisfy: $CT_6/CT_5\leq1$, and more specifically, satisfy: $CT_6/CT_5\leq0.98$. This configuration of the fourth lens, the fifth lens and the sixth lens is conductive to uniformly distributing the sizes of the lenses, ensuring the assembly stability, reducing the aberrations of the entire camera system, and shortening the total length of the camera system.

In another exemplary implementation, a radius of curvature $R_{11}$ of the object-side surface of the sixth lens and a radius of curvature $R_{12}$ of the image-side surface of the sixth lens may satisfy: $(R_{11}-R_{12})/(R_{11}+R_{12})<1$, and more specifically, satisfy: $(R_{11}-R_{12})/(R_{11}+R_{12})\leq0.59$, which is helpful to correct an overall aberration of the camera system.

The camera lens assembly according to the present disclosure has a large ultra-thin aperture, a good image quality, and a low tolerance sensitivity, which is conductive to processing and manufacturing, and simultaneously satisfies the miniaturization.

According to another aspect of the present disclosure, a camera device that may be equipped with the above-described camera lens assembly is also provided.

The camera lens assembly according to the above implementations of the present disclosure may use multiple lenses, for example, six lenses used in the present disclosure. However, it should be understood that this is only an illustration rather than a limitation. By properly distributing the refractive powers, the center thicknesses and the surface types of the lenses, the axial spacing distances between the lenses, etc., a miniaturized ultra-thin camera lens assembly having a large aperture and a low sensitivity may be provided. In the implementations of the present disclosure, at least one of the mirror surfaces of the lenses is an aspheric mirror surface. The aspheric lens is characterized in that its curvature continuously changes from the center of the lens to the periphery. In contrast to a spherical lens having a constant curvature from the center of the lens to the periphery, the aspheric lens has a better radius-of-curvature characteristic, and has advantages of improving a distortion aberration and an astigmatic aberration, thus enabling the field-of-view to become larger and more realistic. The use of the aspheric lens can eliminate as much as possible the aberrations that occur during the imaging, thereby improving the image quality.

However, it should be understood by those skilled in the art that the various results and advantages described below may be obtained by changing the number of the lenses forming the lens assembly without departing from the technical solution claimed by the present disclosure. For example, although six lenses are used as an example to describe the camera lens assembly in the first implementation, the camera lens assembly is not limited to include six lenses. If desired, the camera lens assembly may also include other numbers of lenses.

Specific embodiments of the camera lens assembly that may be applied to the above implementations are further described below with reference to FIGS. 1-28D.

Embodiment 1

Embodiment 1 of the camera lens assembly according to the above implementations of the present disclosure is described below with reference to FIGS. 1-2D.

As shown in FIG. 1, the camera lens assembly according to Embodiment 1 includes a first lens E1, a second lens E2, a third lens E3, a fourth lens E4, a fifth lens E5 and a sixth lens E6. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10. The sixth lens E6 has an object-side surface S11 and an image-side surface S12. In this embodiment, the first lens E1 may have a positive refractive power, and the object-side surface S1 may be a convex surface. The second lens E2 may have a positive refractive power. The third lens E3 may have a negative refractive power. The fourth lens E4 may have a positive refractive power or a negative refractive power. The fifth lens E5 may have a positive refractive power, and the object-side surface S9 of the fifth lens E5 is an aspheric surface and has at least one inflection point. The sixth lens E6 may have a positive refractive power, the object-side surface S11 and the image-side surface S12 of the sixth lens E6 are aspheric surfaces, and at least one of the object-side surface S11 and the image-side surface S12 has at least one inflection point. The camera lens assembly may further include a diaphragm (not shown) and an optical filter E7 having an object-side surface S13 and an image-side surface S14 and used for filtering out infrared light. In the camera lens assembly of this embodiment, an aperture STO may also be provided to adjust the amount of light admitted. Light from an object sequentially passes through the surfaces S1-S14 and finally forms an image on an image plane S15.

Table 1 below shows the effective focal lengths f1-f6 of the lenses, the total effective focal length f of the camera lens assembly, the total track length TTL of the camera lens assembly and the half of the diagonal length ImgH of the effective pixel area on the image plane S15 of the camera lens assembly in Embodiment 1.

TABLE 1

| $f_1$(mm) | 11.10 | f(mm) | 3.51 |
|---|---|---|---|
| $f_2$(mm) | 3.86 | TTL(mm) | 4.35 |
| $f_3$(mm) | -7.83 | ImgH(mm) | 3.0 |
| $f_4$(mm) | 74.67 | | |
| $f_5$(mm) | 7.61 | | |
| $f_6$(mm) | -5.93 | | |

The total effective focal length f of the camera lens assembly is selected to be 3.51 mm. In this implementation, the diameter of the entrance pupil diameter EPD may be selected with the total effective focal length f of the camera lens assembly to satisfy: f/EPD=1.45.

Referring to Table 1, the total track length TTL from the object-side surface S1 of the first lens E1 to the image plane S15 and the half of the diagonal length ImgH of the effective pixel area on the image plane S15 satisfy: TTL/ImgH=1.45. The effective focal length $f_3$ of the third lens E3 and the total effective focal length f satisfy: $f_3$/f=-2.23. The effective focal length $f_5$ of the fifth lens and the total effective focal length f satisfy: f/$f_5$=0.46. The effective focal length $f_6$ of the sixth lens and the total effective focal length f satisfy: f/$f_6$=-0.59. The effective focal length $f_1$ of the first lens and the total effective focal length f satisfy: f/$f_1$=0.32. The effective focal length $f_2$ of the second lens and the effective focal length $f_5$ of the fifth lens satisfy: $f_2$/$f_5$=0.51.

Table 2 shows the surface type, the radius of curvature, the center thickness, the material and the conic coefficient of each lens in this embodiment.

TABLE 2

| surface number | surface type | radius of curvature | thickness | material | conic coefficient |
|---|---|---|---|---|---|
| OBJ | spherical | infinite | infinite | | |
| STO | spherical | infinite | -0.3770 | | |
| S1 | aspheric | 1.5191 | 0.4675 | 1.55, 56.1 | -8.5969 |
| S2 | aspheric | 1.8062 | 0.1019 | | -10.5441 |
| S3 | aspheric | 2.0576 | 0.5716 | 1.55, 56.1 | -3.7682 |
| S4 | aspheric | 79.0509 | 0.0300 | | -65.9000 |
| S5 | aspheric | 6.3545 | 0.2300 | 1.67, 20.4 | 28.2817 |
| S6 | aspheric | 2.8287 | 0.3229 | | -10.1462 |
| S7 | aspheric | 48.2463 | 0.3563 | 1.67, 20.4 | -65.9000 |
| S8 | aspheric | infinite | 0.2380 | | 0.0000 |
| S9 | aspheric | 4.1590 | 0.4677 | 1.55, 56.1 | 2.7060 |
| S10 | aspheric | infinite | 0.1857 | | 0.0000 |
| S11 | aspheric | 2.1333 | 0.4000 | 1.55, 56.1 | -1.6215 |
| S12 | aspheric | 1.2016 | 0.3974 | | -5.3447 |
| S13 | spherical | infinite | 0.2100 | 1.52, 64.2 | |
| S14 | spherical | infinite | 0.3711 | | |
| S15 | spherical | infinite | | | |

Table 3 shows the high-order coefficients $A_4$, $A_6$, $A_8$, $A_{10}$, $A_{12}$, $A_{14}$ and $A_{16}$ applicable to the aspheric surfaces S1-S12 of the aspheric lenses in this embodiment.

TABLE 3

| surface number | A4 | A6 | A8 | A10 | A12 | A14 | A16 |
|---|---|---|---|---|---|---|---|
| S1 | 2.6739E-01 | -3.7634E-01 | 4.3618E-01 | -3.5682E-01 | 1.4740E-01 | -2.3167E-02 | 0.0000E+00 |
| S2 | 1.1841E-01 | -3.4473E-01 | 2.4724E-01 | -5.6581E-02 | 0.0000E+00 | 0.0000E+00 | 0.0000E+00 |
| S3 | -1.3165E-02 | -8.5006E-02 | -6.2127E-02 | 2.5555E-01 | -1.4567E-01 | 2.2964E-02 | 0.0000E+00 |
| S4 | 1.7166E-03 | -1.1179E-01 | 2.4133E-01 | -3.1109E-01 | 2.1183E-01 | -5.7100E-02 | 0.0000E+00 |
| S5 | -4.0384E-02 | -5.0967E-02 | 1.8731E-01 | -4.8985E-01 | 4.7852E-01 | -1.5657E-01 | 0.0000E+00 |
| S6 | 6.0851E-02 | -1.5953E-01 | 7.0884E-01 | -1.7152E+00 | 2.1387E+00 | -1.3194E+00 | 3.3783E-01 |
| S7 | -4.1852E-02 | -2.3168E-01 | 4.6754E-01 | -6.5346E-02 | -1.0080E+00 | 1.3240E+00 | -5.3046E-01 |
| S8 | 1.5104E-02 | -6.6008E-01 | 1.5241E+00 | -1.9961E+00 | 1.5313E+00 | -6.1059E-01 | 9.5909E-02 |
| S9 | 2.3957E-01 | -6.1189E-01 | 6.6268E-01 | -5.4439E-01 | 2.7473E-01 | -6.9879E-02 | 6.8041E-03 |
| S10 | 2.2586E-01 | -1.4768E-01 | -7.2534E-02 | 1.1840E-01 | -5.8454E-02 | 1.3218E-02 | -1.1390E-03 |
| S11 | -4.1301E-01 | 2.8639E-01 | -1.3346E-01 | 4.2048E-02 | -8.8144E-03 | 1.1514E-03 | -7.0038E-05 |
| S12 | -2.1811E-01 | 1.5349E-01 | -9.3954E-02 | 3.7414E-02 | -8.4592E-03 | 9.8662E-04 | -4.6285E-05 |

Referring to Table 2 and Table 3, the center thickness $CT_1$ of the first lens E1 and the center thickness $CT_2$ of the second lens E2 satisfy: $CT_1/CT_2=0.82$. The center thickness $CT_4$ of the fourth lens E4 and the center thickness $CT_6$ of the sixth lens E6 satisfy: $CT_4/CT_6=0.89$. The center thickness $CT_5$ of the fifth lens E5 and the center thickness $CT_6$ of the sixth lens E6 satisfy: $CT_6/CT_5=0.86$. The radius of curvature $R_1$ of the object-side surface S1 of the first lens E1 and the radius of curvature $R_2$ of the image-side surface S2 of the first lens E1 satisfy: $R_1/R_2=0.84$. The radius of curvature $R_3$ of the object-side surface S3 of the second lens E2 and the radius of curvature $R_6$ of the image-side surface S6 of the third lens E3 satisfy: $R_3/R_6=0.73$. The radius of curvature $R_{11}$ of the object-side surface S11 of the sixth lens E6 and the radius of curvature $R_{12}$ of the image-side surface S12 of the sixth lens E6 satisfy: $(R_{11}-R_{12})/(R_{11}+R_{12})=0.28$.

Figure 2A:
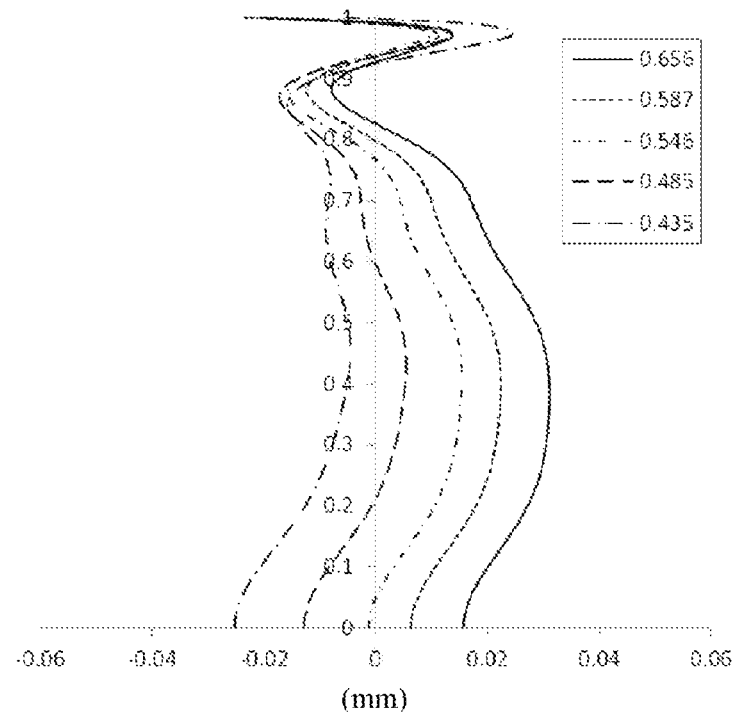
FIG. 2A illustrates a longitudinal aberration curve of the camera lens assembly according to Embodiment 1.
Figure 2B:
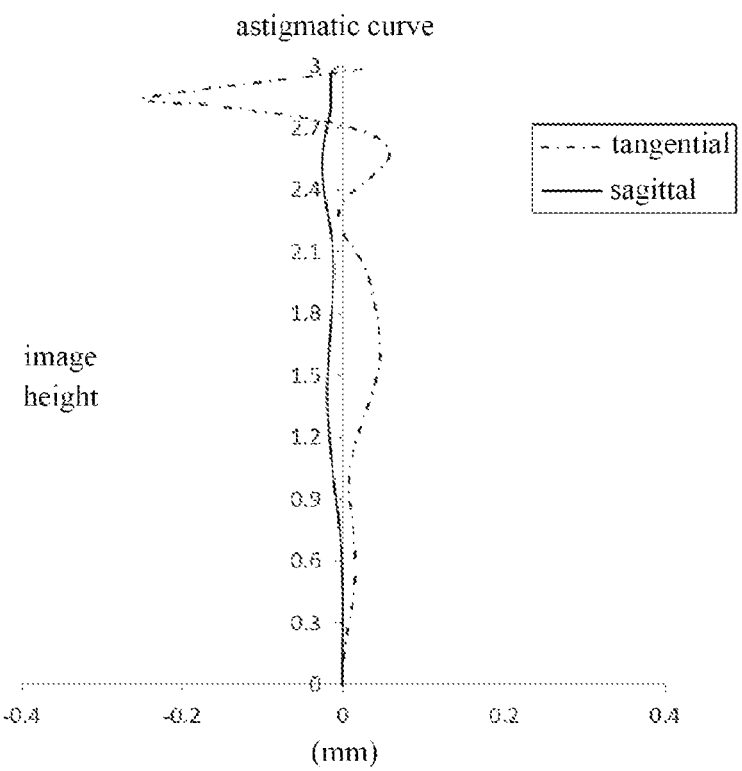
FIG. 2B illustrates an astigmatic curve of the camera lens assembly according to Embodiment 1.
Figure 2C:
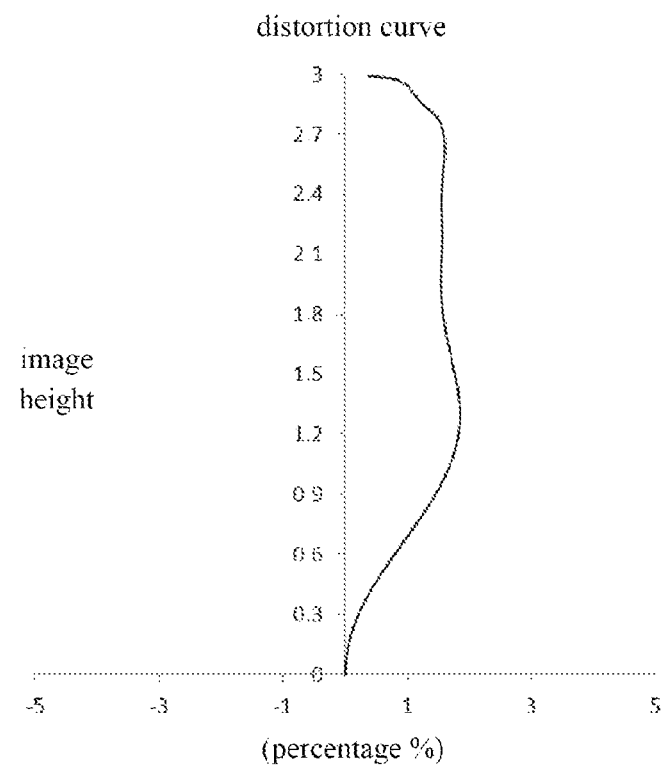
FIG. 2C illustrates a distortion curve of the camera lens assembly according to Embodiment 1.
Figure 2D:
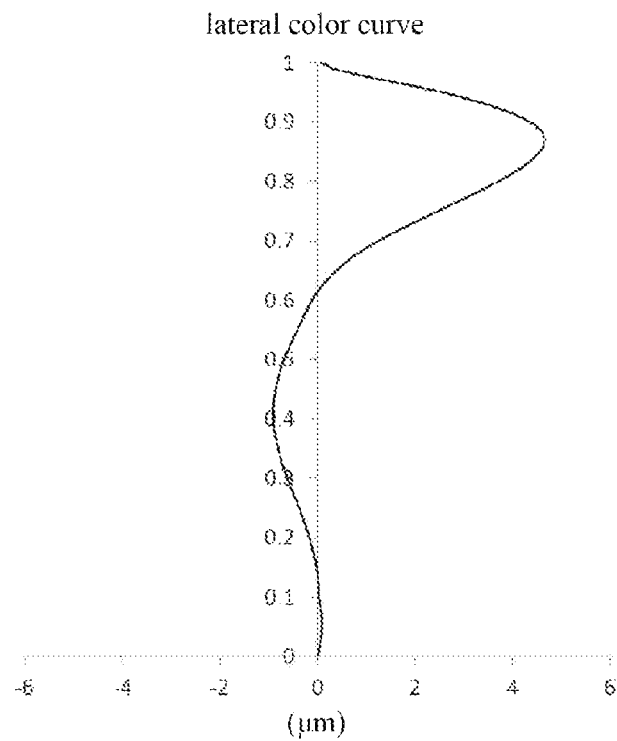
FIG. 2D illustrates a lateral color curve of the camera lens assembly according to Embodiment 1.

FIG. 2A illustrates a longitudinal aberration curve of the camera lens assembly according to Embodiment 1, representing deviations of focal points of light of different wavelengths converged after passing through an optical system. FIG. 2B illustrates an astigmatic curve of the camera lens assembly according to Embodiment 1, representing a curvature of a tangential image plane and a curvature of a sagittal image plane. FIG. 2C illustrates a distortion curve of the camera lens assembly according to Embodiment 1, representing amounts of distortion at different viewing angles. FIG. 2D illustrates a lateral color curve of the camera lens assembly according to Embodiment 1, representing deviations of different image heights on an image plane after light passes through the camera lens assembly. In summary, it can be seen from FIGS. 2A-2D that the camera lens assembly according to Embodiment 1 may obtain a good imaging effect in a situation of ensuring the miniaturization.

Embodiment 2

Embodiment 2 of the camera lens assembly according to the present disclosure is described below with reference to FIGS. 3-4D. In addition to the parameters of each lens of the camera lens assembly, for example, in addition to the radius of curvature, the center thickness, the material, the conic coefficient, the effective focal length and the axial spacing distance of each lens and the high-order coefficients of the mirror surfaces, the camera lens assembly described in Embodiment 2 and the following embodiments are the same in arrangement and structure as the camera lens assembly described in Embodiment 1. For the purpose of brevity, the description of parts similar to those in Embodiment 1 will be omitted.

Figure 3:
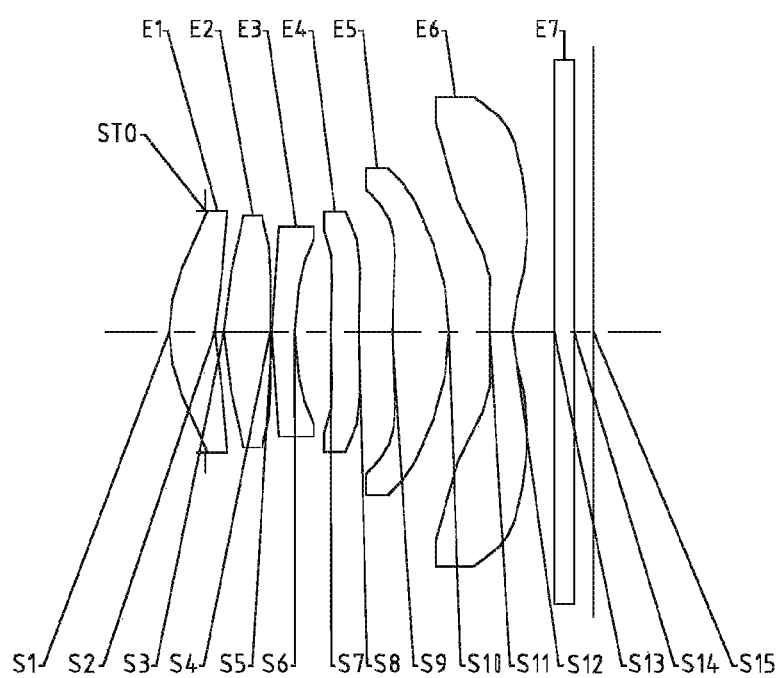
FIG. 3 is a schematic structural diagram illustrating a camera lens assembly according to Embodiment 2 of the present disclosure.

FIG. 3 is a schematic structural diagram illustrating the camera lens assembly according to Embodiment 2 of the present disclosure. As shown in FIG. 3, the camera lens assembly according to Embodiment 2 includes the first to sixth lenses E1-E6 respectively having an object-side surface and an image-side surface.

Table 4 below shows the effective focal lengths f1-f6 of the lenses, the total effective focal length f of the camera lens assembly, the total track length TTL of the camera lens assembly and the half of the diagonal length ImgH of the effective pixel area on the image plane S15 of the camera lens assembly in Embodiment 2.

TABLE 4

| $f_1$(mm) | 10.40 | f(mm) | 3.63 |
|---|---|---|---|
| $f_2$(mm) | 4.06 | TTL(mm) | 4.50 |
| $f_3$(mm) | −6.55 | ImgH(mm) | 2.93 |
| $f_4$(mm) | 1068.88 | | |
| $f_5$(mm) | 3.64 | | |
| $f_6$(mm) | −2.96 | | |

The total effective focal length f of the camera lens assembly is selected to be 3.63 mm. In this implementation, the diameter of the entrance pupil diameter EPD may be selected with the total effective focal length f of the camera lens assembly to satisfy: f/EPD=1.42.

Referring to Table 4, the total track length TTL from the object-side surface S1 of the first lens E1 to the image plane S15 and the half of the diagonal length ImgH of the effective pixel area on the image plane S15 satisfy: TTL/ImgH=1.42. The effective focal length $f_3$ of the third lens E3 and the total effective focal length f satisfy: $f_3/f=-1.80$. The effective focal length $f_5$ of the fifth lens E5 and the total effective focal length f satisfy: $f/f_5=1.00$. The effective focal length $f_6$ of the sixth lens and the total effective focal length f satisfy: $f/f_6=-1.23$. The effective focal length $f_1$ of the first lens E1 and the total effective focal length f satisfy: $f/f_1=0.35$. The effective focal length $f_2$ of the second lens E2 and the effective focal length $f_5$ of the fifth lens satisfy: $f_2/f_5=1.12$.

Table 5 shows the surface type, the radius of curvature, the center thickness, the material and the conic coefficient of each lens in this embodiment.

TABLE 5

| surface number | surface type | radius of curvature | thickness | material | conic coefficient |
|---|---|---|---|---|---|
| OBJ | spherical | infinite | infinite | | |
| STO | spherical | infinite | −0.3799 | | |
| S1 | aspheric | 1.6656 | 0.4843 | 1.55, 56.1 | −9.4616 |
| S2 | aspheric | 2.1137 | 0.0953 | | −14.4138 |
| S3 | aspheric | 2.1607 | 0.4912 | 1.55, 56.1 | −6.0808 |
| S4 | aspheric | 75.9228 | 0.0200 | | −84.7944 |
| S5 | aspheric | 6.4910 | 0.2400 | 1.67, 20.4 | 29.2780 |
| S6 | aspheric | 2.5763 | 0.3806 | | 2.0545 |
| S7 | aspheric | 6.9902 | 0.3000 | 1.67, 20.4 | 34.5845 |
| S8 | aspheric | 6.9379 | 0.3566 | | −68.4911 |
| S9 | aspheric | 8.0444 | 0.5998 | 1.55, 56.1 | −46.3156 |
| S10 | aspheric | −2.5707 | 0.4332 | | 0.0000 |
| S11 | aspheric | 2.2500 | 0.2400 | 1.55, 56.1 | −63.4490 |
| S12 | aspheric | 0.9053 | 0.4449 | | −7.8560 |
| S13 | spherical | infinite | 0.2100 | 1.52, 64.2 | |
| S14 | spherical | infinite | 0.2041 | | |
| S15 | spherical | infinite | | | |

Table 6 shows the high-order coefficients $A_4$, $A_6$, $A_8$, $A_{10}$, $A_{12}$, $A_{14}$ and $A_{16}$ applicable to the aspheric surfaces S1-S12 of the aspheric lenses in this embodiment.

TABLE 6

| surface number | A4 | A6 | A8 | A10 | A12 | A14 | A16 |
|---|---|---|---|---|---|---|---|
| S1 | 2.2477E−01 | −2.9478E−01 | 3.2705E−01 | −2.6013E−01 | 1.0749E−01 | −1.7414E−02 | 0.0000E+00 |
| S2 | 8.5938E−02 | −2.8421E−01 | 2.0954E−01 | −4.9848E−02 | 0.0000E+00 | 0.0000E+00 | 0.0000E+00 |
| S3 | 3.9459E−03 | −8.3696E−02 | −1.1296E−01 | 3.0230E−01 | −1.7349E−01 | 2.7478E−02 | 0.0000E+00 |
| S4 | −2.1857E−03 | −8.0539E−02 | 9.3588E−02 | −5.5527E−02 | 1.3605E−02 | −1.8650E−03 | 0.0000E+00 |
| S5 | −5.2677E−02 | −2.9572E−02 | 2.0648E−01 | −4.0036E−01 | 3.1193E−01 | −8.5189E−01 | 0.0000E+00 |
| S6 | −6.1711E−02 | 1.1373E−01 | −2.0292E−01 | 3.9073E−01 | −5.5648E−01 | 4.2047E−01 | −1.1217E−01 |
| S7 | −1.3346E−01 | 9.4884E−02 | −3.2765E−01 | 8.0165E−01 | −1.1531E+00 | 8.3252E−01 | −2.4073E−01 |
| S8 | −7.6429E−02 | −4.0453E−02 | 9.7751E−02 | −9.5634E−02 | 2.3289E−02 | 1.6145E−02 | −7.3816E−03 |
| S9 | 9.5320E−03 | −6.4321E−02 | −7.7295E−03 | 7.1788E−02 | −6.9885E−02 | 2.6176E−02 | −3.3601E−03 |
| S10 | 2.7632E−02 | −1.3592E−02 | −3.0166E−02 | 4.8469E−02 | −2.5551E−02 | 5.6488E−03 | −4.4486E−04 |
| S11 | −4.7617E−01 | 3.1158E−01 | −9.3644E−02 | 1.6034E−02 | −1.8758E−03 | 1.6614E−04 | −7.9864E−06 |
| S12 | −1.9690E−01 | 1.1252E−01 | −3.4365E−02 | 5.2823E−03 | −2.0505E−04 | −4.2595E−05 | 3.9153E−06 |

Referring to Table 5 and Table 6, the center thickness $CT_1$ of the first lens E1 and the center thickness $CT_2$ of the second lens E2 satisfy: $CT_1/CT_2=0.99$. The center thickness $CT_4$ of the fourth lens E4 and the center thickness $CT_6$ of the sixth lens E6 satisfy: $CT_4/CT_6=1.25$. The center thickness $CT_5$ of the fifth lens E5 and the center thickness $CT_6$ of the sixth lens E6 satisfy: $CT_6/CT_5=0.40$. The radius of curvature $R_1$ of the object-side surface S1 of the first lens E1 and the radius of curvature $R_2$ of the image-side surface S2 of the first lens E1 satisfy: $R_1/R_2=0.79$. The radius of curvature $R_3$ of the object-side surface S3 of the second lens E2 and the radius of curvature $R_6$ of the image-side surface S6 of the third lens E3 satisfy: $R_3/R_6=0.84$. The radius of curvature $R_{11}$ of the object-side surface S11 of the sixth lens E6 and the radius of curvature $R_{12}$ of the image-side surface S12 of the sixth lens E6 satisfy: $(R_{11}-R_{12})/(R_{11}+R_{12})=0.43$.

Figure 4A:
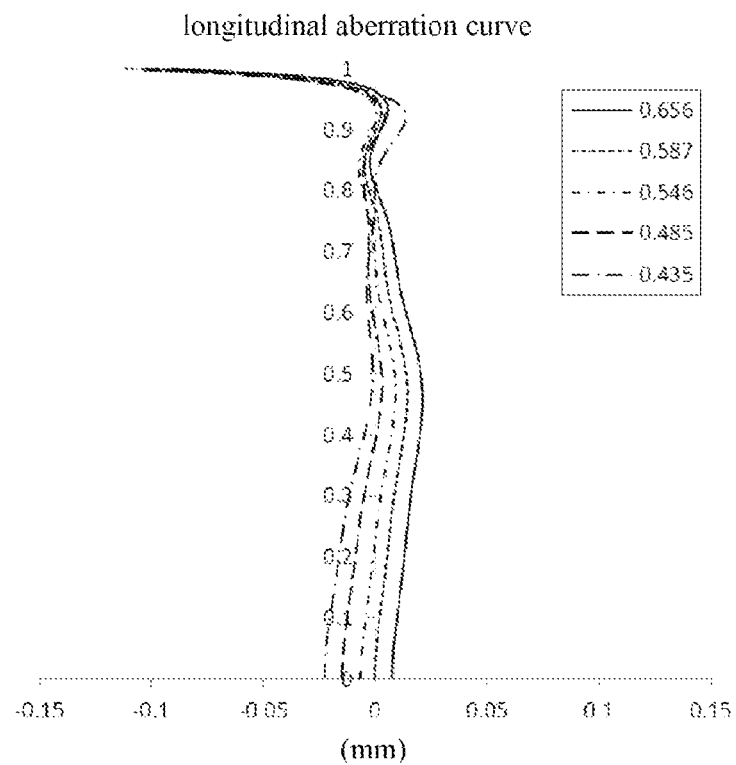
FIG. 4A illustrates a longitudinal aberration curve of the camera lens assembly according to Embodiment 2.
Figure 4B:
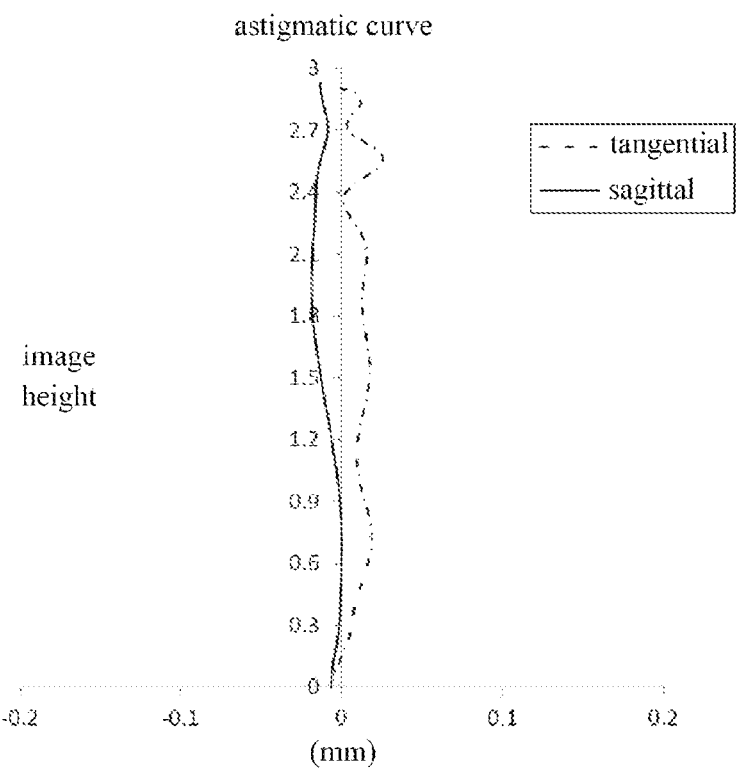
FIG. 4B illustrates an astigmatic curve of the camera lens assembly according to Embodiment 2.
Figure 4C:
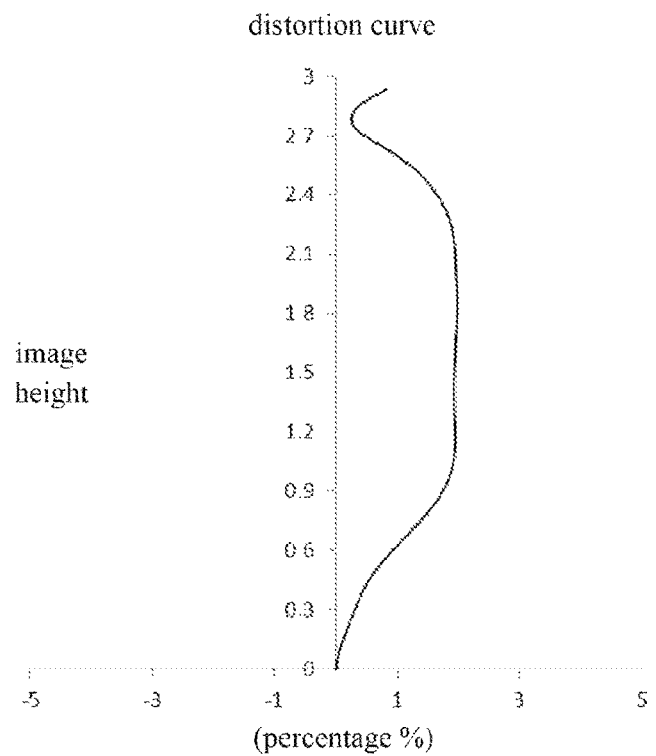
FIG. 4C illustrates a distortion curve of the camera lens assembly according to Embodiment 2.
Figure 4D:
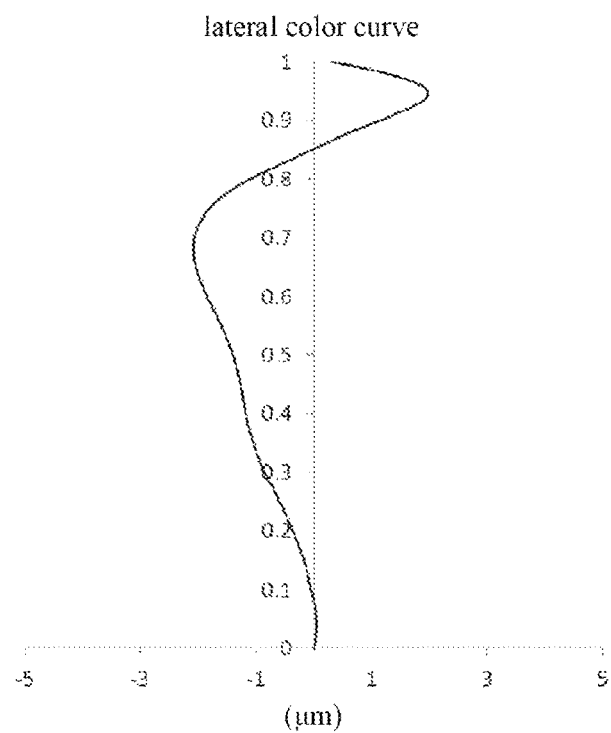
FIG. 4D illustrates a lateral color curve of the camera lens assembly according to Embodiment 2.

FIG. 4A illustrates a longitudinal aberration curve of the camera lens assembly according to Embodiment 2, representing deviations of focal points of light of different wavelengths converged after passing through an optical system. FIG. 4B illustrates an astigmatic curve of the camera lens assembly according to Embodiment 2, representing a curvature of a tangential image plane and a curvature of a sagittal image plane. FIG. 4C illustrates a distortion curve of the camera lens assembly according to Embodiment 2, representing amounts of distortion at different viewing angles. FIG. 4D illustrates a lateral color curve of the camera lens assembly according to Embodiment 2, representing deviations of different image heights on an image plane after light passes through the camera lens assembly. In summary, it can be seen from FIGS. 4A-4D that the camera lens assembly according to Embodiment 2 may obtain a good imaging effect in a situation of ensuring the miniaturization.

Embodiment 3

Figure 5:
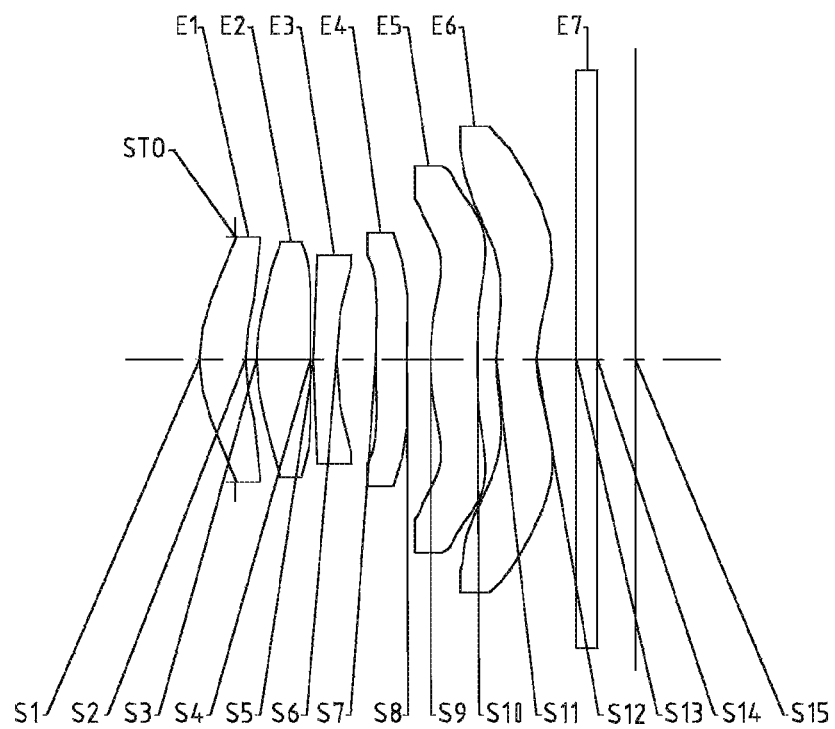
FIG. 5 is a schematic structural diagram illustrating a camera lens assembly according to Embodiment 3 of the present disclosure.

Embodiment 3 of the camera lens assembly according to the present disclosure is described below with reference to FIGS. 5-6D. FIG. 5 is a schematic structural diagram illustrating the camera lens assembly according to Embodiment 3 of the present disclosure. As shown in FIG. 5, the camera lens assembly according to Embodiment 3 includes the first to sixth lenses E1-E6 respectively having an object-side surface and an image-side surface.

Table 7 below shows the effective focal lengths f1-f6 of the lenses, the total effective focal length f of the camera lens assembly, the total track length TTL of the camera lens assembly and the half of the diagonal length ImgH of the effective pixel area on the image plane S15 of the camera lens assembly in Embodiment 3.

TABLE 7

| $f_1$(mm) | 14.88 | f(mm) | 3.54 |
|---|---|---|---|
| $f_2$(mm) | 3.53 | TTL(mm) | 4.35 |
| $f_3$(mm) | −7.83 | ImgH(mm) | 2.94 |
| $f_4$(mm) | −79.63 | | |
| $f_5$(mm) | 6.48 | | |
| $f_6$(mm) | −5.98 | | |

The total effective focal length f of the camera lens assembly is selected to be 3.54 mm. In this implementation, the diameter of the entrance pupil diameter EPD may be selected with the total effective focal length f of the camera lens assembly to satisfy: f/EPD=1.45.

Referring to Table 7, the total track length TTL from the object-side surface S1 of the first lens E1 to the image plane S15 and the half of the diagonal length ImgH of the effective pixel area on the image plane S15 satisfy: TTL/ImgH=1.45. The effective focal length $f_3$ of the third lens E3 and the total effective focal length f satisfy: $f_3/f=-2.22$. The effective focal length $f_5$ of the fifth lens E5 and the total effective focal length f satisfy: $f/f_5=0.55$. The effective focal length $f_6$ of the sixth lens and the total effective focal length f satisfy: $f/f_6=-0.59$. The effective focal length $f_1$ of the first lens E1 and the total effective focal length f satisfy: $f/f_1=0.24$. The effective focal length $f_2$ of the second lens E2 and the effective focal length $f_5$ of the fifth lens satisfy: $f_2/f_5=0.55$.

Table 8 shows the surface type, the radius of curvature, the center thickness, the material and the conic coefficient of each lens in this embodiment.

TABLE 8

| surface number | surface type | radius of curvature | thickness | material | conic coefficient |
|---|---|---|---|---|---|
| OBJ | spherical | infinite | infinite | | |
| STO | spherical | infinite | −0.3551 | | |
| S1 | aspheric | 1.5424 | 0.4573 | 1.55, 56.1 | −8.9633 |
| S2 | aspheric | 1.7040 | 0.1111 | | −11.4399 |
| S3 | aspheric | 1.8898 | 0.5379 | 1.55, 56.1 | −4.7901 |
| S4 | aspheric | 79.0508 | 0.0300 | | 90.7000 |
| S5 | aspheric | 6.3545 | 0.2300 | 1.67, 20.4 | 31.1983 |
| S6 | aspheric | 2.8288 | 0.3925 | | −14.0501 |
| S7 | aspheric | 7.9622 | 0.3106 | 1.67, 20.4 | −31.8997 |
| S8 | aspheric | 6.8177 | 0.2379 | | −45.9374 |
| S9 | aspheric | 3.5431 | 0.4677 | 1.55, 56.1 | 1.0683 |
| S10 | aspheric | infinite | 0.1857 | | 0.0000 |
| S11 | aspheric | 2.0822 | 0.4016 | 1.55, 56.1 | −1.6680 |
| S12 | aspheric | 1.1852 | 0.3972 | | −5.2158 |
| S13 | spherical | infinite | 0.2100 | 1.52, 64.2 | |
| S14 | spherical | infinite | 0.3805 | | |
| S15 | spherical | infinite | | | |

Table 9 shows the high-order coefficients $A_4$, $A_6$, $A_8$, $A_{10}$, $A_{12}$, $A_{14}$ and $A_{16}$ applicable to the aspheric surfaces S1-S12 of the aspheric lenses in this embodiment.

TABLE 9

| surface number | A4 | A6 | A8 | A10 | A12 | A14 | A16 |
|---|---|---|---|---|---|---|---|
| S1 | 2.6009E−01 | −4.1343E−01 | 5.2487E−01 | −4.7909E−01 | 2.2854E−01 | −4.2417E−02 | 0.0000E+00 |
| S2 | 1.5165E−01 | −4.7969E−01 | 3.7451E−01 | −9.4700E−02 | 0.0000E+00 | 0.0000E+00 | 0.0000E+00 |
| S3 | 1.1974E−01 | −1.0931E−01 | −1.8674E−01 | 4.9270E−01 | −2.8267E−01 | 3.9864E−02 | 0.0000E+00 |
| S4 | 3.2817E−02 | −2.1234E−01 | 3.2641E−01 | −2.8899E−01 | 1.2458E−01 | −2.1778E−02 | 0.0000E+00 |
| S5 | −2.2324E−02 | −2.0048E−01 | 6.0913E−01 | −1.0525E+00 | 8.1850E−01 | −2.2742E−01 | 0.0000E+00 |
| S6 | 4.4479E−02 | −6.8243E−02 | 2.9461E−01 | −6.8547E−01 | 7.5107E−01 | −4.2491E−01 | 1.3360E−01 |
| S7 | −1.1958E−01 | −7.0963E−02 | 4.7639E−01 | −8.3777E−01 | 5.8516E−01 | −9.5746E−02 | −5.2987E−02 |
| S8 | −9.2198E−02 | −3.0567E−01 | 8.0705E−01 | −1.0154E+00 | 7.0811E−01 | −2.5077E−01 | 3.4298E−02 |
| S9 | 2.0705E−01 | −5.7692E−01 | 6.3336E−01 | −5.0008E−01 | 2.3864E−01 | −5.7270E−02 | 5.2163E−03 |
| S10 | 2.5363E−01 | −2.3722E−01 | 3.9697E−02 | 4.3435E−02 | −3.0985E−02 | 8.1429E−03 | −7.7354E−04 |
| S11 | −3.8322E−01 | 2.5958E−01 | −1.4348E−01 | 5.7523E−02 | −1.4169E−02 | 1.9202E−03 | −1.1072E−04 |
| S12 | −2.0460E−01 | 1.4052E−01 | −8.7233E−02 | 3.4523E−02 | −7.6812E−03 | 8.8504E−04 | −4.1376E−05 |

Referring to Table 8 and Table 9, the center thickness $CT_1$ of the first lens E1 and the center thickness $CT_2$ of the second lens E2 satisfy: $CT_1/CT_2=0.85$. The center thickness $CT_4$ of the fourth lens E4 and the center thickness $CT_6$ of the sixth lens E6 satisfy: $CT_4/CT_6=0.77$. The center thickness $CT_5$ of the fifth lens E5 and the center thickness $CT_6$ of the sixth lens E6 satisfy: $CT_6/CT_5=0.86$. The radius of curvature $R_1$ of the object-side surface S1 of the first lens E1 and the radius of curvature $R_2$ of the image-side surface S2 of the first lens E1 satisfy: $R_1/R_2=0.91$. The radius of curvature $R_3$ of the object-side surface S3 of the second lens E2 and the radius of curvature $R_6$ of the image-side surface S6 of the third lens E3 satisfy: $R_3/R_6=0.67$. The radius of curvature $R_{11}$ of the object-side surface S11 of the sixth lens E6 and the radius of curvature $R_{12}$ of the image-side surface S12 of the sixth lens E6 satisfy: $(R_{11}-R_{12})/(R_{11}+R_{12})=0.27$.

Figure 6A:
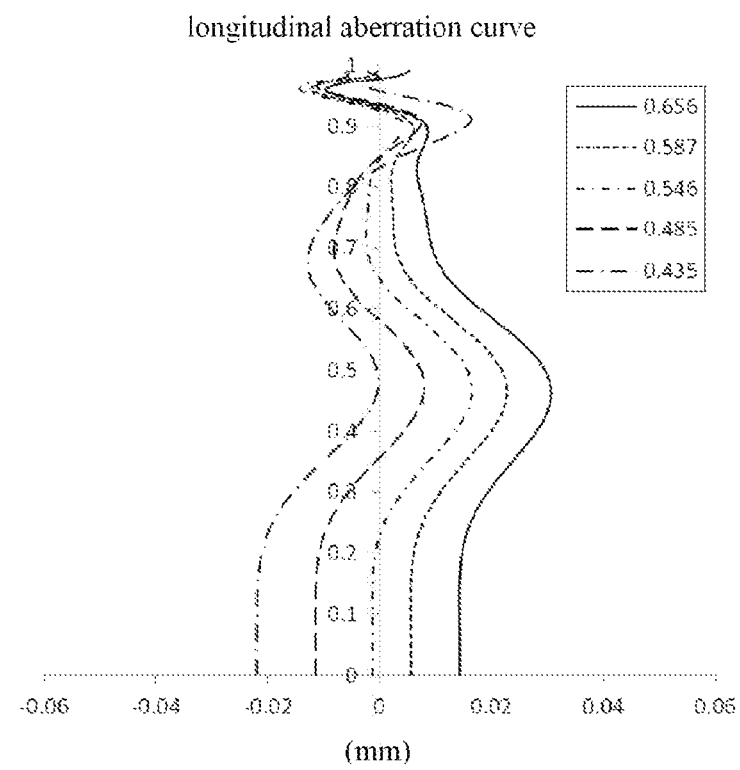
FIG. 6A illustrates a longitudinal aberration curve of the camera lens assembly according to Embodiment 3.
Figure 6B:
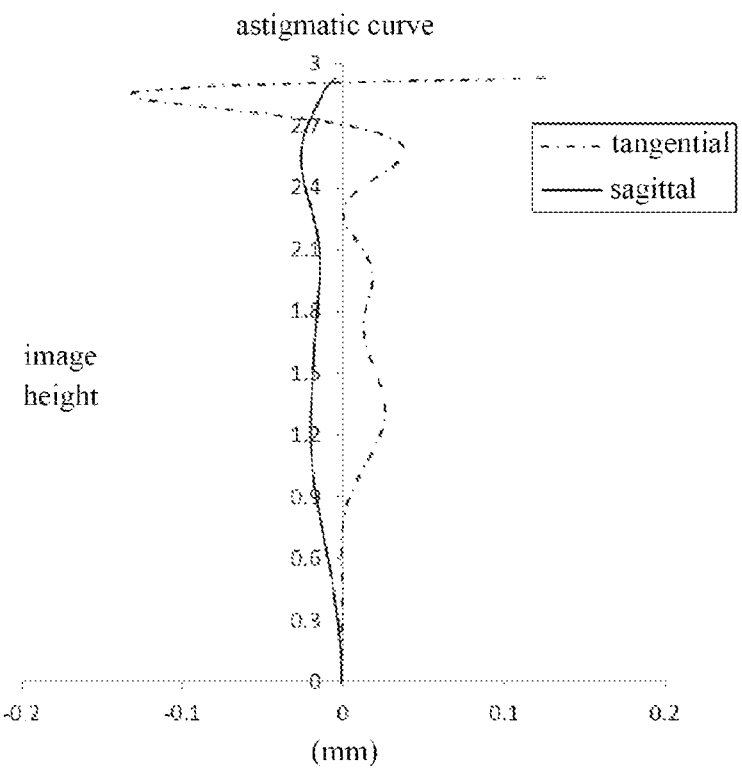
FIG. 6B illustrates an astigmatic curve of the camera lens assembly according to Embodiment 3.
Figure 6C:
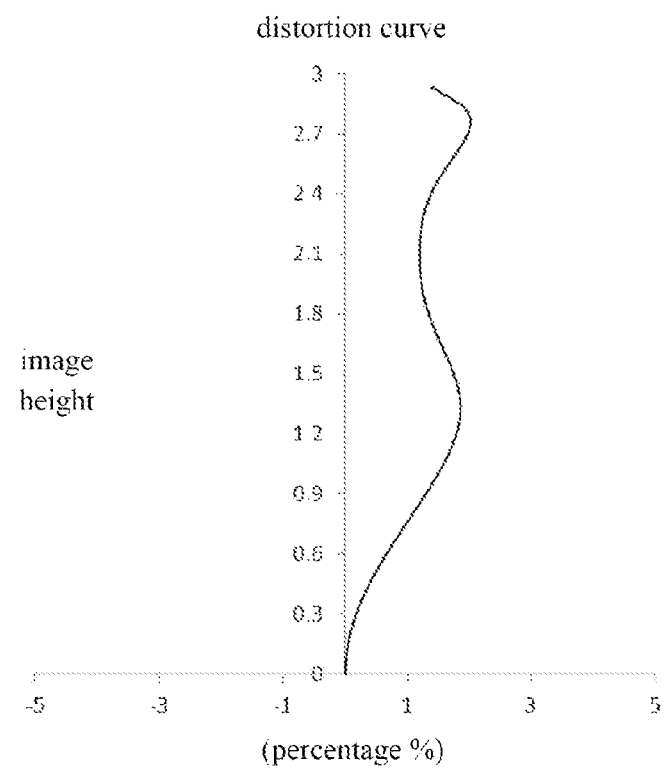
FIG. 6C illustrates a distortion curve of the camera lens assembly according to Embodiment 3.
Figure 6D:
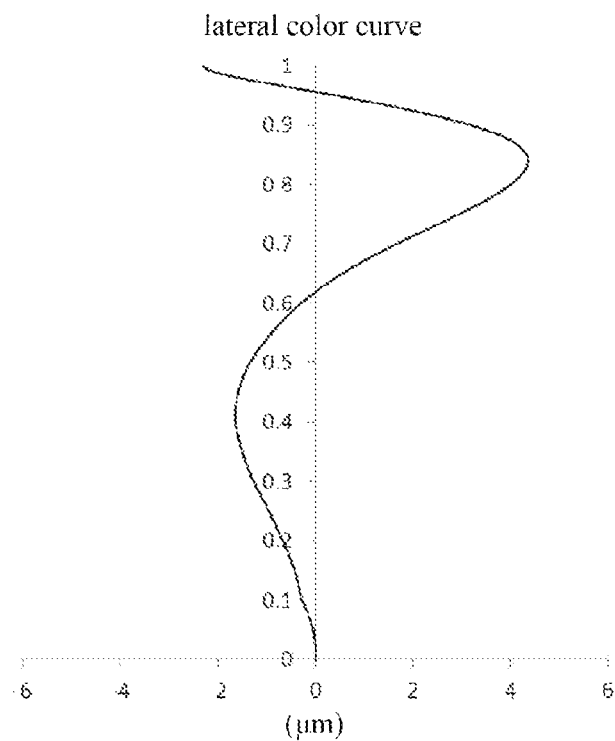
FIG. 6D illustrates a lateral color curve of the camera lens assembly according to Embodiment 3.

FIG. 6A illustrates a longitudinal aberration curve of the camera lens assembly according to Embodiment 3, representing deviations of focal points of light of different wavelengths converged after passing through an optical system. FIG. 6B illustrates an astigmatic curve of the camera lens assembly according to Embodiment 3, representing a curvature of a tangential image plane and a curvature of a sagittal image plane. FIG. 6C illustrates a distortion curve of the camera lens assembly according to Embodiment 3, representing amounts of distortion at different viewing angles. FIG. 6D illustrates a lateral color curve of the camera lens assembly according to Embodiment 3, representing deviations of different image heights on an image plane after light passes through the camera lens assembly. In summary, it can be seen from FIGS. 6A-6D that the camera lens assembly according to Embodiment 3 may obtain a good imaging effect in a situation of ensuring the miniaturization.

Embodiment 4

Figure 7:
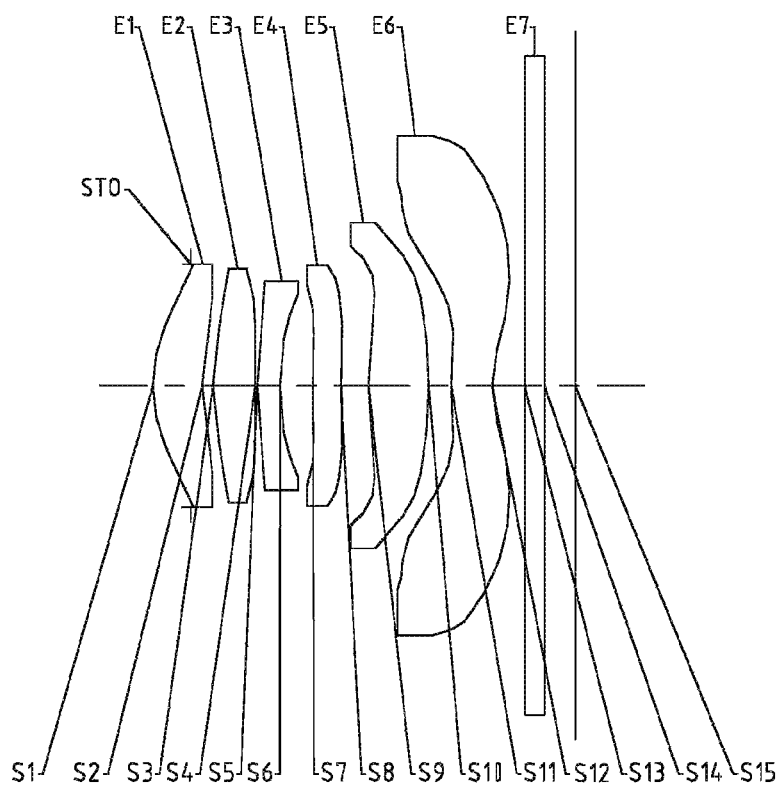
FIG. 7 is a schematic structural diagram illustrating a camera lens assembly according to Embodiment 4 of the present disclosure.

Embodiment 4 of the camera lens assembly according to the present disclosure is described below with reference to FIGS. 7-8D. FIG. 7 is a schematic structural diagram illustrating the camera lens assembly according to Embodiment 4 of the present disclosure. As shown in FIG. 7, the camera lens assembly according to Embodiment 4 includes the first to sixth lenses E1-E6 respectively having an object-side surface and an image-side surface.

Table 10 below shows the effective focal lengths f1-f6 of the lenses, the total effective focal length f of the camera lens assembly, the total track length TTL of the camera lens assembly and the half of the diagonal length ImgH of the effective pixel area on the image plane S15 of the camera lens assembly in Embodiment 4.

TABLE 10

| | | | |
|---|---|---|---|
| $f_1$(mm) | 8.07 | f(mm) | 3.62 |
| $f_2$(mm) | 4.61 | TTL(mm) | 4.50 |
| $f_3$(mm) | −7.64 | ImgH(mm) | 2.93 |
| $f_4$(mm) | −109.26 | | |
| $f_5$(mm) | 5.16 | | |
| $f_6$(mm) | −4.17 | | |

The total effective focal length f of the camera lens assembly is selected to be 3.62 mm. In this implementation, the diameter of the entrance pupil diameter EPD may be selected with the total effective focal length f of the camera lens assembly to satisfy: f/EPD=1.40.

Referring to Table 10, the total track length TTL from the object-side surface S1 of the first lens E1 to the image plane S15 and the half of the diagonal length ImgH of the effective pixel area on the image plane S15 satisfy: TTL/ImgH=1.40. The effective focal length $f_3$ of the third lens E3 and the total effective focal length f satisfy: $f_3/f=-2.11$. The effective focal length $f_5$ of the fifth lens E5 and the total effective focal length f satisfy: $f/f_5=0.70$. The effective focal length $f_6$ of the sixth lens and the total effective focal length f satisfy: $f/f_6=-0.87$. The effective focal length $f_1$ of the first lens E1 and the total effective focal length f satisfy: $f/f_1=0.45$. The effective focal length $f_2$ of the second lens E2 and the effective focal length $f_5$ of the fifth lens satisfy: $f_2/f_5=0.89$.

Table 11 shows the surface type, the radius of curvature, the center thickness, the material and the conic coefficient of each lens in this embodiment.

TABLE 11

| surface number | surface type | radius of curvature | thickness | material | conic coefficient |
|---|---|---|---|---|---|
| OBJ | spherical | infinite | infinite | | |
| STO | spherical | infinite | −0.4032 | | |
| S1 | aspheric | 1.5892 | 0.5251 | 1.55, 56.1 | −7.8433 |
| S2 | aspheric | 2.1945 | 0.1154 | | −16.8410 |
| S3 | aspheric | 2.4344 | 0.4518 | 1.55, 56.1 | −8.6727 |
| S4 | aspheric | 66.3110 | 0.0200 | | −99.0000 |
| S5 | aspheric | 6.4192 | 0.2400 | 1.67, 20.4 | 29.5985 |
| S6 | aspheric | 2.8004 | 0.3511 | | 1.9974 |
| S7 | aspheric | 8.2060 | 0.3000 | 1.67, 20.4 | 50.8270 |
| S8 | aspheric | 7.2689 | 0.2928 | | −18.6779 |
| S9 | aspheric | 5.3250 | 0.6414 | 1.55, 56.1 | −7.2713 |
| S10 | aspheric | −5.7292 | 0.2396 | | 0.0000 |
| S11 | aspheric | 2.4642 | 0.4353 | 1.55, 56.1 | −1.6474 |
| S12 | aspheric | 1.1094 | 0.3472 | | −5.6805 |
| S13 | spherical | infinite | 0.2100 | 1.52, 64.2 | |

TABLE 11-continued

| surface number | surface type | radius of curvature | thickness | material | conic coefficient |
|---|---|---|---|---|---|
| S14 | spherical | infinite | 0.3303 | | |
| S15 | spherical | infinite | | | |

Table 12 shows the high-order coefficients $A_4$, $A_6$, $A_8$, $A_{10}$, $A_{12}$, $A_{14}$ and $A_{16}$ applicable to the aspheric surfaces S1-S12 of the aspheric lenses in this embodiment.

TABLE 12

| surface number | A4 | A6 | A8 | A10 | A12 | A14 | A16 |
|---|---|---|---|---|---|---|---|
| S1 | 2.1262E−01 | −2.3221E−01 | 2.1803E−01 | −1.4324E−01 | 3.9807E−02 | −2.5484E−03 | 0.0000E+00 |
| S2 | 8.5040E−02 | −2.4754E−01 | 1.5832E−01 | −3.2717E−02 | 0.0000E+00 | 0.0000E+00 | 0.0000E+00 |
| S3 | −2.3318E−02 | −3.8953E−02 | −1.3650E−01 | 2.8139E−01 | −1.5034E−01 | 2.2761E−02 | 0.0000E+00 |
| S4 | 7.1306E−04 | −6.8770E−02 | 3.4468E−02 | 1.3337E−02 | −2.0601E−02 | 4.9266E−03 | 0.0000E+00 |
| S5 | −6.1371E−03 | −7.0296E−02 | 1.6084E−01 | −3.5469E−01 | 3.2358E−01 | −9.8333E−02 | 0.0000E+00 |
| S6 | −2.6763E−02 | 1.1625E−01 | −4.3942E−01 | 1.0599E+00 | −1.4723E+00 | 1.0577E+00 | −2.8217E−01 |
| S7 | −1.4012E−01 | 1.1109E−01 | −2.7653E−01 | 6.7515E−01 | −1.0339E+00 | 7.9761E−01 | −2.4694E−01 |
| S8 | −1.1139E−01 | −1.7119E−03 | 6.9682E−02 | −5.3533E−02 | −1.7327E−02 | 4.0858E−02 | −1.4866E−02 |
| S9 | 3.1008E−02 | −9.1595E−02 | 4.4894E−02 | 5.2609E−03 | −2.7437E−02 | 1.3065E−02 | −1.8567E−03 |
| S10 | −3.9916E−02 | 1.1001E−01 | −1.5282E−01 | 1.0656E−01 | −4.5005E−02 | 1.0204E−02 | −9.0480E−04 |
| S11 | −5.2866E−01 | 4.0018E−01 | −2.3573E−01 | 9.9243E−02 | −2.5034E−02 | 3.3471E−03 | −1.8314E−04 |
| S12 | −1.7857E−01 | 1.1587E−01 | −5.4822E−02 | 1.7196E−02 | −3.2735E−03 | 3.3630E−04 | −1.4192E−05 |

Referring to Table 11 and Table 12, the center thickness $CT_1$ of the first lens E1 and the center thickness $CT_2$ of the second lens E2 satisfy: $CT_1/CT_2=1.16$. The center thickness $CT_4$ of the fourth lens E4 and the center thickness $CT_6$ of the sixth lens E6 satisfy: $CT_4/CT_6=0.69$. The center thickness $CT_5$ of the fifth lens E5 and the center thickness $CT_6$ of the sixth lens E6 satisfy: $CT_6/CT_5=0.68$. The radius of curvature $R_1$ of the object-side surface S1 of the first lens E1 and the radius of curvature $R_2$ of the image-side surface S2 of the first lens E1 satisfy: $R_1/R_2=0.72$. The radius of curvature $R_3$ of the object-side surface S3 of the second lens E2 and the radius of curvature $R_6$ of the image-side surface S6 of the third lens E3 satisfy: $R_3/R_6=0.87$. The radius of curvature $R_{11}$ of the object-side surface S11 of the sixth lens E6 and the radius of curvature $R_{12}$ of the image-side surface S12 of the sixth lens E6 satisfy: $(R_{11}-R_{12})/(R_{11}+R_{12})=0.38$.

Figure 8A:
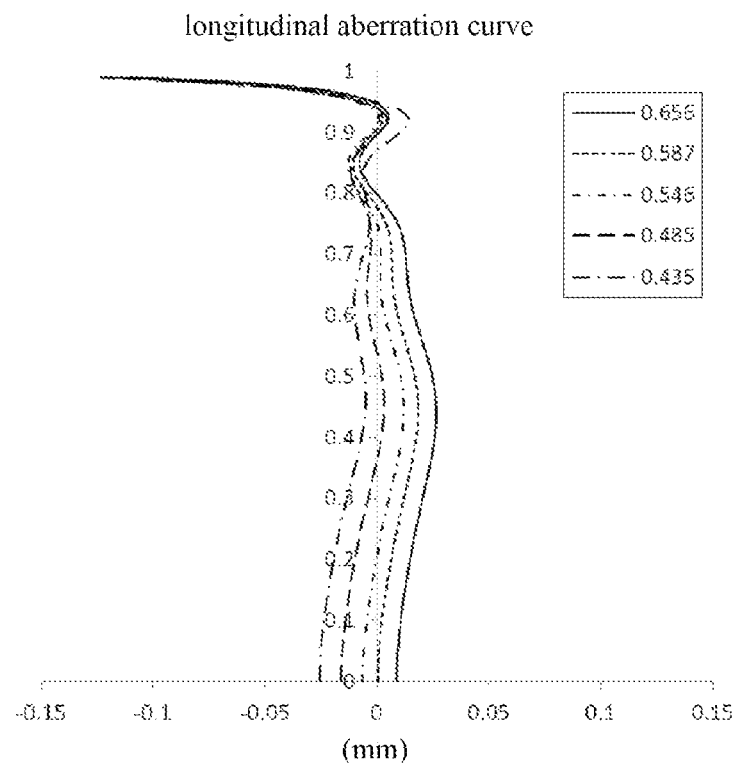
FIG. 8A illustrates a longitudinal aberration curve of the camera lens assembly according to Embodiment 4.
Figure 8B:
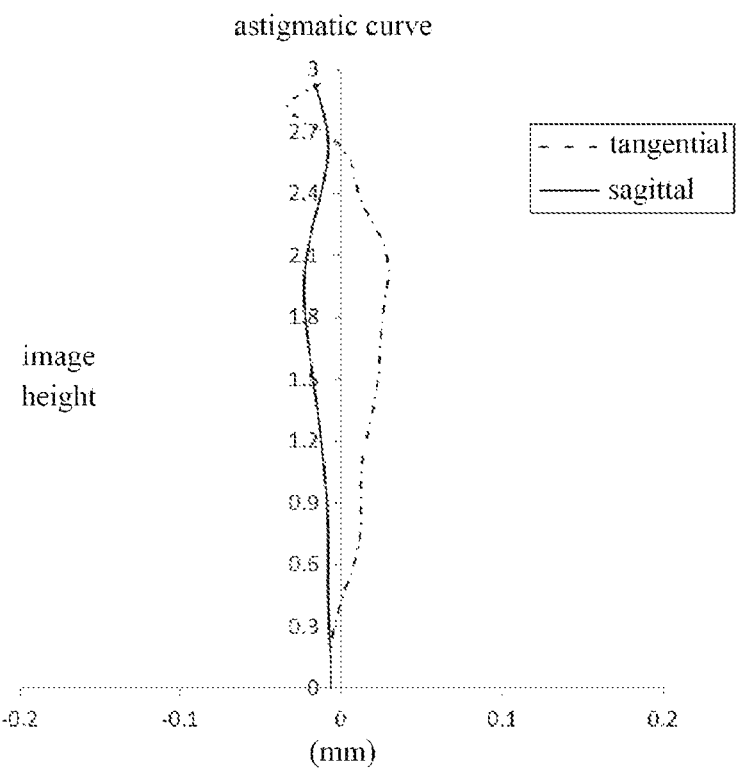
FIG. 8B illustrates an astigmatic curve of the camera lens assembly according to Embodiment 4.
Figure 8C:
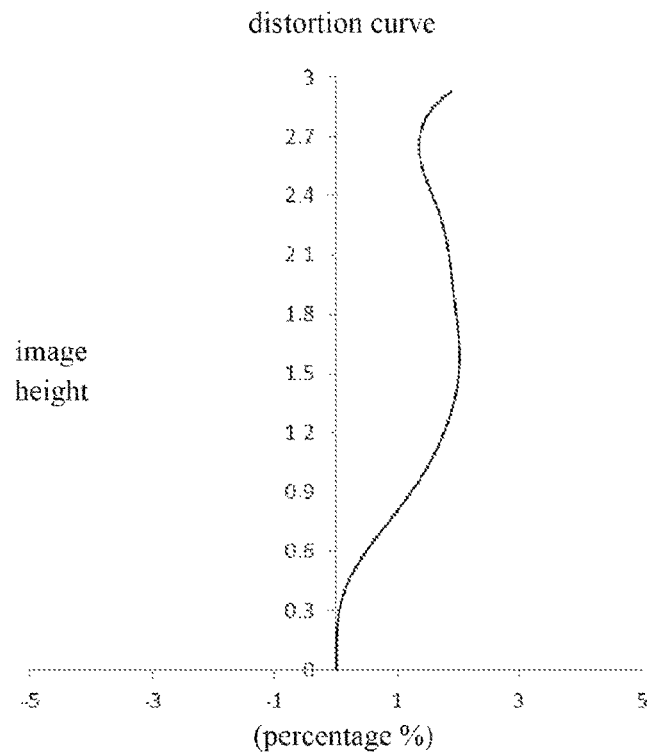
FIG. 8C illustrates a distortion curve of the camera lens assembly according to Embodiment 4.
Figure 8D:
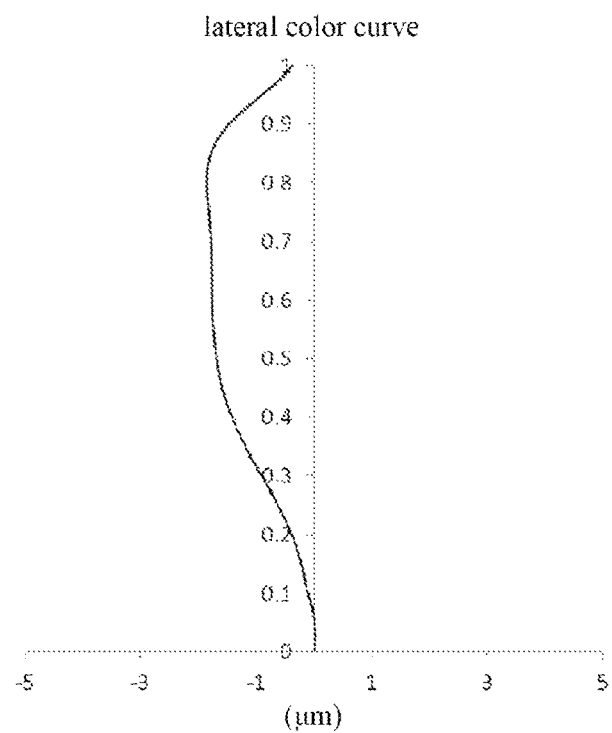
FIG. 8D illustrates a lateral color curve of the camera lens assembly according to Embodiment 4.

FIG. 8A illustrates a longitudinal aberration curve of the camera lens assembly according to Embodiment 4, representing deviations of focal points of light of different wavelengths converged after passing through an optical system. FIG. 8B illustrates an astigmatic curve of the camera lens assembly according to Embodiment 4, representing a curvature of a tangential image plane and a curvature of a sagittal image plane. FIG. 8C illustrates a distortion curve of the camera lens assembly according to Embodiment 4, representing amounts of distortion at different viewing angles. FIG. 8D illustrates a lateral color curve of the camera lens assembly according to Embodiment 4, representing deviations of different image heights on an image plane after light passes through the camera lens assembly. In summary, it can be seen from FIGS. 8A-8D that the camera lens assembly according to Embodiment 4 may obtain a good imaging effect in a situation of ensuring the miniaturization.

Embodiment 5

Figure 9:
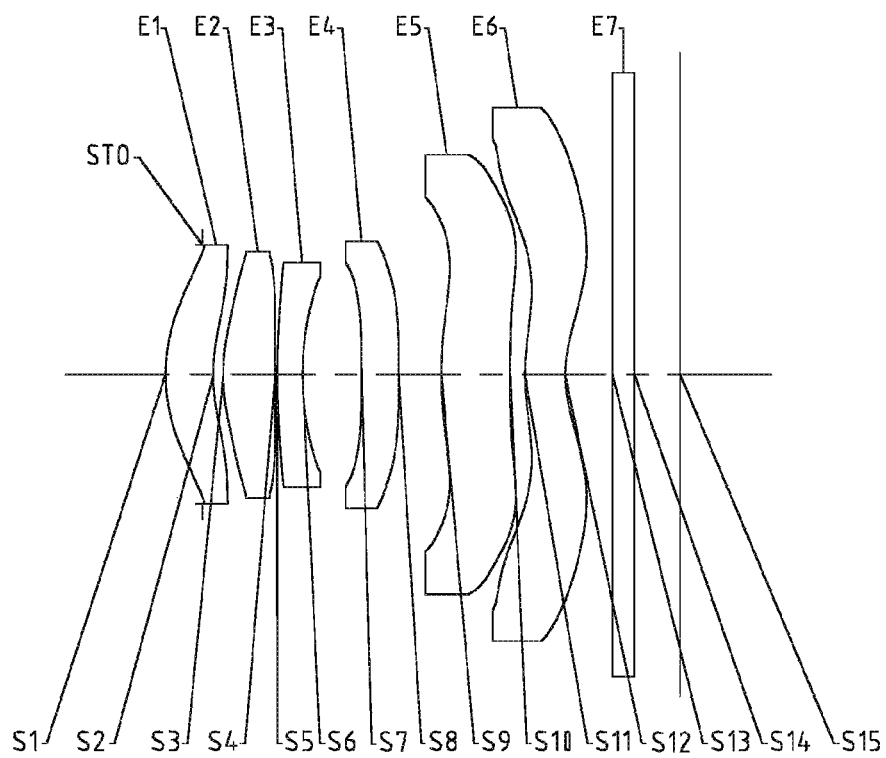
FIG. 9 is a schematic structural diagram illustrating a camera lens assembly according to Embodiment 5 of the present disclosure.

Embodiment 5 of the camera lens assembly according to the present disclosure is described below with reference to FIGS. 9-10D. FIG. 9 is a schematic structural diagram illustrating the camera lens assembly according to Embodiment 5 of the present disclosure. As shown in FIG. 9, the camera lens assembly according to Embodiment 5 includes the first to sixth lenses E1-E6 respectively having an object-side surface and an image-side surface.

Table 13 below shows the effective focal lengths f1-f6 of the lenses, the total effective focal length f of the camera lens assembly, the total track length TTL of the camera lens assembly and the half of the diagonal length ImgH of the effective pixel area on the image plane S15 of the camera lens assembly in Embodiment 5.

TABLE 13

| $f_1$(mm) | 15.29 | f(mm) | 4.19 |
|---|---|---|---|
| $f_2$(mm) | 3.62 | TTL(mm) | 4.95 |
| $f_3$(mm) | −6.95 | ImgH(mm) | 3.08 |
| $f_4$(mm) | −153.67 | | |
| $f_5$(mm) | 8.27 | | |
| $f_6$(mm) | −5.83 | | |

The total effective focal length f of the camera lens assembly is selected to be 4.19 mm. In this implementation, the diameter of the entrance pupil diameter EPD may be selected with the total effective focal length f of the camera lens assembly to satisfy: $f/EPD=1.69$.

Referring to Table 13, the total track length TTL from the object-side surface S1 of the first lens E1 to the image plane S15 and the half of the diagonal length ImgH of the effective pixel area on the image plane S15 satisfy: $TTL/ImgH=1.69$. The effective focal length $f_3$ of the third lens E3 and the total effective focal length f satisfy: $f_3/f=-1.66$. The effective focal length $f_5$ of the fifth lens E5 and the total effective focal length f satisfy: $f/f_5=0.51$. The effective focal length $f_6$ of the sixth lens and the total effective focal length f satisfy: $f/f_6=-0.72$. The effective focal length $f_1$ of the first lens E1 and the total effective focal length f satisfy: $f/f_1=0.27$. The effective focal length $f_2$ of the second lens E2 and the effective focal length $f_5$ of the fifth lens satisfy: $f_2/f_5=0.44$.

Table 14 shows the surface type, the radius of curvature, the center thickness, the material and the conic coefficient of each lens in this embodiment.

TABLE 14

| Surface number | Surface type | radius of curvature | thickness | material | Conic coefficient |
|---|---|---|---|---|---|
| OBJ | spherical | infinite | infinite | | |
| STO | spherical | infinite | −0.3548 | | |
| S1 | aspheric | 1.6755 | 0.4603 | 1.55, 56.1 | −9.3574 |
| S2 | aspheric | 1.8922 | 0.0942 | | −12.6499 |
| S3 | aspheric | 1.9469 | 0.4985 | 1.55, 56.1 | −5.2304 |

TABLE 14-continued

| Surface number | Surface type | radius of curvature | thickness | material | Conic coefficient |
|---|---|---|---|---|---|
| S4 | aspheric | 105.7840 | 0.0200 | | 99.0000 |
| S5 | aspheric | 6.6084 | 0.2437 | 1.67, 20.4 | 30.5031 |
| S6 | aspheric | 2.6861 | 0.5676 | | −11.0603 |
| S7 | aspheric | −28.4489 | 0.3580 | 1.67, 20.4 | −99.0000 |
| S8 | aspheric | −39.5489 | 0.4102 | | −99.0000 |
| S9 | aspheric | 4.5182 | 0.6626 | 1.55, 56.1 | 2.0194 |
| S10 | aspheric | infinite | 0.1403 | | 0.0000 |
| S11 | aspheric | 2.0492 | 0.3870 | 1.55, 56.1 | −1.7742 |
| S12 | aspheric | 1.1642 | 0.4569 | | −4.6097 |
| S13 | spherical | infinite | 0.2100 | 1.52, 64.2 | |
| S14 | spherical | infinite | 0.4400 | | |
| S15 | spherical | infinite | | | |

Table 15 shows the high-order coefficients $A_4$, $A_6$, $A_8$, $A_{10}$, $A_{12}$, $A_{14}$ and $A_{16}$ applicable to the aspheric surfaces S1-S12 of the aspheric lenses in this embodiment.

TABLE 15

| surface number | A4 | A6 | A8 | A10 | A12 | A14 | A16 |
|---|---|---|---|---|---|---|---|
| S1 | 2.1571E−01 | −2.9551E−01 | 3.4320E−01 | −2.9290E−01 | 1.3190E−01 | −2.3351E−02 | 0.0000E+00 |
| S2 | 1.0747E−01 | −3.5371E−01 | 2.6941E−01 | −6.6671E−02 | 0.0000E+00 | 0.0000E+00 | 0.0000E+00 |
| S3 | 1.1203E−02 | −8.6778E−02 | −1.6050E−01 | 3.8597E−01 | −2.2231E−01 | 3.5668E−02 | 0.0000E+00 |
| S4 | 2.8125E−02 | −1.5560E−01 | 1.9979E−01 | −1.3264E−01 | 3.7573E−02 | −3.7275E−03 | 0.0000E+00 |
| S5 | −3.7980E−02 | −8.6519E−02 | 2.5509E−01 | −3.6593E−01 | 2.4537E−01 | −5.8941E−02 | 0.0000E+00 |
| S6 | 3.5300E−02 | −3.1999E−02 | 2.3818E−01 | −6.0338E−01 | 7.9363E−01 | −5.3196E−01 | 1.5874E−01 |
| S7 | −9.1126E−02 | −1.3433E−02 | 4.5264E−02 | 1.5632E−03 | −1.2897E−01 | 1.5149E−01 | −5.8013E−02 |
| S8 | −8.6111E−02 | −8.3967E−02 | 2.2980E−01 | −2.7410E−01 | 1.8765E−01 | −6.6204E−02 | 8.9178E−03 |
| S9 | 4.9445E−02 | −1.5397E−01 | 1.0833E−01 | −4.6839E−02 | 9.9180E−03 | −6.1760E−05 | −2.0620E−04 |
| S10 | 1.4749E−01 | −1.5839E−01 | 7.8615E−02 | −2.4766E−02 | 4.2600E−03 | −2.5013E−04 | −9.1906E−06 |
| S11 | −2.7675E−01 | 1.4002E−01 | −5.4719E−02 | 1.6171E−02 | −3.0421E−03 | 3.2098E−04 | −1.4797E−05 |
| S12 | −1.5863E−01 | 8.7255E−02 | −3.9819E−02 | 1.2660E−02 | −2.4004E−03 | 2.4046E−04 | −9.7909E−06 |

Referring to Table 14 and Table 15, the center thickness $CT_1$ of the first lens E1 and the center thickness $CT_2$ of the second lens E2 satisfy: $CT_1/CT_2=0.92$. The center thickness $CT_4$ of the fourth lens E4 and the center thickness $CT_6$ of the sixth lens E6 satisfy: $CT_4/CT_6=0.92$. The center thickness $CT_5$ of the fifth lens E5 and the center thickness $CT_6$ of the sixth lens E6 satisfy: $CT_6/CT_5=0.58$. The radius of curvature $R_1$ of the object-side surface S1 of the first lens E1 and the radius of curvature $R_2$ of the image-side surface S2 of the first lens E1 satisfy: $R_1/R_2=0.89$. The radius of curvature $R_3$ of the object-side surface S3 of the second lens E2 and the radius of curvature $R_6$ of the image-side surface S6 of the third lens E3 satisfy: $R_3/R_6=0.72$. The radius of curvature $R_{11}$ of the object-side surface S11 of the sixth lens E6 and the radius of curvature $R_{12}$ of the image-side surface S12 of the sixth lens E6 satisfy: $(R_{11}-R_{12})/(R_{11}+R_{12})=0.28$.

Figure 10A:
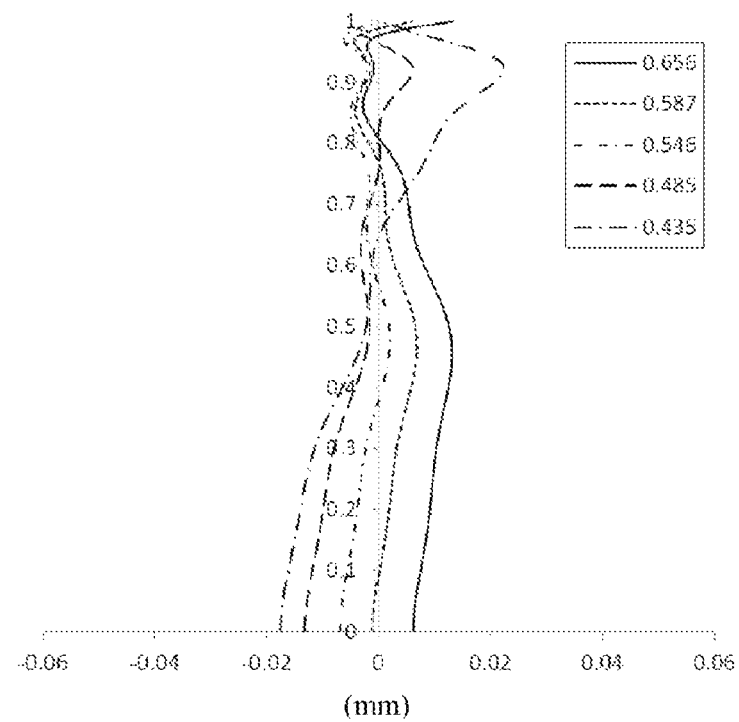
FIG. 10A illustrates a longitudinal aberration curve of the camera lens assembly according to Embodiment 5.
Figure 10B:
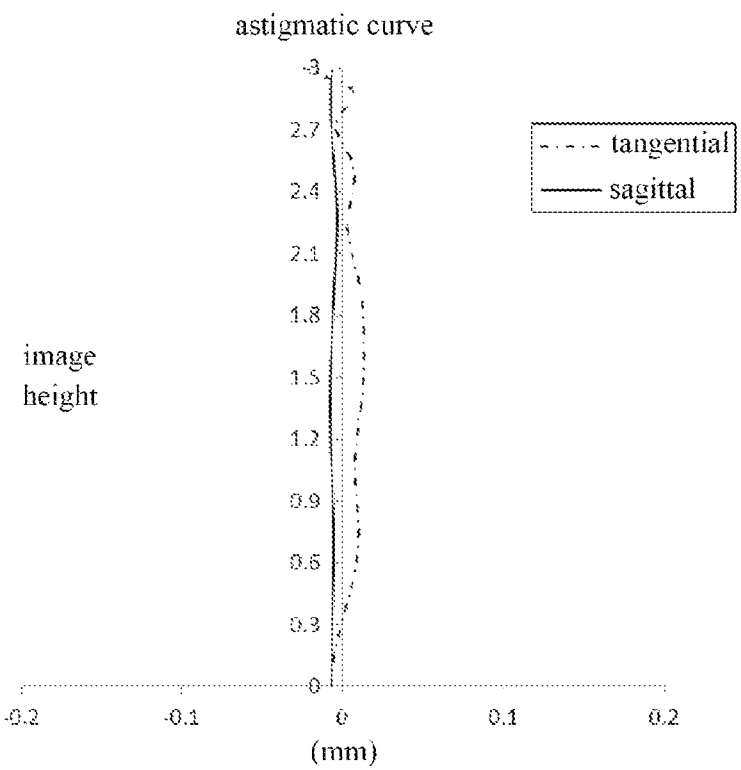
FIG. 10B illustrates an astigmatic curve of the camera lens assembly according to Embodiment 5.
Figure 10C:
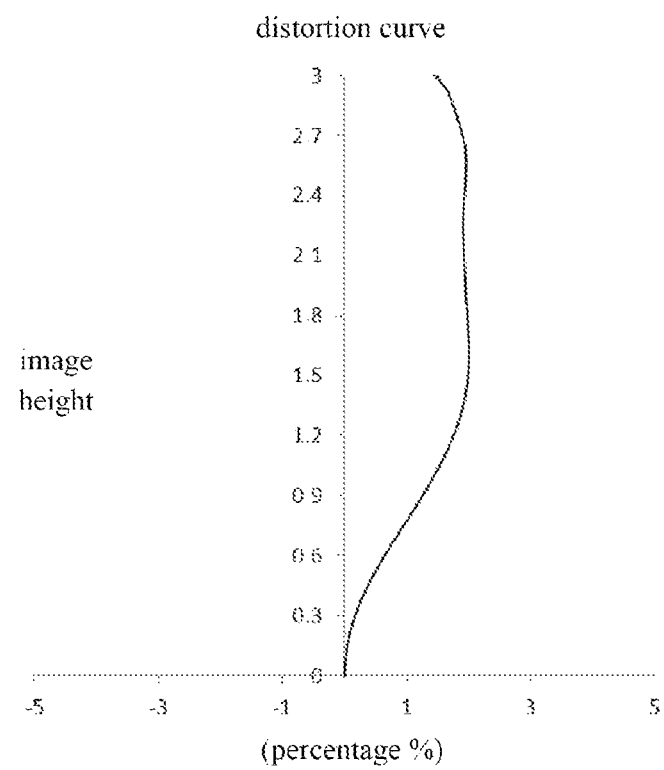
FIG. 10C illustrates a distortion curve of the camera lens assembly according to Embodiment 5.
Figure 10D:
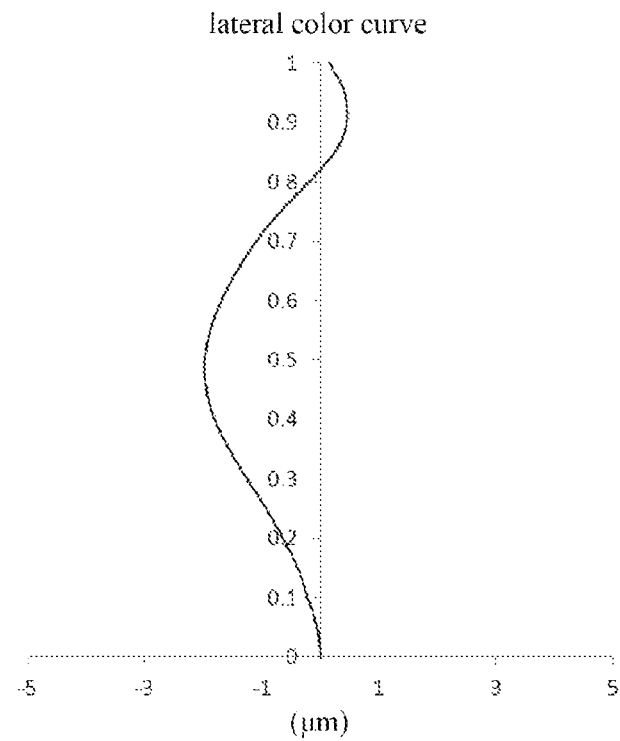
FIG. 10D illustrates a lateral color curve of the camera lens assembly according to Embodiment 5.

FIG. 10A illustrates a longitudinal aberration curve of the camera lens assembly according to Embodiment 5, representing deviations of focal points of light of different wavelengths converged after passing through an optical system. FIG. 10B illustrates an astigmatic curve of the camera lens assembly according to Embodiment 5, representing a curvature of a tangential image plane and a curvature of a sagittal image plane. FIG. 10C illustrates a distortion curve of the camera lens assembly according to Embodiment 5, representing amounts of distortion at different viewing angles. FIG. 10D illustrates a lateral color curve of the camera lens assembly according to Embodiment 5, representing deviations of different image heights on an image plane after light passes through the camera lens assembly. In summary, it can be seen from FIGS. 10A-10D that the camera lens assembly according to Embodiment 5 may obtain a good imaging effect in a situation of ensuring the miniaturization.

Embodiment 6

Figure 11:
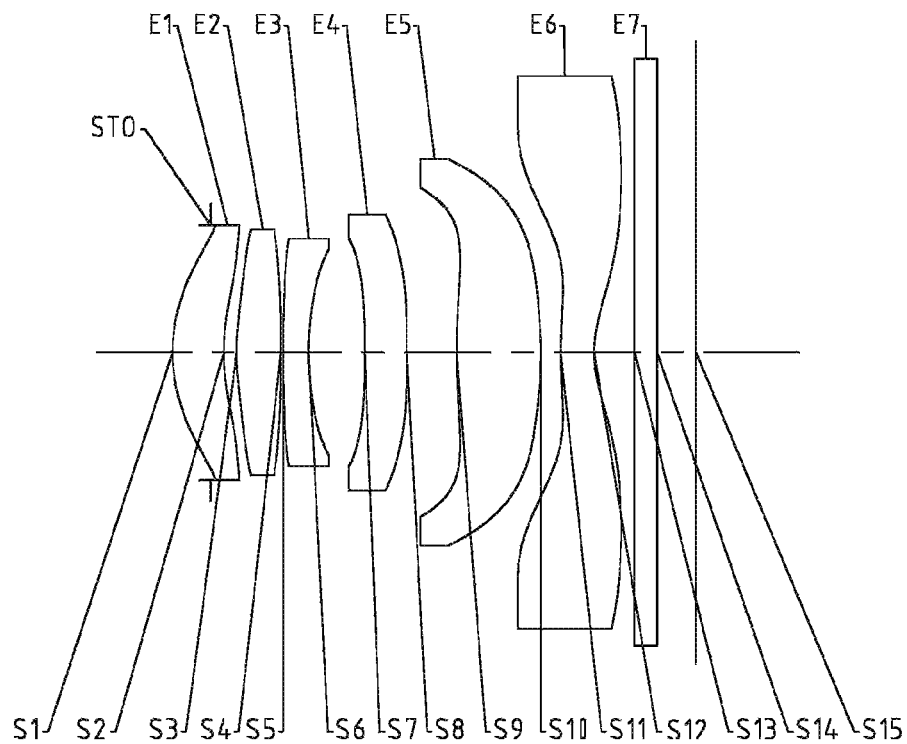
FIG. 11 is a schematic structural diagram illustrating a camera lens assembly according to Embodiment 6 of the present disclosure.

Embodiment 6 of the camera lens assembly according to the present disclosure is described below with reference to FIGS. 11-12D. FIG. 11 is a schematic structural diagram illustrating the camera lens assembly according to Embodiment 6 of the present disclosure. As shown in FIG. 11, the camera lens assembly according to Embodiment 6 includes the first to sixth lenses E1-E6 respectively having an object-side surface and an image-side surface.

Table 16 below shows the effective focal lengths f1-f6 of the lenses, the total effective focal length f of the camera lens assembly, the total track length TTL of the camera lens assembly and the half of the diagonal length ImgH of the effective pixel area on the image plane S15 of the camera lens assembly in Embodiment 6.

TABLE 16

| $f_1$(mm) | 8.47 | f(mm) | 4.02 |
|---|---|---|---|
| $f_2$(mm) | 4.02 | TTL(mm) | 4.89 |
| $f_3$(mm) | −6.33 | ImgH(mm) | 2.90 |
| $f_4$(mm) | −91.30 | | |
| $f_5$(mm) | 4.30 | | |
| $f_6$(mm) | −3.22 | | |

The total effective focal length f of the camera lens assembly is selected to be 4.02 mm. In this implementation, the diameter of the entrance pupil diameter EPD may be selected with the total effective focal length f of the camera lens assembly to satisfy: $f/EPD=1.69$.

Referring to Table 16, the total track length TTL from the object-side surface S1 of the first lens E1 to the image plane S15 and the half of the diagonal length ImgH of the effective pixel area on the image plane S15 satisfy: $TTL/ImgH=1.69$. The effective focal length $f_3$ of the third lens E3 and the total effective focal length f satisfy: $f_3/f=-1.57$. The effective focal length $f_5$ of the fifth lens E5 and the total effective focal length f satisfy: $f/f_5=0.93$. The effective focal length $f_6$ of the sixth lens and the total effective focal length f satisfy: $f/f_6=-1.25$. The effective focal length $f_1$ of the first lens E1 and the total effective focal length f satisfy: $f/f_1=0.47$. The effective focal length $f_2$ of the second lens E2 and the effective focal length $f_5$ of the fifth lens E5 satisfy: $f_2/f_5=0.93$.

Table 17 shows the surface type, the radius of curvature, the center thickness, the material and the conic coefficient of each lens in this embodiment.

TABLE 17

| surface number | surface type | radius of curvature | thickness | material | conic coefficient |
|---|---|---|---|---|---|
| OBJ | spherical | infinite | infinite | | |
| STO | spherical | infinite | −0.3537 | | |
| S1 | aspheric | 1.6134 | 0.4799 | 1.55, 56.1 | −7.4617 |
| S2 | aspheric | 2.2167 | 0.1191 | | −8.0968 |
| S3 | aspheric | 2.9510 | 0.4127 | 1.70, 53.2 | −7.8129 |
| S4 | aspheric | −50.6934 | 0.0200 | | −81.6974 |
| S5 | aspheric | 9.6175 | 0.2400 | 1.67, 20.4 | 69.4258 |
| S6 | aspheric | 2.9071 | 0.5233 | | −8.7518 |
| S7 | aspheric | −14.8621 | 0.3951 | 1.67, 20.4 | 97.4244 |
| S8 | aspheric | −19.8574 | 0.4659 | | 99.0000 |
| S9 | aspheric | 6.7303 | 0.7884 | 1.55, 56.1 | −41.0479 |
| S10 | aspheric | −3.4611 | 0.1843 | | 0.0000 |
| S11 | aspheric | 3.0027 | 0.3116 | 1.55, 56.1 | −53.6366 |
| S12 | aspheric | 1.0681 | 0.3797 | | −5.7406 |
| S13 | spherical | infinite | 0.2100 | 1.52, 64.2 | |
| S14 | spherical | infinite | 0.3634 | | |
| S15 | spherical | infinite | | | |

Table 18 shows the high-order coefficients $A_4$, $A_6$, $A_8$, $A_{10}$, $A_{12}$, $A_{14}$ and $A_{16}$ applicable to the aspheric surfaces S1-S12 of the aspheric lenses in this embodiment.

TABLE 18

| surface number | A4 | A6 | A8 | A10 | A12 | A14 | A16 |
|---|---|---|---|---|---|---|---|
| S1 | 2.0362E−01 | −2.0936E−01 | 1.9264E−01 | −1.2176E−01 | 2.8163E−02 | 0.0000E+00 | 0.0000E+00 |
| S2 | 3.2682E−02 | −1.2982E−01 | 9.6800E−03 | 6.3973E−02 | −2.3086E−02 | 0.0000E+00 | 0.0000E+00 |
| S3 | −1.4265E−02 | −8.4748E−02 | −5.3072E−02 | 2.1970E−01 | −1.3880E−01 | 2.6512E−02 | 0.0000E+00 |
| S4 | −9.2427E−02 | 8.5162E−02 | 5.7113E−02 | −1.6685E−01 | 1.0573E−01 | −2.1740E−02 | 0.0000E+00 |
| S5 | −1.0913E−01 | 1.6123E−01 | 1.1795E−01 | −5.1866E−01 | 4.4651E−01 | −1.2247E−01 | 0.0000E+00 |
| S6 | 2.5796E−02 | 1.9937E−02 | 1.6256E−01 | −5.0539E−01 | 6.7948E−01 | −4.4557E−01 | 1.3523E−01 |
| S7 | −8.4372E−02 | 8.5616E−03 | 2.5136E−02 | −3.1947E−02 | −1.4227E−02 | 4.1367E−02 | −2.1033E−02 |
| S8 | −8.5224E−02 | 4.1471E−03 | 4.2059E−02 | −4.9234E−02 | 3.0148E−02 | −8.1953E−03 | 3.5630E−04 |
| S9 | 1.1904E−02 | −6.8191E−02 | 2.6457E−02 | −4.6326E−04 | −6.9459E−03 | 2.4688E−03 | −2.3845E−04 |
| S10 | 1.2407E−01 | −1.4655E−01 | 6.8235E−02 | −1.7742E−02 | 1.8394E−03 | 5.6371E−05 | −1.5933E−05 |
| S11 | −1.6319E−01 | 1.7212E−02 | 2.3457E−02 | −9.8900E−03 | 1.7281E−03 | −1.4558E−04 | 4.8255E−06 |
| S12 | −1.1820E−01 | 5.1571E−02 | −1.2928E−02 | 2.0351E−03 | −2.0694E−04 | 1.2922E−05 | −3.8470E−07 |

Referring to Table 17 and Table 18, the center thickness $CT_1$ of the first lens E1 and the center thickness $CT_2$ of the second lens E2 satisfy: $CT_1/CT_2=1.16$. The center thickness $CT_4$ of the fourth lens E4 and the center thickness $CT_6$ of the sixth lens E6 satisfy: $CT_4/CT_6=1.27$. The center thickness $CT_5$ of the fifth lens E5 and the center thickness $CT_6$ of the sixth lens E6 satisfy: $CT_6/CT_5=0.40$. The radius of curvature $R_1$ of the object-side surface S1 of the first lens E1 and the radius of curvature $R_2$ of the image-side surface S2 of the first lens E1 satisfy: $R_1/R_2=0.73$. The radius of curvature $R_3$ of the object-side surface S3 of the second lens E2 and the radius of curvature $R_6$ of the image-side surface S6 of the third lens E3 satisfy: $R_3/R_6=1.02$. The radius of curvature $R_{11}$ of the object-side surface S11 of the sixth lens E6 and the radius of curvature $R_{12}$ of the image-side surface S12 of the sixth lens E6 satisfy: $(R_{11}-R_{12})/(R_{11}+R_{12})=0.48$.

Figure 12A:
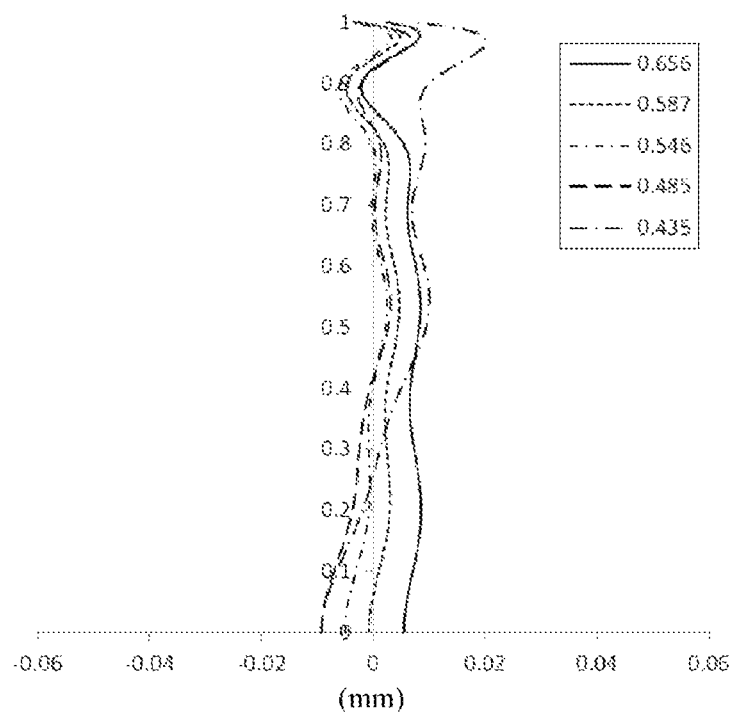
FIG. 12A illustrates a longitudinal aberration curve of the camera lens assembly according to Embodiment 6.
Figure 12B:
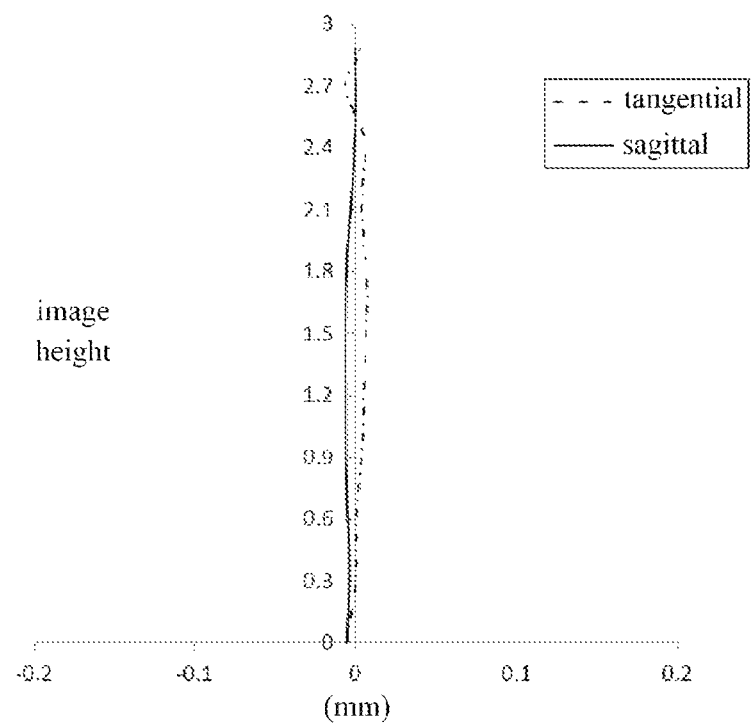
FIG. 12B illustrates an astigmatic curve of the camera lens assembly according to Embodiment 6.
Figure 12C:
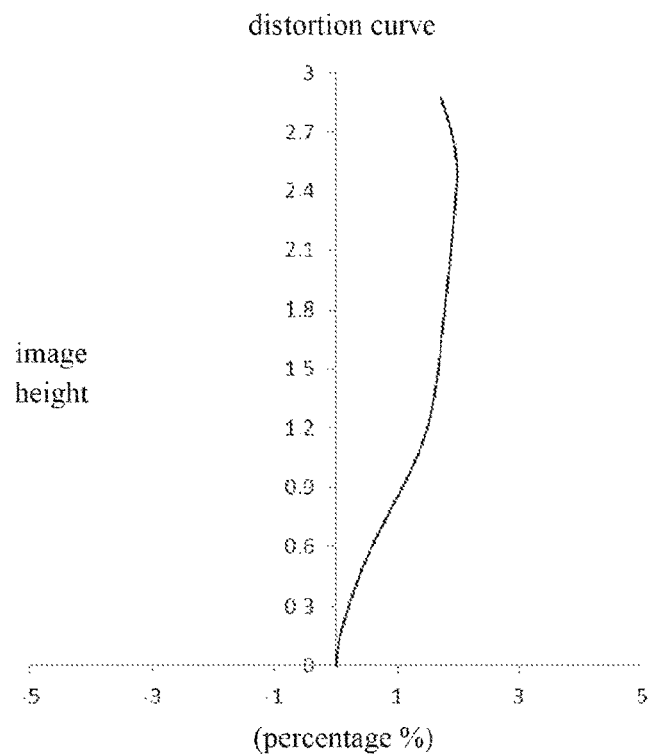
FIG. 12C illustrates a distortion curve of the camera lens assembly according to Embodiment 6.
Figure 12D:
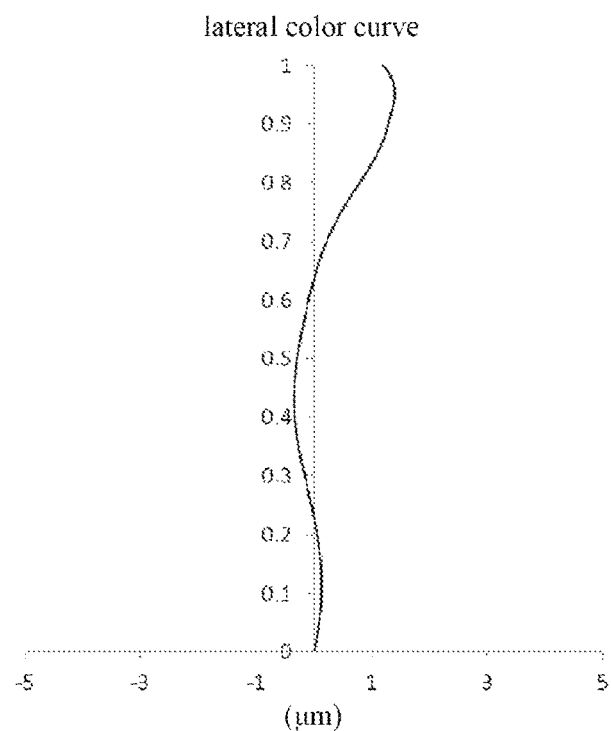
FIG. 12D illustrates a lateral color curve of the camera lens assembly according to Embodiment 6.

FIG. 12A illustrates a longitudinal aberration curve of the camera lens assembly according to Embodiment 6, representing deviations of focal points of light of different wavelengths converged after passing through an optical system. FIG. 12B illustrates an astigmatic curve of the camera lens assembly according to Embodiment 6, representing a curvature of a tangential image plane and a curvature of a sagittal image plane. FIG. 12C illustrates a distortion curve of the camera lens assembly according to Embodiment 6, representing amounts of distortion at different viewing angles. FIG. 12D illustrates a lateral color curve of the camera lens assembly according to Embodiment 6, representing deviations of different image heights on an image plane after light passes through the camera lens assembly. In summary, it can be seen from FIGS. 12A-12D that the camera lens assembly according to Embodiment 6 may obtain a good imaging effect in a situation of ensuring the miniaturization.

Embodiment 7

Figure 13:
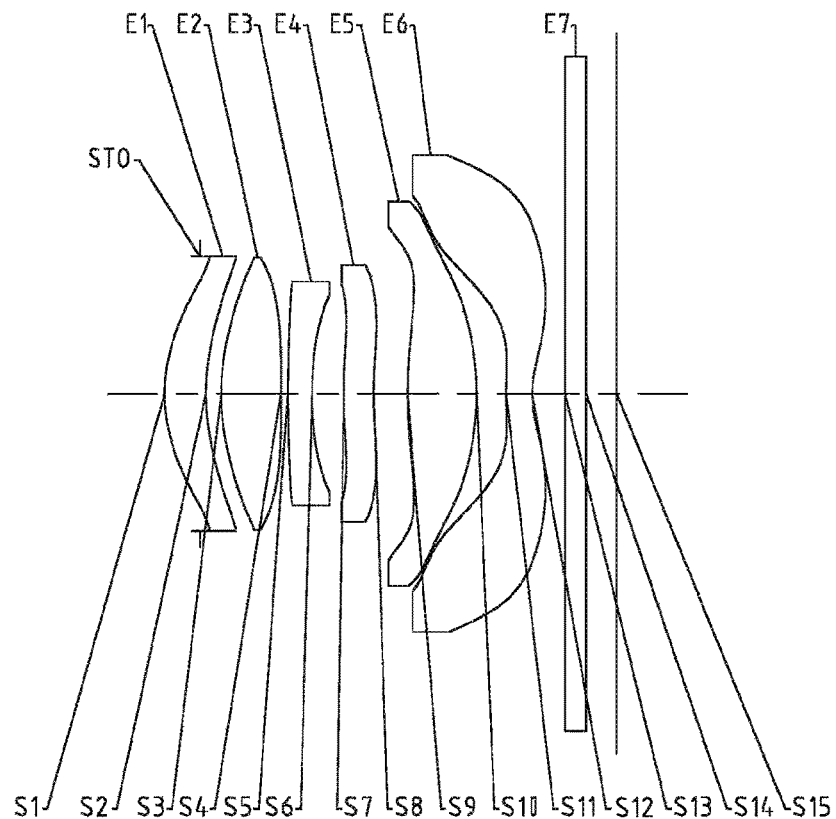
FIG. 13 is a schematic structural diagram illustrating a camera lens assembly according to Embodiment 7 of the present disclosure.

Embodiment 7 of the camera lens assembly according to the present disclosure is described below with reference to FIGS. 13-14D. FIG. 13 is a schematic structural diagram illustrating the camera lens assembly according to Embodiment 7 of the present disclosure. As shown in FIG. 13, the camera lens assembly according to Embodiment 7 includes the first to sixth lenses E1-E6 respectively having an object-side surface and an image-side surface.

Table 19 below shows the effective focal lengths f1-f6 of the lenses, the total effective focal length f of the camera lens assembly, the total track length TTL of the camera lens assembly and the half of the diagonal length ImgH of the effective pixel area on the image plane S15 of the camera lens assembly in Embodiment 7.

TABLE 19

| $f_1$(mm) | 9.74 | f(mm) | 3.57 |
|---|---|---|---|
| $f_2$(mm) | 4.47 | TTL(mm) | 4.50 |
| $f_3$(mm) | −7.98 | ImgH(mm) | 2.93 |
| $f_4$(mm) | 1065.02 | | |
| $f_5$(mm) | 3.26 | | |
| $f_6$(mm) | −2.51 | | |

The total effective focal length f of the camera lens assembly is selected to be 3.57 mm. In this implementation, the diameter of the entrance pupil diameter EPD may be selected with the total effective focal length f of the camera lens assembly to satisfy: f/EPD=1.31.

Referring to Table 19, the total track length TTL from the object-side surface S1 of the first lens E1 to the image plane S15 and the half of the diagonal length ImgH of the effective pixel area on the image plane S15 satisfy: TTL/ImgH=1.31. The effective focal length $f_3$ of the third lens E3 and the total effective focal length f satisfy: $f_3/f=-2.23$. The effective focal length $f_5$ of the fifth lens E5 and the total effective focal length f satisfy: $f/f_5=1.09$. The effective focal length $f_6$ of the sixth lens and the total effective focal length f satisfy: $f/f_6=-1.42$. The effective focal length $f_1$ of the first lens E1 and the total effective focal length f satisfy: $f/f_1=0.37$. The effective focal length $f_2$ of the second lens E2 and the effective focal length $f_5$ of the fifth lens satisfy: $f_2/f_5=1.37$.

Table 20 shows the surface type, the radius of curvature, the center thickness, the material and the conic coefficient of each lens in this embodiment.

TABLE 20

| surface number | surface type | radius of curvature | thickness | material | conic coefficient |
|---|---|---|---|---|---|
| OBJ | spherical | infinite | infinite | | |
| STO | spherical | infinite | −0.3505 | | |
| S1 | aspheric | 1.7121 | 0.4118 | 1.55, 56.1 | −4.0217 |
| S2 | aspheric | 2.3089 | 0.1531 | | −5.2410 |
| S3 | aspheric | 2.3803 | 0.5946 | 1.55, 56.1 | −5.0022 |
| S4 | aspheric | 82.8523 | 0.0651 | | 99.0000 |
| S5 | aspheric | 9.2376 | 0.2400 | 1.67, 20.4 | 30.0530 |
| S6 | aspheric | 3.3452 | 0.3175 | | 6.3817 |
| S7 | aspheric | 4.3423 | 0.3000 | 1.67, 20.4 | −99.0000 |
| S8 | aspheric | 4.2480 | 0.3366 | | −21.7232 |
| S9 | aspheric | 5.4118 | 0.6912 | 1.55, 56.1 | −37.8851 |
| S10 | aspheric | −2.5409 | 0.2938 | | 0.0000 |
| S11 | aspheric | 3.7377 | 0.2590 | 1.55, 56.1 | −0.7262 |
| S12 | aspheric | 0.9778 | 0.3221 | | −6.7572 |
| S13 | spherical | infinite | 0.2100 | 1.52, 64.2 | |
| S14 | spherical | infinite | 0.3052 | | |
| S15 | spherical | infinite | | | |

Table 21 shows the high-order coefficients $A_4$, $A_6$, $A_8$, $A_{10}$, $A_{12}$, $A_{14}$ and $A_{16}$ applicable to the aspheric surfaces S1-S12 of the aspheric lenses in this embodiment.

TABLE 21

| surface number | A4 | A6 | A8 | A10 | A12 | A14 | A16 |
|---|---|---|---|---|---|---|---|
| S1 | 7.2814E−02 | −2.0392E−02 | −2.4482E−02 | 3.9197E−02 | −2.6431E−02 | 5.7520E−03 | 0.0000E+00 |
| S2 | −1.6138E−03 | −7.4411E−05 | 1.4807E−06 | −4.5526E−09 | 0.0000E+00 | 0.0000E+00 | 0.0000E+00 |
| S3 | −1.3211E−03 | −1.2803E−03 | 1.1458E−03 | −6.7174E−03 | 1.4194E−03 | −1.0437E−04 | 0.0000E+00 |
| S4 | −1.5944E−01 | 2.8828E−01 | −3.9975E−01 | 2.8641E−01 | −9.9606E−02 | 1.3064E−02 | 0.0000E+00 |
| S5 | −1.6232E−01 | 4.4640E−01 | −6.4412E−01 | 4.4884E−01 | −1.2832E−01 | 8.3391E−03 | 0.0000E+00 |
| S6 | −8.8903E−02 | 3.1048E−01 | −5.1546E−01 | 5.2320E−01 | −3.7464E−01 | 1.7773E−01 | −3.5717E−02 |
| S7 | −4.7718E−02 | −5.5925E−02 | 7.1818E−02 | 1.0843E−01 | −3.5852E−01 | 3.1454E−01 | −9.6696E−02 |
| S8 | −1.2860E−01 | 5.0599E−02 | −6.2675E−03 | −3.5995E−03 | −1.8871E−02 | 1.9280E−02 | −5.0733E−03 |
| S9 | 4.8055E−02 | −9.9529E−02 | 5.6328E−02 | −2.9915E−03 | −1.6182E−02 | 7.1634E−03 | −8.9316E−04 |
| S10 | 7.2756E−02 | −8.6325E−02 | 4.3771E−02 | −1.2925E−02 | 3.9540E−03 | −9.1541E−04 | 8.1803E−05 |
| S11 | −7.7515E−01 | 6.8771E−01 | −4.6253E−01 | 2.2127E−01 | −6.3194E−02 | 9.4971E−03 | −5.8077E−04 |
| S12 | −2.7271E−01 | 1.9681E−01 | −9.0041E−02 | 2.6307E−02 | −4.6893E−03 | 4.4824E−04 | −1.7365E−05 |

Referring to Table 20 and Table 21, the center thickness $CT_1$ of the first lens E1 and the center thickness $CT_2$ of the second lens E2 satisfy: $CT_1/CT_2=0.69$. The center thickness $CT_4$ of the fourth lens E4 and the center thickness $CT_6$ of the sixth lens E6 satisfy: $CT_4/CT_6=1.16$. The center thickness $CT_5$ of the fifth lens E5 and the center thickness $CT_6$ of the sixth lens E6 satisfy: $CT_6/CT_5=0.37$. The radius of curvature $R_1$ of the object-side surface S1 of the first lens E1 and the radius of curvature $R_2$ of the image-side surface S2 of the first lens E1 satisfy: $R_1/R_2=0.74$. The radius of curvature $R_3$ of the object-side surface S3 of the second lens E2 and the radius of curvature $R_6$ of the image-side surface S6 of the third lens E3 satisfy: $R_3/R_6=0.71$. The radius of curvature $R_{11}$ of the object-side surface S11 of the sixth lens E6 and the radius of curvature $R_{12}$ of the image-side surface S12 of the sixth lens E6 satisfy: $(R_{11}-R_{12})/(R_{11}+R_{12})=0.59$.

Figure 14A:
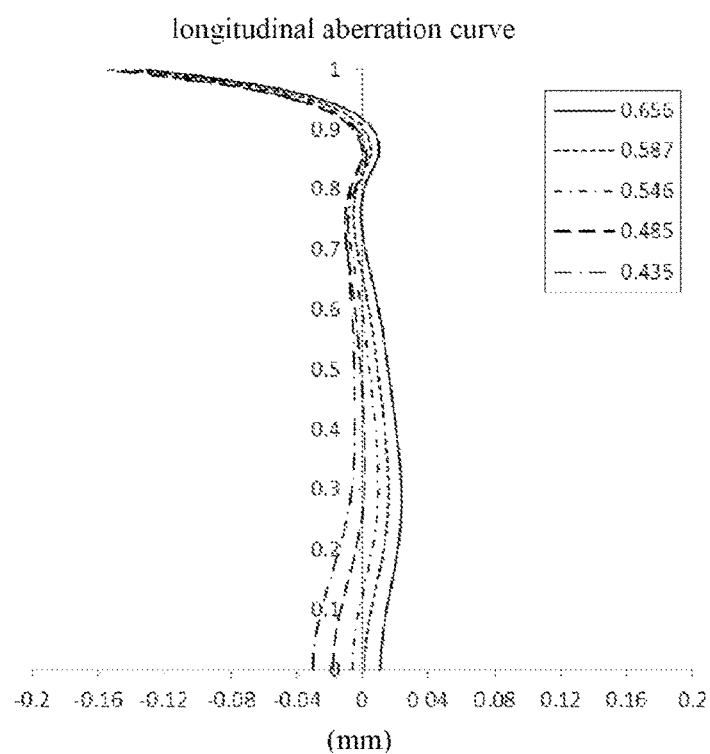
FIG. 14A illustrates a longitudinal aberration curve of the camera lens assembly according to Embodiment 7.
Figure 14B:
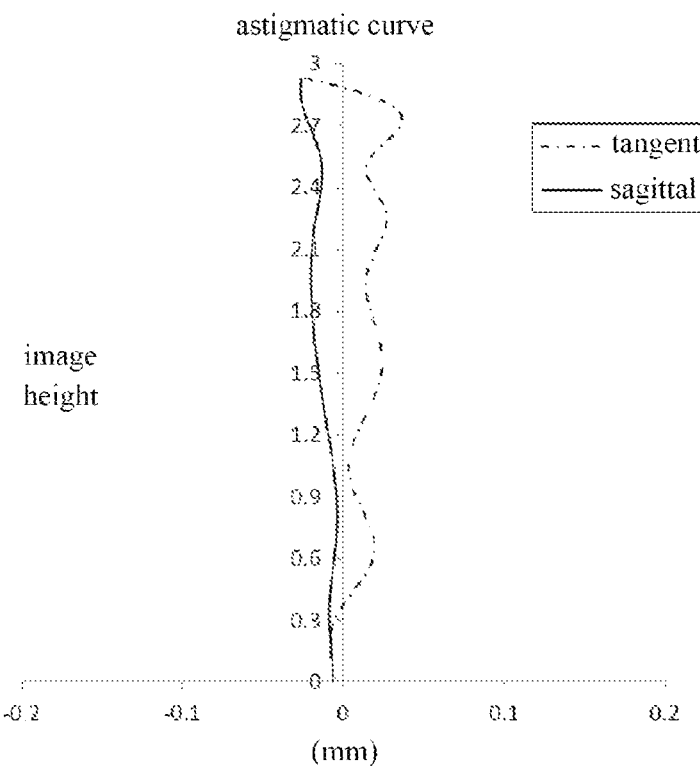
FIG. 14B illustrates an astigmatic curve of the camera lens assembly according to Embodiment 7.
Figure 14C:
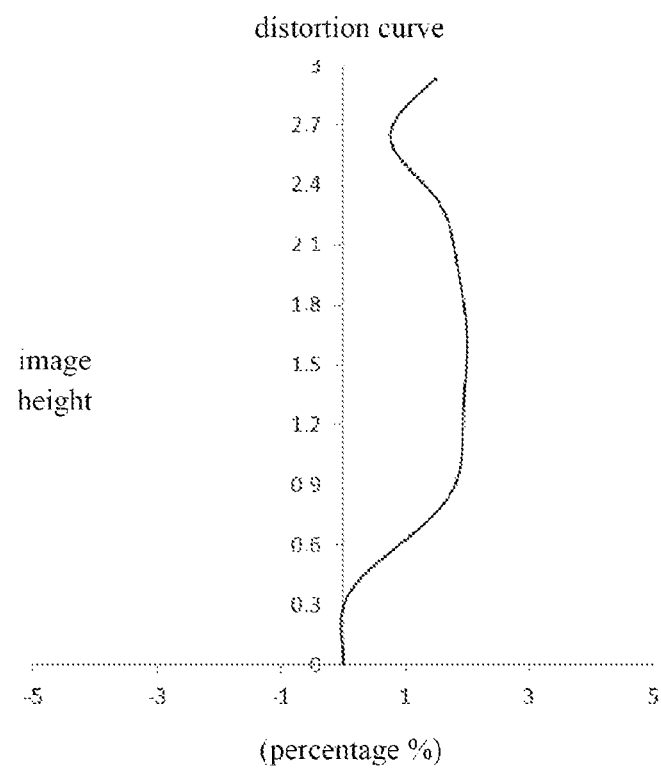
FIG. 14C illustrates a distortion curve of the camera lens assembly according to Embodiment 7.
Figure 14D:
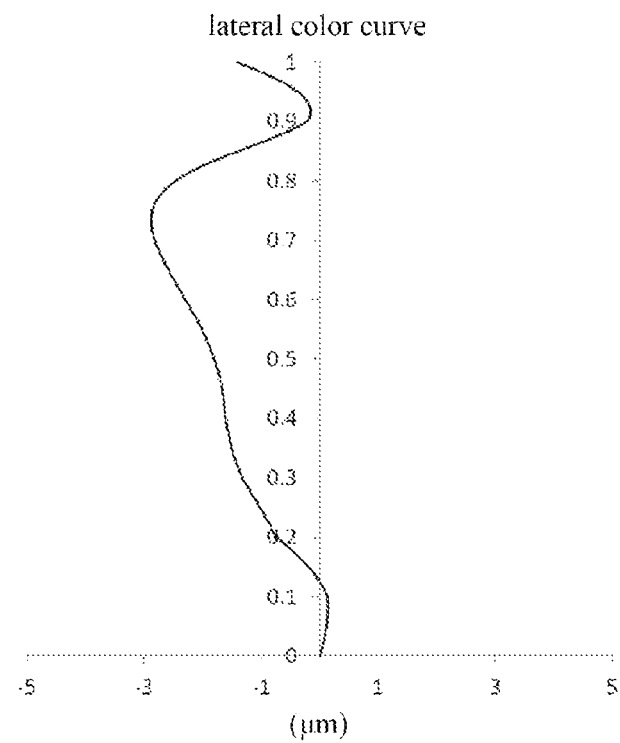
FIG. 14D illustrates a lateral color curve of the camera lens assembly according to Embodiment 7.

FIG. 14A illustrates a longitudinal aberration curve of the camera lens assembly according to Embodiment 7, representing deviations of focal points of light of different wavelengths converged after passing through an optical system. FIG. 14B illustrates an astigmatic curve of the camera lens assembly according to Embodiment 7, representing a curvature of a tangential image plane and a curvature of a sagittal image plane. FIG. 14C illustrates a distortion curve of the camera lens assembly according to Embodiment 7, representing amounts of distortion at different viewing angles. FIG. 14D illustrates a lateral color curve of the camera lens assembly according to Embodiment 7, representing deviations of different image heights on an image plane after light passes through the camera lens assembly. In summary, it can be seen from FIGS. 14A-14D that the camera lens assembly according to Embodiment 7 may obtain a good imaging effect in a situation of ensuring the miniaturization.

Embodiment 8

Figure 15:
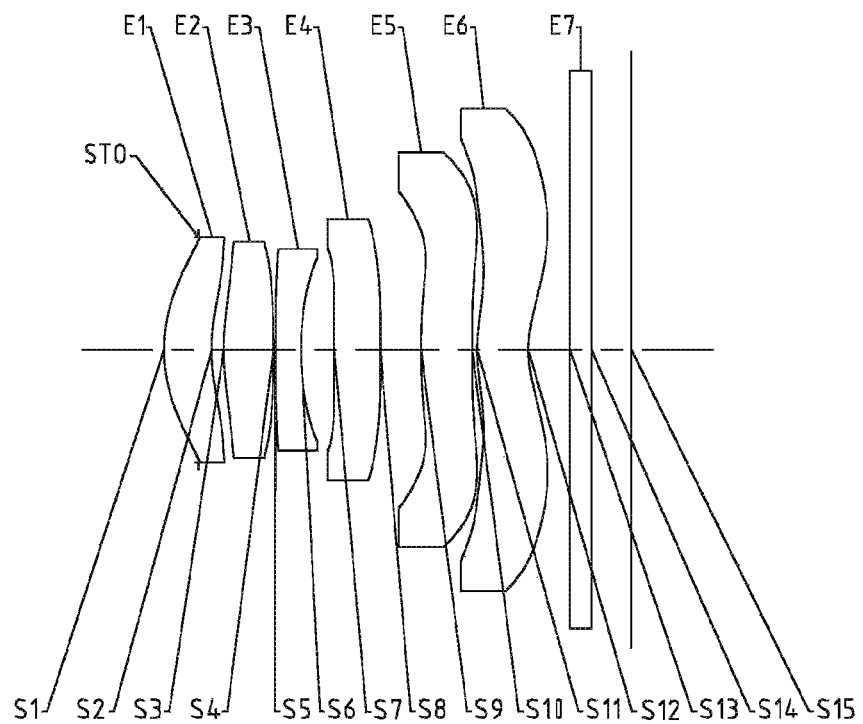
FIG. 15 is a schematic structural diagram illustrating a camera lens assembly according to Embodiment 8 of the present disclosure.

Embodiment 8 of the camera lens assembly according to the present disclosure is described below with reference to FIGS. 15-16D. FIG. 15 is a schematic structural diagram illustrating the camera lens assembly according to Embodiment 8 of the present disclosure. As shown in FIG. 15, the camera lens assembly according to Embodiment 8 includes the first to sixth lenses E1-E6 respectively having an object-side surface and an image-side surface.

Table 22 below shows the effective focal lengths f1-f6 of the lenses, the total effective focal length f of the camera lens assembly, the total track length TTL of the camera lens assembly and the half of the diagonal length ImgH of the effective pixel area on the image plane S15 of the camera lens assembly in Embodiment 8.

TABLE 22

| $f_1$(mm) | 8.67 | f(mm) | 3.73 |
| $f_2$(mm) | 3.82 | TTL(mm) | 4.58 |
| $f_3$(mm) | −6.17 | ImgH(mm) | 2.90 |
| $f_4$(mm) | 44.59 | | |
| $f_5$(mm) | 18.68 | | |
| $f_6$(mm) | −8.28 | | |

The total effective focal length f of the camera lens assembly is selected to be 3.73 mm. In this implementation, the diameter of the entrance pupil diameter EPD may be selected with the total effective focal length f of the camera lens assembly to satisfy: f/EPD=1.69.

Referring to Table 22, the total track length TTL from the object-side surface S1 of the first lens E1 to the image plane S15 and the half of the diagonal length ImgH of the effective pixel area on the image plane S15 satisfy: TTL/ImgH=1.69. The effective focal length $f_3$ of the third lens E3 and the total effective focal length f satisfy: $f_3/f=-1.65$. The effective focal length $f_5$ of the fifth lens E5 and the total effective focal length f satisfy: $f/f_5=0.20$. The effective focal length $f_6$ of the sixth lens and the total effective focal length f satisfy: $f/f_6=-0.45$. The effective focal length $f_1$ of the first lens E1 and the total effective focal length f satisfy: $f/f_1=0.43$. The effective focal length $f_2$ of the second lens E2 and the effective focal length $f_5$ of the fifth lens satisfy: $f_2/f_5$=0.20.

Table 23 shows the surface type, the radius of curvature, the center thickness, the material and the conic coefficient of each lens in this embodiment.

TABLE 23

| surface number | surface type | radius of curvature | thickness | material | conic coefficient |
|---|---|---|---|---|---|
| OBJ | spherical | infinite | infinite | | |
| STO | spherical | infinite | −0.3360 | | |
| S1 | aspheric | 1.5609 | 0.4674 | 1.55, 56.1 | −6.9517 |
| S2 | aspheric | 2.0819 | 0.1168 | | −9.5777 |
| S3 | aspheric | 2.7472 | 0.4861 | 1.70, 53.2 | −10.6221 |
| S4 | aspheric | −81.9170 | 0.0200 | | −67.2799 |
| S5 | aspheric | 8.7657 | 0.2500 | 1.67, 20.4 | 64.2740 |
| S6 | aspheric | 2.7711 | 0.3265 | | −9.5125 |
| S7 | aspheric | 20.8501 | 0.4500 | 1.67, 20.4 | −99.0000 |
| S8 | aspheric | 68.8479 | 0.3994 | | −98.7284 |
| S9 | aspheric | 10.2061 | 0.5000 | 1.55, 56.1 | −4.3639 |
| S10 | aspheric | infinite | 0.0500 | | 0.0000 |
| S11 | aspheric | 1.8221 | 0.5000 | 1.55, 56.1 | −1.4798 |
| S12 | aspheric | 1.1732 | 0.4082 | | −4.8986 |
| S13 | spherical | infinite | 0.2100 | 1.52, 64.2 | |
| S14 | spherical | infinite | 0.3920 | | |
| S15 | spherical | infinite | | | |

Table 24 shows the high-order coefficients $A_4$, $A_6$, $A_8$, $A_{10}$, $A_{12}$, $A_{14}$ and $A_{16}$ applicable to the aspheric surfaces S1-S12 of the aspheric lenses in this embodiment.

TABLE 24

| surface number | A4 | A6 | A8 | A10 | A12 | A14 | A16 |
|---|---|---|---|---|---|---|---|
| S1 | 2.0076E−01 | −2.2608E−01 | 2.2175E−01 | −1.6453E−01 | 4.7321E−02 | 0.0000E+00 | 0.0000E+00 |
| S2 | 3.9842E−02 | −2.4026E−01 | 1.7726E−01 | −5.1089E−02 | 1.4397E−02 | 0.0000E+00 | 0.0000E+00 |
| S3 | −1.3972E−02 | −1.5303E−01 | 9.1109E−02 | 1.0408E−01 | −1.0575E−01 | 2.5879E−02 | 0.0000E+00 |
| S4 | −3.2089E−01 | 9.6744E−01 | −1.5830E+00 | 1.3591E+00 | −6.0617E−01 | 1.1216E−01 | 0.0000E+00 |
| S5 | −3.8035E−01 | 1.3061E+00 | −2.0688E+00 | 1.4988E+00 | −4.0915E−01 | 4.3655E−03 | 0.0000E+00 |
| S6 | −1.9658E−02 | 1.7071E−01 | 1.9720E−01 | −1.4319E+00 | 2.5116E+00 | −1.9926E+00 | 6.5847E−01 |
| S7 | −1.0091E−01 | 3.1107E−02 | −1.4940E−02 | 2.1906E−02 | −6.0979E−01 | 6.2261E−01 | −2.3750E−01 |
| S8 | −6.4941E−02 | −1.0053E−01 | 2.8604E−01 | −3.4819E−01 | 2.4994E−01 | −9.5387E−02 | 1.3886E−02 |
| S9 | 1.7109E−01 | −3.7995E−01 | 3.8296E−01 | −2.9215E−01 | 1.3697E−01 | −3.2422E−02 | 2.8937E−03 |
| S10 | 9.6775E−02 | −4.6047E−02 | −2.9660E−02 | 3.0648E−02 | −1.0847E−02 | 1.7547E−03 | −1.0780E−04 |
| S11 | −4.3821E−01 | 3.5566E−01 | −1.8263E−01 | 6.3557E−02 | −1.4429E−02 | 1.8705E−03 | −1.0272E−04 |
| S12 | −1.8979E−01 | 1.2922E−01 | −6.4916E−02 | 2.1199E−02 | −4.0919E−03 | 4.1857E−04 | −1.7479E−05 |

Referring to Table 23 and Table 24, the center thickness $CT_1$ of the first lens E1 and the center thickness $CT_2$ of the second lens E2 satisfy: $CT_1/CT_2$=0.96. The center thickness $CT_4$ of the fourth lens E4 and the center thickness $CT_6$ of the sixth lens E6 satisfy: $CT_4/CT_6$=0.90. The center thickness $CT_5$ of the fifth lens E5 and the center thickness $CT_6$ of the sixth lens E6 satisfy: $CT_6/CT_5$=1.00. The radius of curvature $R_1$ of the object-side surface S1 of the first lens E1 and the radius of curvature $R_2$ of the image-side surface S2 of the first lens E1 satisfy: $R_1/R_2$=0.75. The radius of curvature $R_3$ of the object-side surface S3 of the second lens E2 and the radius of curvature $R_6$ of the image-side surface S6 of the third lens E3 satisfy: $R_3/R_6$=0.99. The radius of curvature $R_{11}$ of the object-side surface S11 of the sixth lens E6 and the radius of curvature $R_{12}$ of the image-side surface S12 of the sixth lens E6 satisfy: $(R_{11}-R_{12})/(R_{11}+R_{12})$=0.22.

Figure 16A:
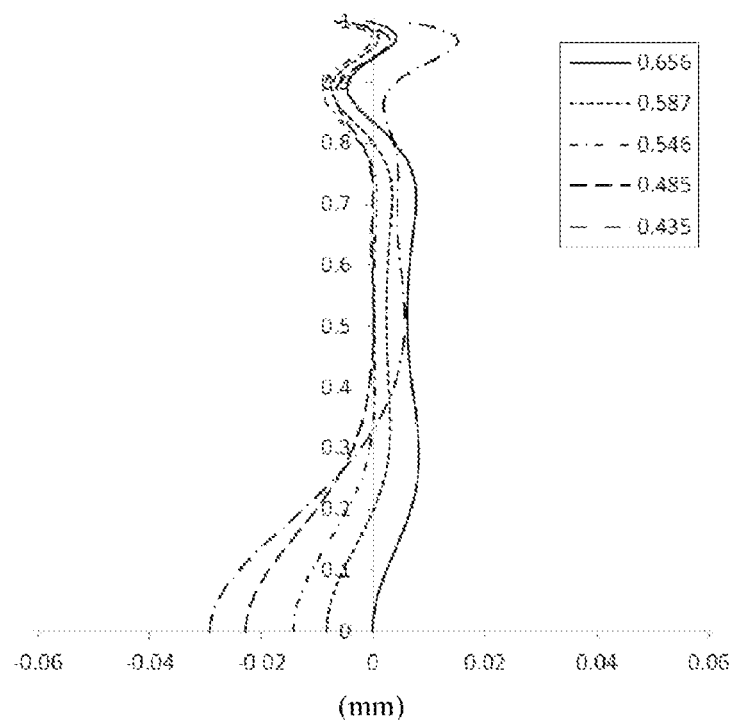
FIG. 16A illustrates a longitudinal aberration curve of the camera lens assembly according to Embodiment 8.
Figure 16B:
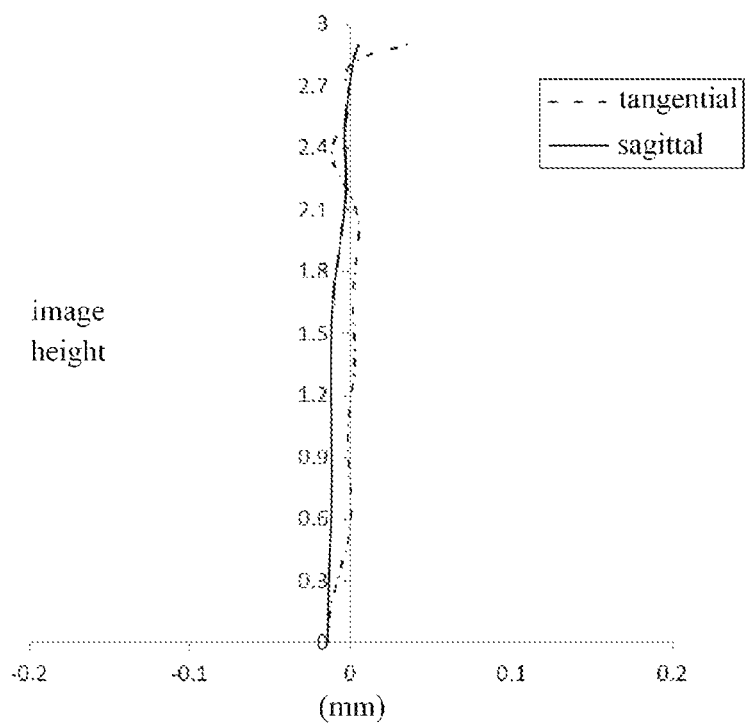
FIG. 16B illustrates an astigmatic curve of the camera lens assembly according to Embodiment 8.
Figure 16C:
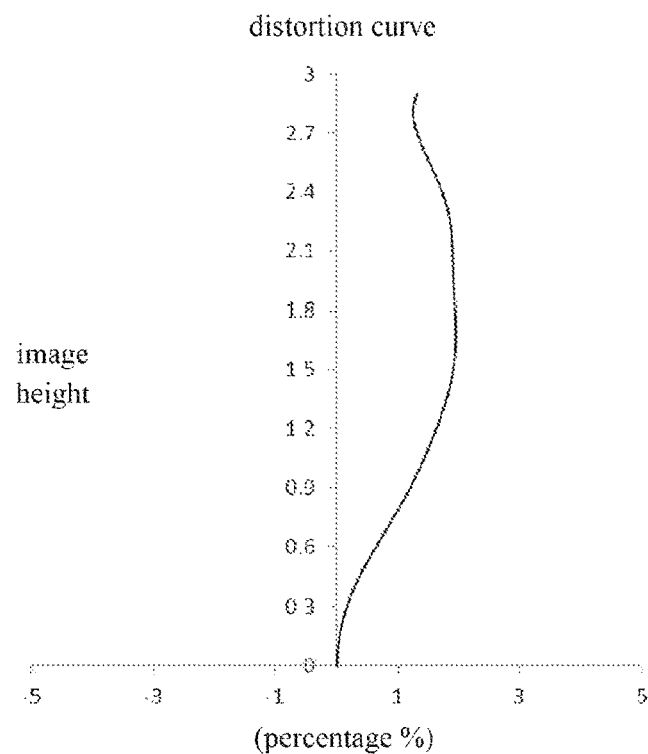
FIG. 16C illustrates a distortion curve of the camera lens assembly according to Embodiment 8.
Figure 16D:
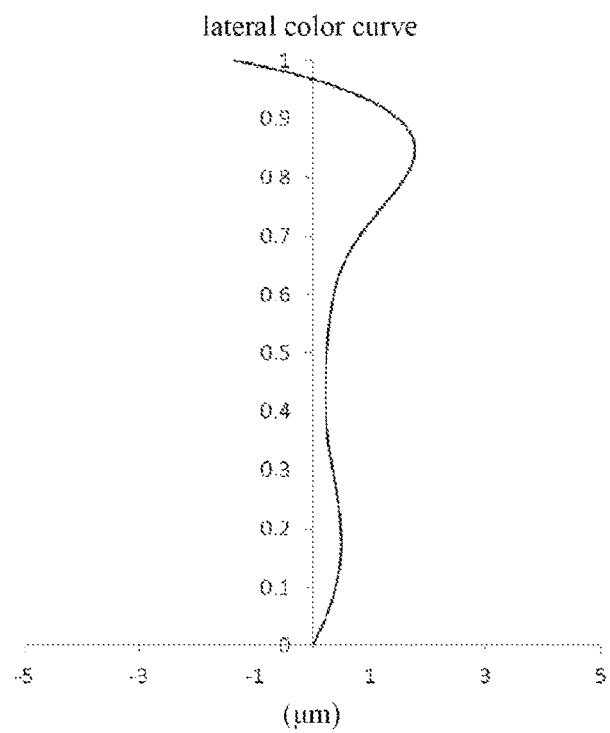
FIG. 16D illustrates a lateral color curve of the camera lens assembly according to Embodiment 8.

FIG. 16A illustrates a longitudinal aberration curve of the camera lens assembly according to Embodiment 8, representing deviations of focal points of light of different wavelengths converged after passing through an optical system. FIG. 16B illustrates an astigmatic curve of the camera lens assembly according to Embodiment 8, representing a curvature of a tangential image plane and a curvature of a sagittal image plane. FIG. 16C illustrates a distortion curve of the camera lens assembly according to Embodiment 8, representing amounts of distortion at different viewing angles. FIG. 16D illustrates a lateral color curve of the camera lens assembly according to Embodiment 8, representing deviations of different image heights on an image plane after light passes through the camera lens assembly. In summary, it can be seen from FIGS. 16A-16D that the camera lens assembly according to Embodiment 8 may obtain a good imaging effect in a situation of ensuring the miniaturization.

Embodiment 9

Figure 17:
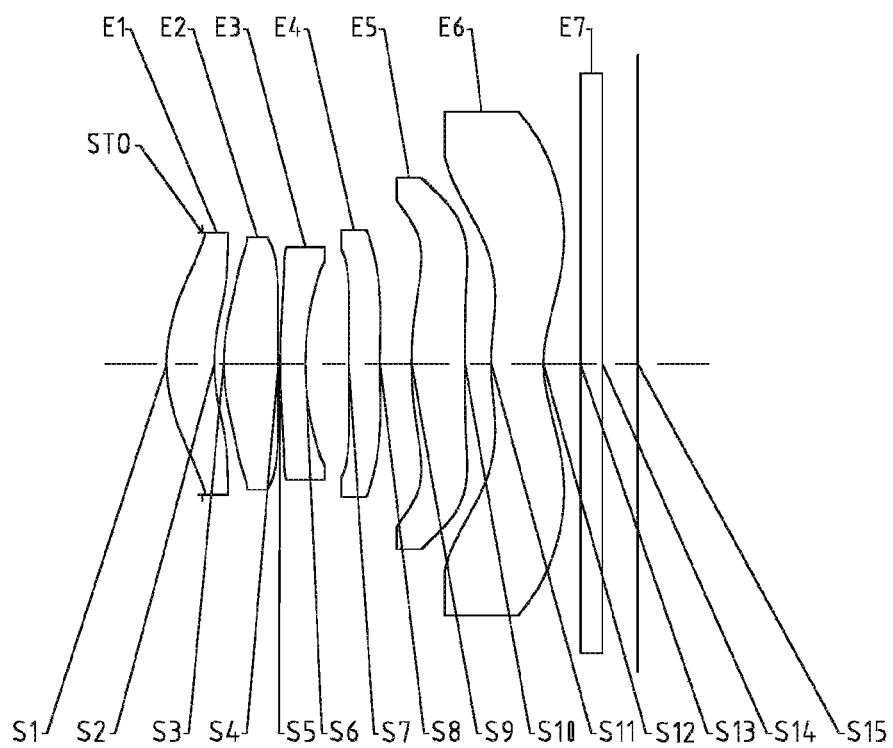
FIG. 17 is a schematic structural diagram illustrating a camera lens assembly according to Embodiment 9 of the present disclosure.

Embodiment 9 of the camera lens assembly according to the present disclosure is described below with reference to FIGS. 17-18D. FIG. 17 is a schematic structural diagram illustrating the camera lens assembly according to Embodiment 9 of the present disclosure. As shown in FIG. 17, the camera lens assembly according to Embodiment 9 includes the first to sixth lenses E1-E6 respectively having an object-side surface and an image-side surface.

Table 25 below shows the effective focal lengths f1-f6 of the lenses, the total effective focal length f of the camera lens assembly, the total track length TTL of the camera lens assembly and the half of the diagonal length ImgH of the effective pixel area on the image plane S15 of the camera lens assembly in Embodiment 9.

TABLE 25

| | | | |
|---|---|---|---|
| $f_1$(mm) | 15.37 | f(mm) | 3.63 |
| $f_2$(mm) | 3.59 | TTL(mm) | 4.50 |
| $f_3$(mm) | −7.33 | ImgH(mm) | 2.93 |
| $f_4$(mm) | 110.83 | | |
| $f_5$(mm) | 7.59 | | |
| $f_6$(mm) | −5.58 | | |

The total effective focal length f of the camera lens assembly is selected to be 3.63 mm. In this implementation, the diameter of the entrance pupil diameter EPD may be selected with the total effective focal length f of the camera lens assembly to satisfy: f/EPD=1.45.

Referring to Table 25, the total track length TTL from the object-side surface S1 of the first lens E1 to the image plane S15 and the half of the diagonal length ImgH of the effective pixel area on the image plane S15 satisfy: TTL/ImgH=1.45. The effective focal length $f_3$ of the third lens E3 and the total effective focal length f satisfy: $f_3/f$=−2.02. The effective focal length $f_5$ of the fifth lens E5 and the total effective focal length f satisfy: $f/f_5$=0.48. The effective focal length $f_6$ of the sixth lens and the total effective focal length f satisfy:

$f/f_6=-0.65$. The effective focal length $f_1$ of the first lens E1 and the total effective focal length f satisfy: $f/f_1=0.24$. The effective focal length $f_2$ of the second lens E2 and the effective focal length $f_5$ of the fifth lens satisfy: $f_2/f_5=0.47$.

Table 26 shows the surface type, the radius of curvature, the center thickness, the material and the conic coefficient of each lens in this embodiment.

TABLE 26

| surface number | surface type | radius of curvature | thickness | material | conic coefficient |
|---|---|---|---|---|---|
| OBJ | spherical | infinite | infinite | | |
| STO | spherical | infinite | −0.3363 | | |
| S1 | aspheric | 1.6195 | 0.4551 | 1.55, 56.1 | −9.5323 |
| S2 | aspheric | 1.8069 | 0.0888 | | −13.1740 |
| S3 | aspheric | 1.9342 | 0.5209 | 1.55, 56.1 | −5.2692 |
| S4 | aspheric | 119.5070 | 0.0200 | | −99.0000 |
| S5 | aspheric | 6.6919 | 0.2400 | 1.67, 20.4 | 30.5014 |
| S6 | aspheric | 2.7886 | 0.4150 | | −10.7209 |
| S7 | aspheric | 12.0880 | 0.3000 | 1.67, 20.4 | 86.7918 |
| S8 | aspheric | 14.3019 | 0.3008 | | 43.8979 |
| S9 | aspheric | 4.1471 | 0.5087 | 1.55, 56.1 | −3.5057 |
| S10 | aspheric | infinite | 0.2523 | | 0.0000 |
| S11 | aspheric | 2.2906 | 0.4986 | 1.55, 56.1 | −2.8718 |
| S12 | aspheric | 1.2079 | 0.3533 | | −5.4551 |
| S13 | spherical | infinite | 0.2100 | 1.52, 64.2 | |
| S14 | spherical | infinite | 0.3365 | | |
| S15 | spherical | infinite | | | |

Table 27 shows the high-order coefficients $A_4$, $A_6$, $A_8$, $A_{10}$, $A_{12}$, $A_{14}$ and $A_{16}$ applicable to the aspheric surfaces S1-S12 of the aspheric lenses in this embodiment.

TABLE 27

| surface number | A4 | A6 | A8 | A10 | A12 | A14 | A16 |
|---|---|---|---|---|---|---|---|
| S1 | 2.4080E−01 | −3.6970E−01 | 4.6915E−01 | −4.2336E−01 | 1.9733E−01 | −3.5713E−02 | 0.0000E+00 |
| S2 | 1.3344E−01 | −4.2372E−01 | 3.2344E−01 | −8.0409E−02 | 0.0000E+00 | 0.0000E+00 | 0.0000E+00 |
| S3 | 5.0511E−03 | −7.1878E−02 | −2.1653E−01 | 4.6564E−01 | −2.5613E−01 | 3.6913E−02 | 0.0000E+00 |
| S4 | 3.1676E−02 | −1.8408E−01 | 2.7056E−01 | −2.3228E−01 | 9.9885E−02 | −1.8389E−02 | 0.0000E+00 |
| S5 | −2.1158E−02 | −1.5837E−01 | 4.1161E−01 | −6.0227E−01 | 4.1250E−01 | −1.0053E−01 | 0.0000E+00 |
| S6 | 4.3609E−02 | −7.8223E−02 | 3.7009E−01 | −8.2739E−01 | 9.9539E−01 | −6.3619E−01 | 1.8852E−01 |
| S7 | −8.6999E−02 | −3.6867E−02 | 9.0939E−02 | 6.9750E−02 | −3.5695E−01 | 3.5380E−01 | −1.1962E−01 |
| S8 | −7.0408E−02 | −1.8400E−01 | 4.2879E−01 | −4.8406E−01 | 3.1071E−01 | −1.0090E−01 | 1.1786E−02 |
| S9 | 9.2684E−02 | −2.0547E−01 | 1.4841E−01 | −6.8673E−02 | 7.7892E−03 | 5.1083E−03 | −1.2557E−03 |
| S10 | 5.5990E−02 | 6.3764E−03 | −8.5836E−02 | 6.4478E−02 | −2.4852E−02 | 5.0513E−03 | −4.1064E−04 |
| S11 | −3.6871E−01 | 2.5101E−01 | −1.3253E−01 | 4.8770E−02 | −1.0810E−02 | 1.2983E−03 | −6.5702E−05 |
| S12 | −1.4360E−01 | 8.5946E−02 | −4.3054E−02 | 1.4324E−02 | −2.8062E−03 | 2.9047E−04 | −1.2246E−05 |

Referring to Table 26 and Table 27, the center thickness $CT_1$ of the first lens E1 and the center thickness $CT_2$ of the second lens E2 satisfy: $CT_1/CT_2=0.87$. The center thickness $CT_4$ of the fourth lens E4 and the center thickness $CT_6$ of the sixth lens E6 satisfy: $CT_4/CT_6=0.60$. The center thickness $CT_5$ of the fifth lens E5 and the center thickness $CT_6$ of the sixth lens E6 satisfy: $CT_6/CT_5=0.98$. The radius of curvature $R_1$ of the object-side surface S1 of the first lens E1 and the radius of curvature $R_2$ of the image-side surface S2 of the first lens E1 satisfy: $R_1/R_2=0.90$. The radius of curvature $R_3$ of the object-side surface S3 of the second lens E2 and the radius of curvature $R_6$ of the image-side surface S6 of the third lens E3 satisfy: $R_3/R_6=0.69$. The radius of curvature $R_{11}$ of the object-side surface S11 of the sixth lens E6 and the radius of curvature $R_{12}$ of the image-side surface S12 of the sixth lens E6 satisfy: $(R_{11}-R_{12})/(R_{11}+R_{12})=0.31$.

Figure 18A:
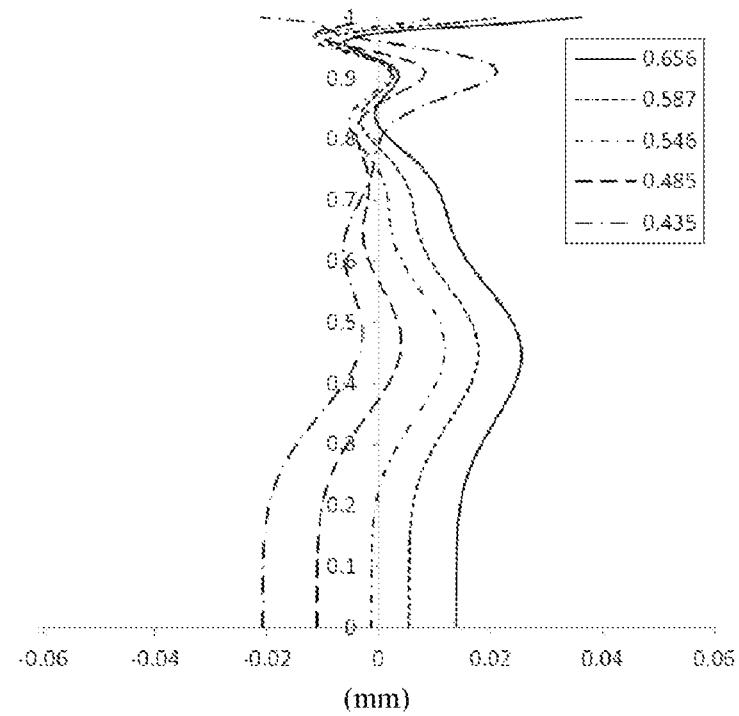
FIG. 18A illustrates a longitudinal aberration curve of the camera lens assembly according to Embodiment 9.
Figure 18B:
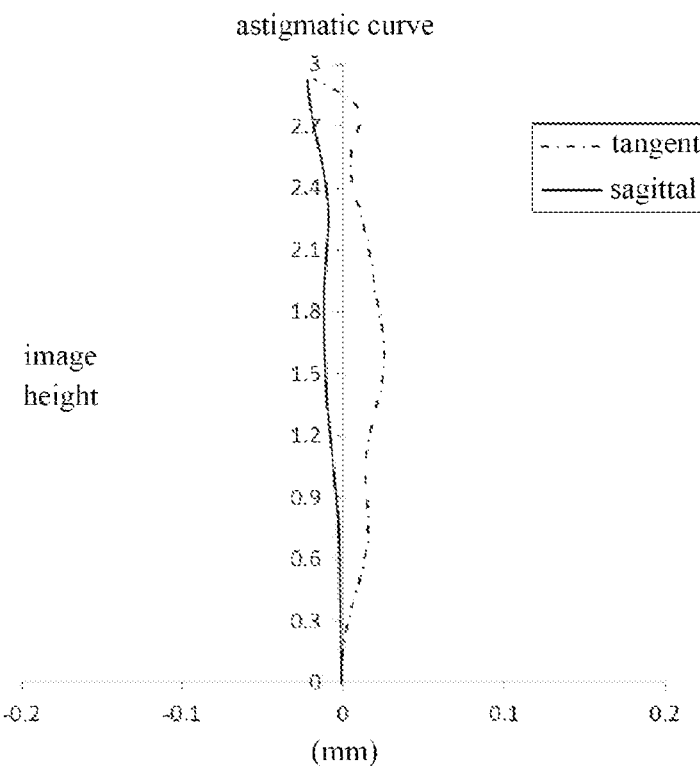
FIG. 18B illustrates an astigmatic curve of the camera lens assembly according to Embodiment 9.
Figure 18C:
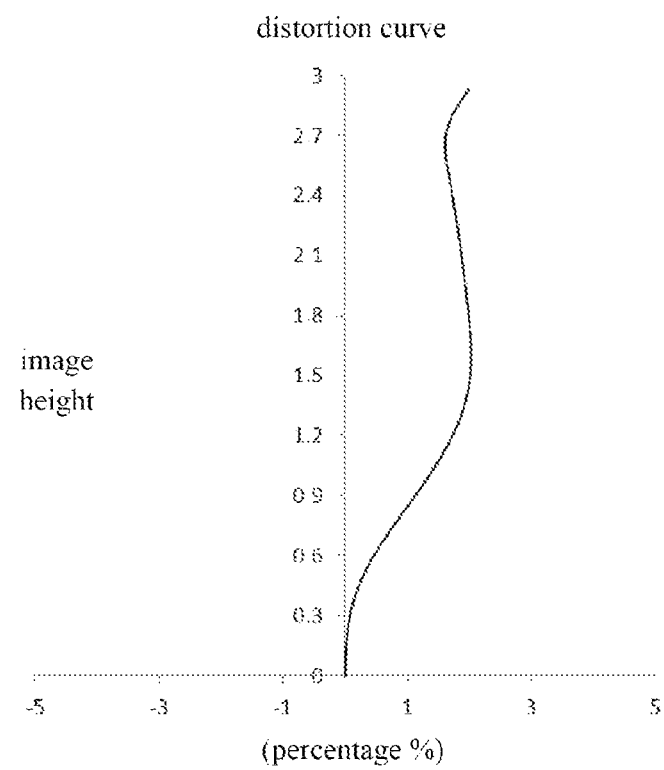
FIG. 18C illustrates a distortion curve of the camera lens assembly according to Embodiment 9.
Figure 18D:
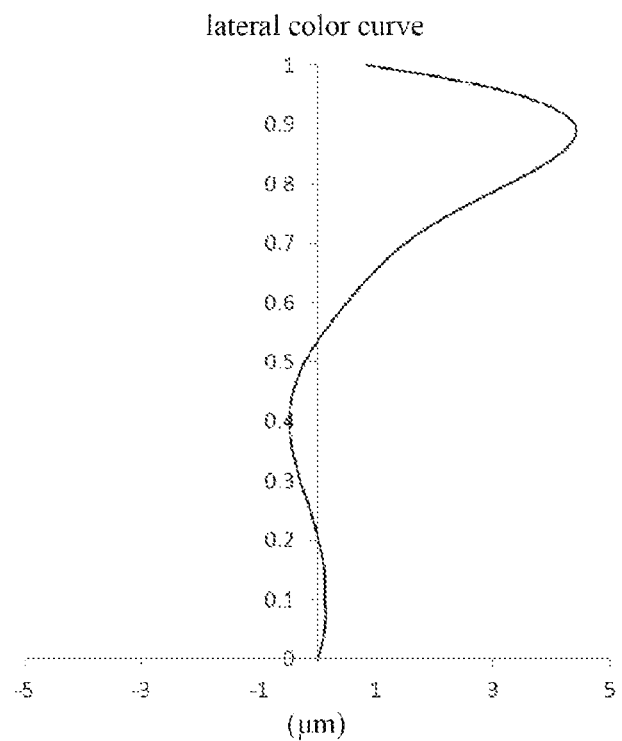
FIG. 18D illustrates a lateral color curve of the camera lens assembly according to Embodiment 9.

FIG. 18A illustrates a longitudinal aberration curve of the camera lens assembly according to Embodiment 9, representing deviations of focal points of light of different wavelengths converged after passing through an optical system. FIG. 18B illustrates an astigmatic curve of the camera lens assembly according to Embodiment 9, representing a curvature of a tangential image plane and a curvature of a sagittal image plane. FIG. 18C illustrates a distortion curve of the camera lens assembly according to Embodiment 9, representing amounts of distortion at different viewing angles. FIG. 18D illustrates a lateral color curve of the camera lens assembly according to Embodiment 9, representing deviations of different image heights on an image plane after light passes through the camera lens assembly. In summary, it can be seen from FIGS. 18A-18D that the camera lens assembly according to Embodiment 9 may obtain a good imaging effect in a situation of ensuring the miniaturization.

Embodiment 10

Figure 19:
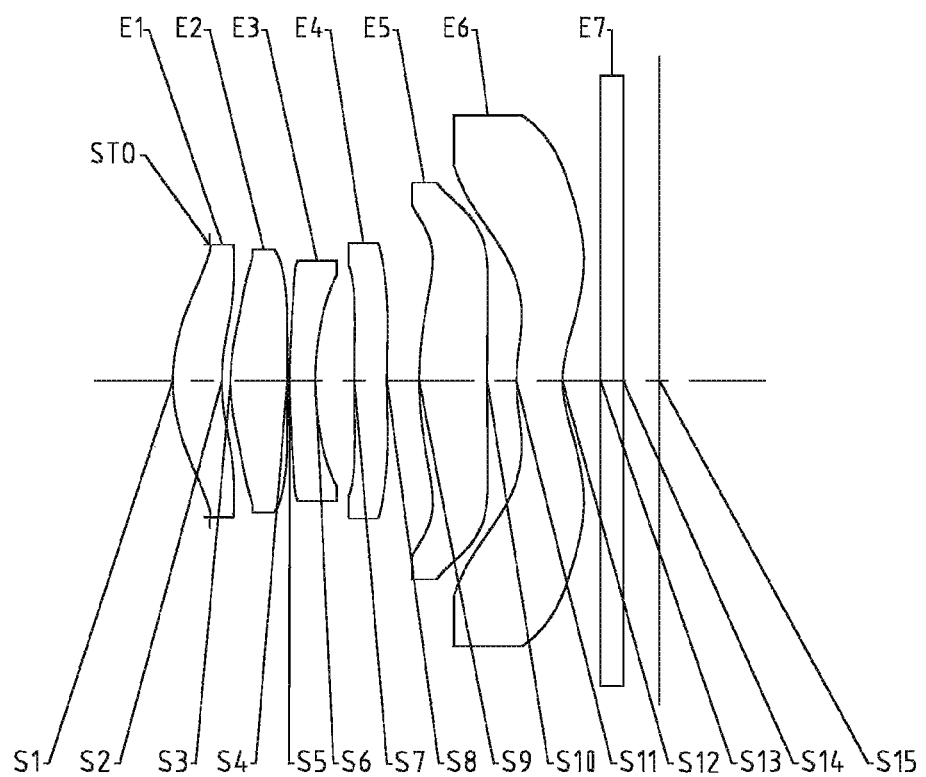
FIG. 19 is a schematic structural diagram illustrating a camera lens assembly according to Embodiment 10 of the present disclosure.

Embodiment 10 of the camera lens assembly according to the present disclosure is described below with reference to FIGS. 19-20D. FIG. 19 is a schematic structural diagram illustrating the camera lens assembly according to Embodiment 10 of the present disclosure. As shown in FIG. 19, the camera lens assembly according to Embodiment 10 includes the first to sixth lenses E1-E6 respectively having an object-side surface and an image-side surface.

Table 28 below shows the effective focal lengths $f_1$-$f_6$ of the lenses, the total effective focal length f of the camera lens assembly, the total track length TTL of the camera lens assembly and the half of the diagonal length ImgH of the effective pixel area on the image plane S15 of the camera lens assembly in Embodiment 10.

TABLE 28

| $f_1$(mm) | 13.69 | f(mm) | 3.60 |
|---|---|---|---|
| $f_2$(mm) | 3.71 | TTL(mm) | 4.50 |
| $f_3$(mm) | −7.39 | ImgH(mm) | 2.93 |
| $f_4$(mm) | −51.00 | | |
| $f_5$(mm) | 7.33 | | |
| $f_6$(mm) | −6.48 | | |

The total effective focal length f of the camera lens assembly is selected to be 3.60 mm. In this implementation, the diameter of the entrance pupil diameter EPD may be selected with the total effective focal length f of the camera lens assembly to satisfy: $f/EPD=1.43$.

Referring to Table 28, the total track length TTL from the object-side surface S1 of the first lens E1 to the image plane S15 and the half of the diagonal length ImgH of the effective pixel area on the image plane S15 satisfy: $TTL/ImgH=1.43$.

The effective focal length $f_3$ of the third lens E3 and the total effective focal length f satisfy: $f_3/f=-2.05$. The effective focal length $f_5$ of the fifth lens E5 and the total effective focal length f satisfy: $f/f_5=0.49$. The effective focal length $f_6$ of the sixth lens and the total effective focal length f satisfy: $f/f_6=-0.56$. The effective focal length $f_1$ of the first lens E1 and the total effective focal length f satisfy: $f/f_1=0.26$. The effective focal length $f_2$ of the second lens E2 and the effective focal length $f_5$ of the fifth lens satisfy: $f_2/f_5=0.51$.

Table 29 shows the surface type, the radius of curvature, the center thickness, the material and the conic coefficient of each lens in this embodiment.

TABLE 29

| surface number | surface type | radius of curvature | thickness | material | conic coefficient |
|---|---|---|---|---|---|
| OBJ | spherical | infinite | infinite | | |
| STO | spherical | infinite | -0.3359 | | |
| S1 | aspheric | 1.6609 | 0.4528 | 1.55, 56.1 | -10.8607 |
| S2 | aspheric | 1.9290 | 0.0807 | | -14.0168 |
| S3 | aspheric | 1.9907 | 0.5247 | 1.55, 56.1 | -5.9212 |
| S4 | aspheric | 94.9518 | 0.0200 | | 99.0000 |
| S5 | aspheric | 6.5686 | 0.2400 | 1.67, 20.4 | 29.7205 |
| S6 | aspheric | 2.7775 | 0.3601 | | -8.1785 |
| S7 | aspheric | 10.1791 | 0.3000 | 1.67, 20.4 | -99.0000 |
| S8 | aspheric | 7.7457 | 0.2976 | | -43.1867 |
| S9 | aspheric | 3.3278 | 0.6314 | 1.55, 56.1 | -1.3390 |
| S10 | aspheric | 18.3092 | 0.2686 | | 0.0000 |
| S11 | aspheric | 1.5955 | 0.4257 | 1.55, 56.1 | -9.5062 |
| S12 | aspheric | 0.9963 | 0.3526 | | -4.8109 |
| S13 | spherical | infinite | 0.2100 | 1.52, 64.2 | |
| S14 | spherical | infinite | 0.3357 | | |
| S15 | spherical | infinite | | | |

Table 30 shows the high-order coefficients $A_4$, $A_6$, $A_8$, $A_{10}$, $A_{15}$, $A_{14}$ and $A_{16}$ applicable to the aspheric surfaces S1-S12 of the aspheric lenses in this embodiment.

TABLE 30

| surface number | A4 | A6 | A8 | A10 | A12 | A14 | A16 |
|---|---|---|---|---|---|---|---|
| S1 | 2.5486E-01 | -4.0089E-01 | 5.0336E-01 | -4.4822E-01 | 2.0821E-01 | -3.7890E-02 | 0.0000E+00 |
| S2 | 1.1133E-01 | -3.9883E-01 | 3.1532E-01 | -8.0459E-02 | 0.0000E+00 | 0.0000E+00 | 0.0000E+00 |
| S3 | 1.0324E-02 | -1.0705E-01 | -1.5714E-01 | 4.2576E-01 | -2.5380E-01 | 4.1708E-02 | 0.0000E+00 |
| S4 | 1.7138E-02 | -1.6351E-01 | 1.7455E-01 | -8.3290E-02 | 1.0102E-02 | 9.0263E-04 | 0.0000E+00 |
| S5 | -2.8568E-02 | -7.4119E-02 | 1.7467E-01 | -2.7808E-01 | 2.1195E-01 | -5.5361E-02 | 0.0000E+00 |
| S6 | 3.5974E-02 | -8.6180E-02 | 6.1266E-01 | -1.5495E+00 | 2.0042E+00 | -1.3307E+00 | 3.7605E-01 |
| S7 | -8.5958E-02 | -1.0683E-01 | 5.0662E-01 | -8.3592E-01 | 6.6803E-01 | -2.2473E-01 | 6.5556E-03 |
| S8 | -1.0003E-01 | -1.0877E-01 | 4.0526E-01 | -5.7612E-01 | 4.5250E-01 | -1.8258E-01 | 2.8737E-02 |
| S9 | 1.0672E-02 | -5.2665E-02 | 1.3064E-01 | 2.9400E-01 | -2.9236E-02 | 1.1040E-01 | -1.4259E-03 |
| S10 | -8.8698E-02 | 1.9425E-01 | -2.2013E-01 | 1.3013E-01 | -4.5764E-02 | 8.7261E-03 | -6.7323E-04 |
| S11 | -3.7767E-01 | 2.0474E-01 | -6.8193E-02 | 1.3118E-02 | -4.7172E-04 | -2.4526E-04 | 2.7613E-05 |
| S12 | -2.0468E-01 | 1.3591E-01 | -7.1099E-02 | 2.4392E-02 | -4.8510E-03 | 5.0379E-04 | -2.1199E-05 |

Referring to Table 29 and Table 30, the center thickness $CT_1$ of the first lens E1 and the center thickness $CT_2$ of the second lens E2 satisfy: $CT_1/CT_2=0.86$. The center thickness $CT_4$ of the fourth lens E4 and the center thickness $CT_6$ of the sixth lens E6 satisfy: $CT_4/CT_6=0.70$. The center thickness $CT_5$ of the fifth lens E5 and the center thickness $CT_6$ of the sixth lens E6 satisfy: $CT_6/CT_5=0.67$. The radius of curvature $R_1$ of the object-side surface S1 of the first lens E1 and the radius of curvature $R_2$ of the image-side surface S2 of the first lens E1 satisfy: $R_1/R_2=0.86$. The radius of curvature $R_3$ of the object-side surface S3 of the second lens E2 and the radius of curvature $R_6$ of the image-side surface S6 of the third lens E3 satisfy: $R_3/R_6=0.72$. The radius of curvature $R_{11}$ of the object-side surface S11 of the sixth lens E6 and the radius of curvature $R_{12}$ of the image-side surface S12 of the sixth lens E6 satisfy: $(R_{11}-R_{12})/(R_{11}+R_{12})=0.23$.

Figure 20A:
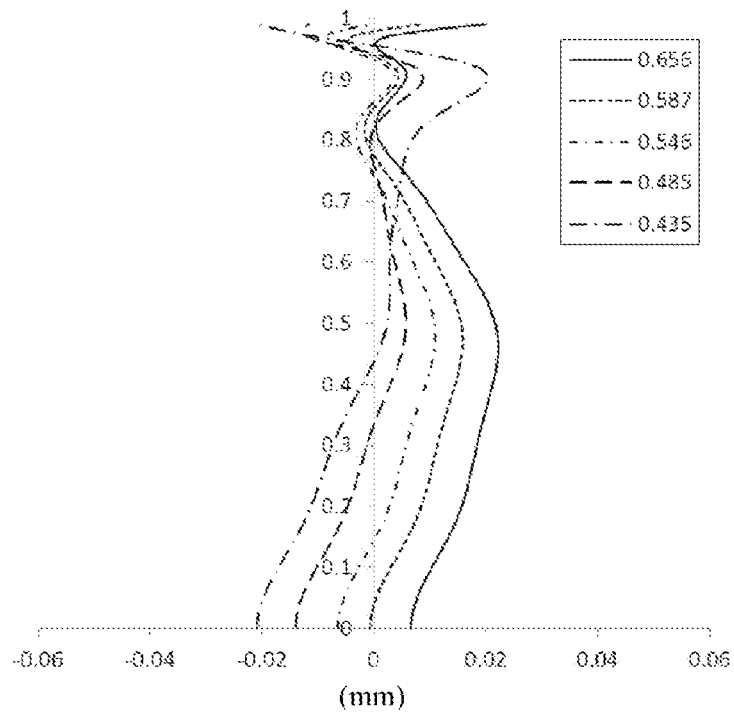
FIG. 20A illustrates a longitudinal aberration curve of the camera lens assembly according to Embodiment 10.
Figure 20B:
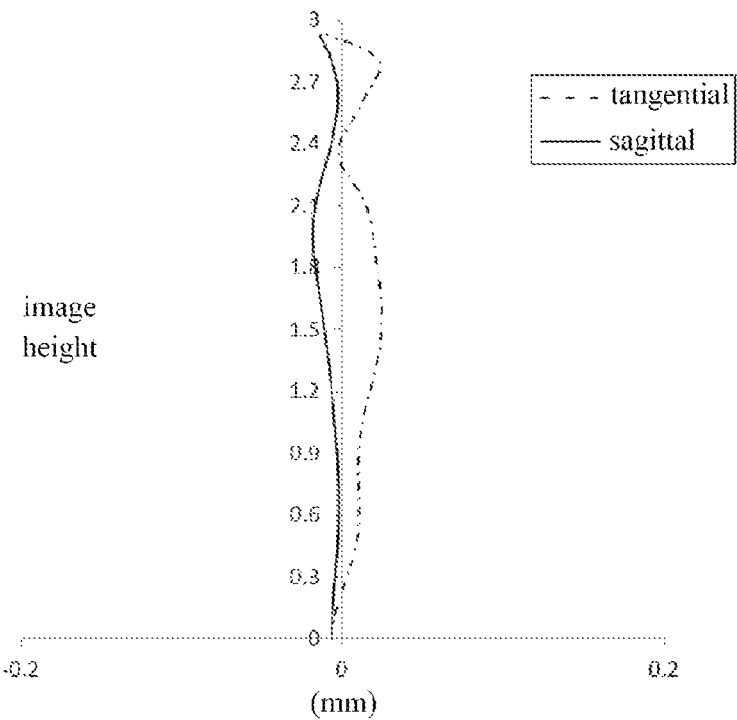
FIG. 20B illustrates an astigmatic curve of the camera lens assembly according to Embodiment 10.
Figure 20C:
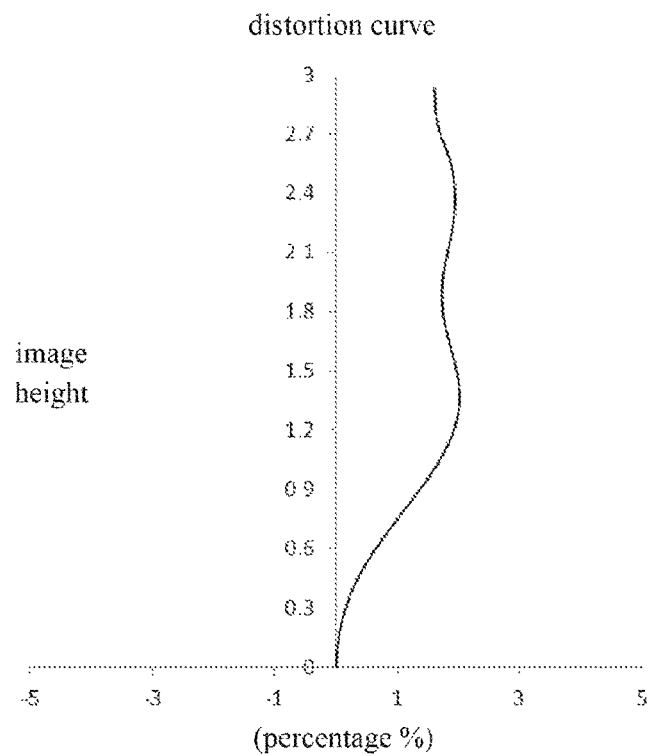
FIG. 20C illustrates a distortion curve of the camera lens assembly according to Embodiment 10.
Figure 20D:
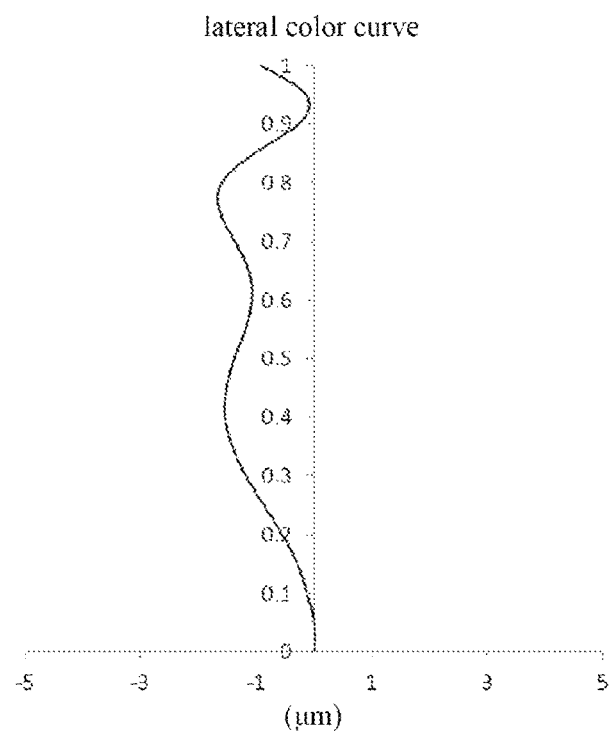
FIG. 20D illustrates a lateral color curve of the camera lens assembly according to Embodiment 10.

FIG. 20A illustrates a longitudinal aberration curve of the camera lens assembly according to Embodiment 10, representing deviations of focal points of light of different wavelengths converged after passing through an optical system. FIG. 20B illustrates an astigmatic curve of the camera lens assembly according to Embodiment 10, representing a curvature of a tangential image plane and a curvature of a sagittal image plane. FIG. 20C illustrates a distortion curve of the camera lens assembly according to Embodiment 10, representing amounts of distortion at different viewing angles. FIG. 20D illustrates a lateral color curve of the camera lens assembly according to Embodiment 10, representing deviations of different image heights on an image plane after light passes through the camera lens assembly. In summary, it can be seen from FIGS. 20A-20D that the camera lens assembly according to Embodiment 10 may obtain a good imaging effect in a situation of ensuring the miniaturization.

Embodiment 11

Figure 21:
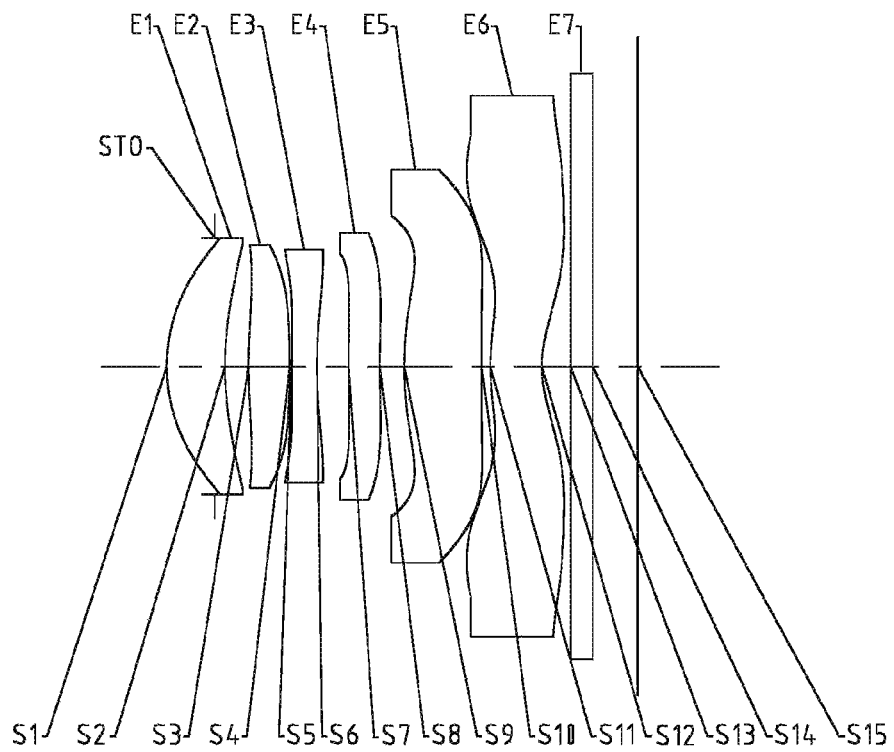
FIG. 21 is a schematic structural diagram illustrating a camera lens assembly according to Embodiment 11 of the present disclosure.

Embodiment 11 of the camera lens assembly according to the present disclosure is described below with reference to FIGS. 21-22D. FIG. 21 is a schematic structural diagram illustrating the camera lens assembly according to Embodiment 11 of the present disclosure. As shown in FIG. 21, the camera lens assembly according to Embodiment 11 includes the first to sixth lenses E1-E6 respectively having an object-side surface and an image-side surface.

Table 31 below shows the effective focal lengths f1-f6 of the lenses, the total effective focal length f of the camera lens assembly, the total track length TTL of the camera lens assembly and the half of the diagonal length ImgH of the effective pixel area on the image plane S15 of the camera lens assembly in Embodiment 11.

TABLE 31

| | | | |
|---|---|---|---|
| $f_1$(mm) | 5.18 | f(mm) | 3.44 |
| $f_2$(mm) | 5.73 | TTL(mm) | 4.50 |
| $f_3$(mm) | -7.06 | ImgH(mm) | 2.93 |
| $f_4$(mm) | -55.14 | | |
| $f_5$(mm) | 6.93 | | |
| $f_6$(mm) | -6.44 | | |

The total effective focal length f of the camera lens assembly is selected to be 3.44 mm. In this implementation, the diameter of the entrance pupil diameter EPD may be selected with the total effective focal length f of the camera lens assembly to satisfy: f/EPD=1.41.

Referring to Table 31, the total track length TTL from the object-side surface S1 of the first lens E1 to the image plane S15 and the half of the diagonal length ImgH of the effective pixel area on the image plane S15 satisfy: TTL/ImgH=1.41. The effective focal length $f_3$ of the third lens E3 and the total effective focal length f satisfy: $f_3/f$=−2.05. The effective focal length $f_5$ of the fifth lens E5 and the total effective focal length f satisfy: $f/f_5$=0.50. The effective focal length $f_6$ of the sixth lens and the total effective focal length f satisfy: $f/f_6$=−0.53. The effective focal length $f_1$ of the first lens E1 and the total effective focal length f satisfy: $f/f_1$=0.66. The effective focal length $f_2$ of the second lens E2 and the effective focal length $f_5$ of the fifth lens satisfy: $f_2/f_5$=0.83.

Table 32 shows the surface type, the radius of curvature, the center thickness, the material and the conic coefficient of each lens in this embodiment.

TABLE 32

| surface number | surface type | radius of curvature | thickness | material | conic coefficient |
|---|---|---|---|---|---|
| OBJ | spherical | infinite | infinite | | |
| STO | spherical | infinite | −0.4573 | | |
| S1 | aspheric | 1.6016 | 0.5571 | 1.55, 56.1 | −6.3485 |
| S2 | aspheric | 3.2323 | 0.2262 | | −4.8583 |
| S3 | aspheric | 5.9777 | 0.3927 | 1.55, 56.1 | −29.0895 |
| S4 | aspheric | −6.4317 | 0.0200 | | 0.3545 |
| S5 | aspheric | −38.7621 | 0.2400 | 1.67, 20.4 | −99.0000 |
| S6 | aspheric | 5.3829 | 0.3020 | | −38.8937 |
| S7 | aspheric | 12.4817 | 0.3000 | 1.67, 20.4 | −99.0000 |
| S8 | aspheric | 9.2336 | 0.2313 | | 28.2241 |
| S9 | aspheric | 3.7860 | 0.7401 | 1.55, 56.1 | −27.1060 |
| S10 | aspheric | infinite | 0.0822 | | 0.0000 |
| S11 | aspheric | 1.9603 | 0.4936 | 1.55, 56.1 | −7.5033 |
| S12 | aspheric | 1.1473 | 0.2748 | | −5.7588 |
| S13 | spherical | infinite | 0.2100 | 1.52, 64.2 | |
| S14 | spherical | infinite | 0.4300 | | |
| S15 | spherical | infinite | | | |

Table 33 shows the high-order coefficients $A_4$, $A_6$, $A_8$, $A_{10}$, $A_{12}$, $A_{14}$ and $A_{16}$ applicable to the aspheric surfaces S1-S12 of the aspheric lenses in this embodiment.

TABLE 33

| surface number | A4 | A6 | A8 | A10 | A12 | A14 | A16 |
|---|---|---|---|---|---|---|---|
| S1 | 1.8045E−01 | −1.6289E−01 | 1.9575E−01 | −1.7919E−01 | 9.8751E−02 | −2.4280E−02 | 0.0000E+00 |
| S2 | −1.3027E−02 | 3.1911E−04 | −3.8831E−06 | 1.8058E−08 | 0.0000E+00 | 0.0000E+00 | 0.0000E+00 |
| S3 | −5.0582E−02 | 4.9321E−03 | −6.5847E−04 | 7.1569E−05 | −3.6097E−06 | 6.4584E−08 | 0.0000E+00 |
| S4 | 1.5609E−01 | −6.6280E−01 | 9.6162E−01 | −7.3416E−01 | 2.7854E−01 | −4.0538E−02 | 0.0000E+00 |
| S5 | 1.8373E−01 | −7.1171E−01 | 9.7783E−01 | −7.4997E−01 | 3.1750E−01 | −5.4158E−02 | 0.0000E+00 |
| S6 | 6.0821E−02 | −1.4954E−01 | 1.7555E−02 | 2.0826E−01 | −2.7998E−01 | 1.6328E−01 | −3.5971E−02 |
| S7 | −8.6299E−02 | 1.7656E−01 | −6.5281E−01 | 1.4672E+00 | −1.9313E+00 | 1.3121E+00 | −3.6060E−01 |
| S8 | −5.5763E−02 | −2.3628E−01 | 5.8463E−01 | −7.2321E−01 | 4.8584E−01 | −1.6450E−01 | 2.1409E−02 |
| S9 | 1.6363E−01 | −3.5083E−01 | 3.4673E−01 | −2.2219E−01 | 7.6267E−02 | −1.2786E−02 | 8.2439E−04 |
| S10 | 4.4983E−02 | −3.7452E−02 | −6.3937E−03 | 7.4432E−03 | −1.8060E−03 | 1.8308E−04 | −6.7829E−06 |
| S11 | −2.9604E−01 | 1.1092E−01 | −3.2902E−03 | −6.9610E−03 | 1.8320E−03 | −1.9147E−04 | 7.3505E−06 |
| S12 | −1.0114E−01 | 1.2897E−02 | 1.1415E−02 | −5.2562E−03 | 9.3169E−04 | −7.5842E−05 | 2.3274E−06 |

Referring to Table 32 and Table 33, the center thickness $CT_1$ of the first lens E1 and the center thickness $CT_2$ of the second lens E2 satisfy: $CT_1/CT_2$=1.42. The center thickness $CT_4$ of the fourth lens E4 and the center thickness $CT_6$ of the sixth lens E6 satisfy: $CT_4/CT_6$=0.61. The center thickness $CT_5$ of the fifth lens E5 and the center thickness $CT_6$ of the sixth lens E6 satisfy: $CT_6/CT_5$=0.67. The radius of curvature $R_1$ of the object-side surface S1 of the first lens E1 and the radius of curvature $R_2$ of the image-side surface S2 of the first lens E1 satisfy: $R_1/R_2$=0.50. The radius of curvature $R_3$ of the object-side surface S3 of the second lens E2 and the radius of curvature $R_6$ of the image-side surface S6 of the third lens E3 satisfy: $R_3/R_6$=1.11. The radius of curvature $R_{11}$ of the object-side surface S11 of the sixth lens E6 and the radius of curvature $R_{12}$ of the image-side surface S12 of the sixth lens E6 satisfy: $(R_{11}−R_{12})/(R_{11}+R_{12})$=0.26.

Figure 22A:
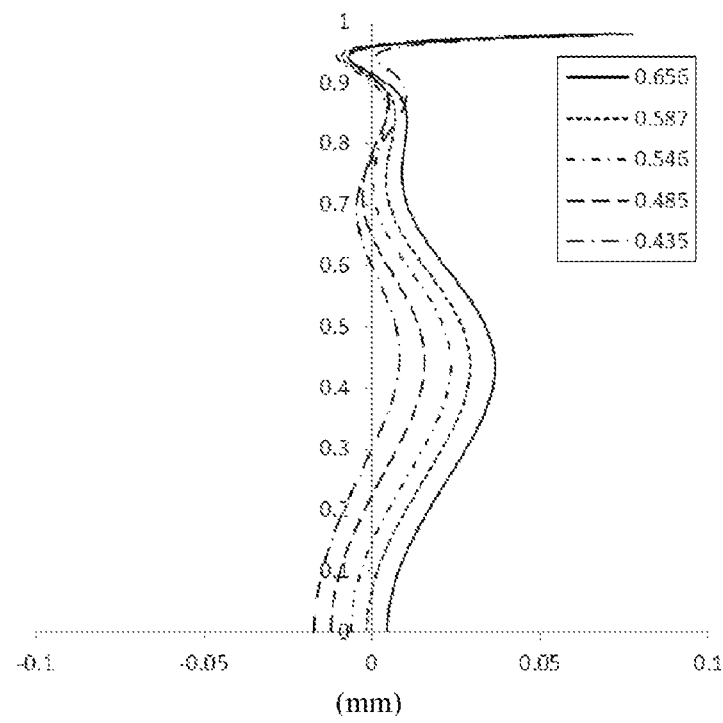
FIG. 22A illustrates a longitudinal aberration curve of the camera lens assembly according to Embodiment 11.
Figure 22B:
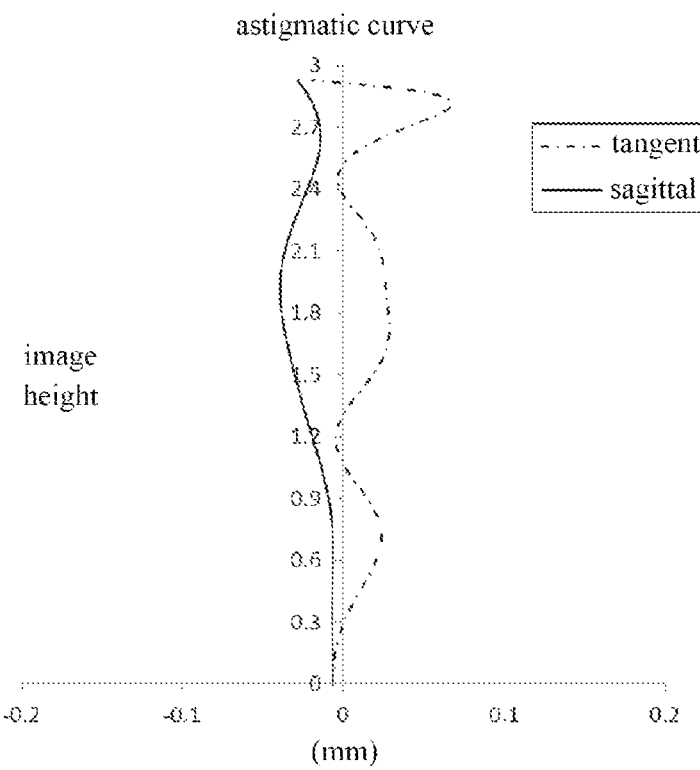
FIG. 22B illustrates an astigmatic curve of the camera lens assembly according to Embodiment 11.
Figure 22C:
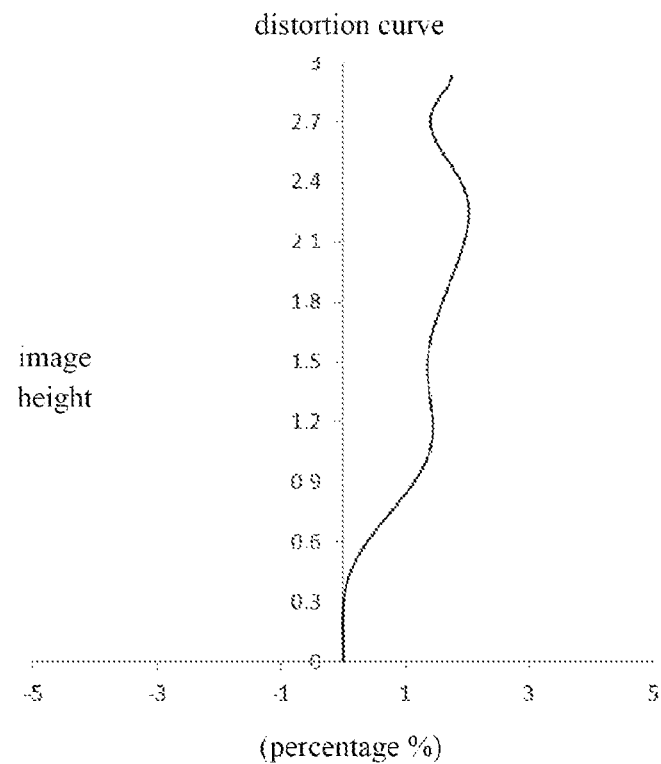
FIG. 22C illustrates a distortion curve of the camera lens assembly according to Embodiment 11.
Figure 22D:
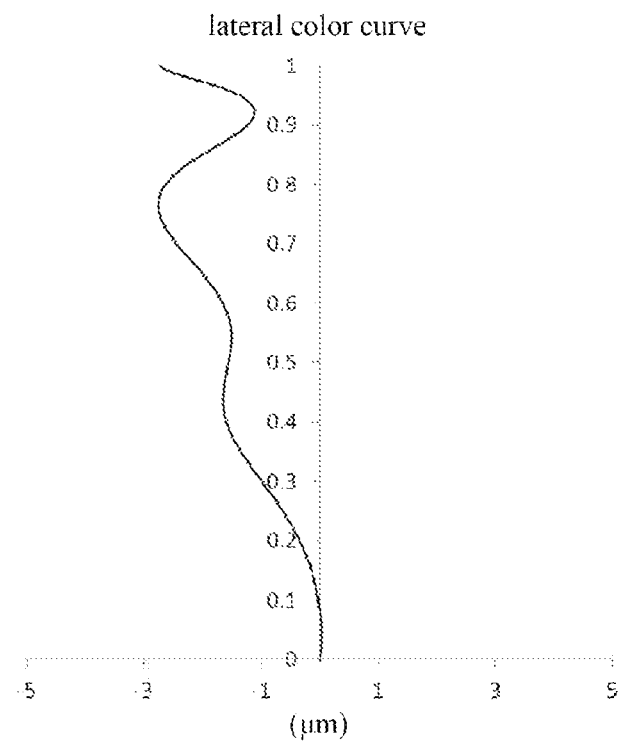
FIG. 22D illustrates a lateral color curve of the camera lens assembly according to Embodiment 11.

FIG. 22A illustrates a longitudinal aberration curve of the camera lens assembly according to Embodiment 11, representing deviations of focal points of light of different wavelengths converged after passing through an optical system. FIG. 22B illustrates an astigmatic curve of the camera lens assembly according to Embodiment 11, representing a curvature of a tangential image plane and a curvature of a sagittal image plane. FIG. 22C illustrates a distortion curve of the camera lens assembly according to Embodiment 11, representing amounts of distortion at different viewing angles. FIG. 22D illustrates a lateral color curve of the camera lens assembly according to Embodiment 11, representing deviations of different image heights on an image plane after light passes through the camera lens assembly. In summary, it can be seen from FIGS. 22A-22D that the camera lens assembly according to Embodiment 11 may obtain a good imaging effect in a situation of ensuring the miniaturization.

Embodiment 12

Figure 23:
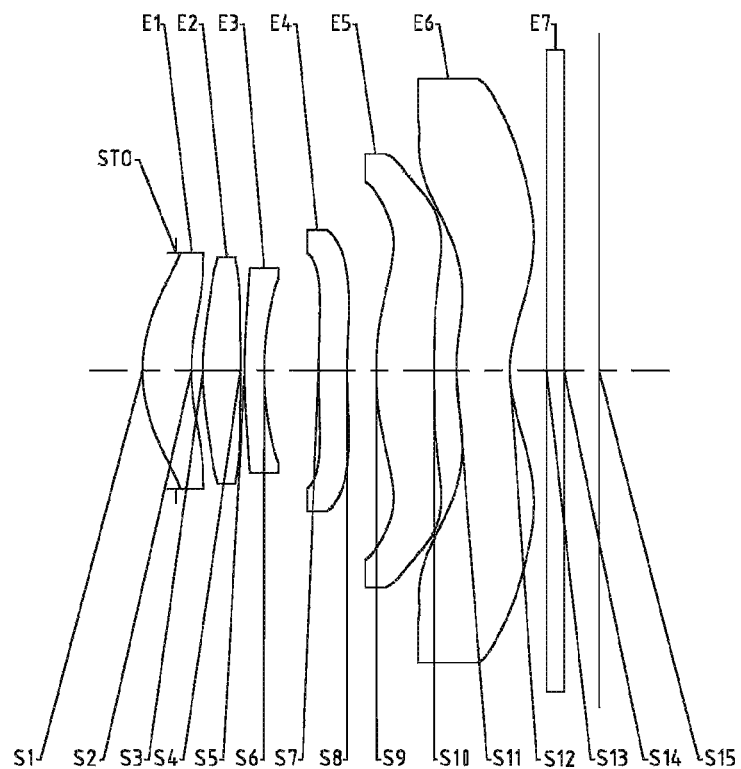
FIG. 23 is a schematic structural diagram illustrating a camera lens assembly according to Embodiment 12 of the present disclosure.

Embodiment 12 of the camera lens assembly according to the present disclosure is described below with reference to FIGS. 23-24D. FIG. 23 is a schematic structural diagram illustrating the camera lens assembly according to Embodiment 12 of the present disclosure. As shown in FIG. 23, the camera lens assembly according to Embodiment 12 includes the first to sixth lenses E1-E6 respectively having an object-side surface and an image-side surface.

Table 34 below shows the effective focal lengths f1-f6 of the lenses, the total effective focal length f of the camera lens assembly, the total track length TTL of the camera lens assembly and the half of the diagonal length ImgH of the effective pixel area on the image plane S15 of the camera lens assembly in Embodiment 12.

TABLE 34

| $f_1$(mm) | 9.44 | f(mm) | 4.53 |
|---|---|---|---|
| $f_2$(mm) | 6.72 | TTL(mm) | 5.60 |
| $f_3$(mm) | −12.02 | ImgH(mm) | 3.9 |
| $f_4$(mm) | −90.30 | | |

TABLE 34-continued

| | |
|---|---|
| $f_5$(mm) | 9.03 |
| $f_6$(mm) | -7.64 |

The total effective focal length f of the camera lens assembly is selected to be 4.53 mm. In this implementation, the diameter of the entrance pupil diameter EPD may be selected with the total effective focal length f of the camera lens assembly to satisfy: f/EPD=1.56.

Referring to Table 34, the total track length TTL from the object-side surface S1 of the first lens E1 to the image plane S15 and the half of the diagonal length ImgH of the effective pixel area on the image plane S15 satisfy: TTL/ImgH=1.56. The effective focal length $f_3$ of the third lens E3 and the total effective focal length f satisfy: $f_3$/f=-2.66. The effective focal length $f_5$ of the fifth lens E5 and the total effective focal length f satisfy: f/$f_5$=0.50. The effective focal length $f_6$ of the sixth lens and the total effective focal length f satisfy: f/$f_6$=-0.59. The effective focal length $f_1$ of the first lens E1 and the total effective focal length f satisfy: f/$f_1$=0.48. The effective focal length $f_2$ of the second lens E2 and the effective focal length $f_5$ of the fifth lens satisfy: $f_2$/$f_5$=0.74.

Table 35 shows the surface type, the radius of curvature, the center thickness, the material and the conic coefficient of each lens in this embodiment.

TABLE 35

| surface number | surface type | radius of curvature | thickness | material | conic coefficient |
|---|---|---|---|---|---|
| OBJ | spherical | infinite | infinite | | |
| STO | spherical | infinite | -0.4095 | | |
| S1 | aspheric | 1.9750 | 0.5991 | 1.55, 56.1 | -7.7963 |
| S2 | aspheric | 2.8570 | 0.1395 | | -14.8702 |
| S3 | aspheric | 3.5596 | 0.4592 | 1.55, 56.1 | -5.8144 |
| S4 | aspheric | 110.4247 | 0.0552 | | -99.0000 |
| S5 | aspheric | 8.5284 | 0.2400 | 1.67, 20.4 | 34.3613 |
| S6 | aspheric | 4.0907 | 0.6649 | | -10.0679 |
| S7 | aspheric | 9.0573 | 0.3516 | 1.67, 20.4 | -17.5108 |
| S8 | aspheric | 7.7528 | 0.3587 | | -25.7704 |
| S9 | aspheric | 4.9334 | 0.7069 | 1.55, 56.1 | 0.8126 |
| S10 | aspheric | infinite | 0.2736 | | 0.0000 |
| S11 | aspheric | 2.5725 | 0.6546 | 1.55, 56.1 | -1.9034 |
| S12 | aspheric | 1.4490 | 0.4547 | | -4.5879 |
| S13 | spherical | infinite | 0.2100 | 1.52, 64.2 | |
| S14 | spherical | infinite | 0.4321 | | |
| S15 | spherical | infinite | | | |

Table 36 shows the high-order coefficients $A_4$, $A_6$, $A_8$, $A_{10}$, $A_{12}$, $A_{14}$ and $A_{16}$ applicable to the aspheric surfaces S1-S12 of the aspheric lenses in this embodiment.

Referring to Table 35 and Table 36, the center thickness $CT_1$ of the first lens E1 and the center thickness $CT_2$ of the second lens E2 satisfy: $CT_1/CT_2$=1.30. The center thickness $CT_4$ of the fourth lens E4 and the center thickness $CT_6$ of the sixth lens E6 satisfy: $CT_4/CT_6$=0.54. The center thickness $CT_5$ of the fifth lens E5 and the center thickness $CT_6$ of the sixth lens E6 satisfy: $CT_6/CT_5$=0.93. The radius of curvature $R_1$ of the object-side surface S1 of the first lens E1 and the radius of curvature $R_2$ of the image-side surface S2 of the first lens E1 satisfy: $R_1/R_2$=0.69. The radius of curvature $R_3$ of the object-side surface S3 of the second lens E2 and the radius of curvature $R_6$ of the image-side surface S6 of the third lens E3 satisfy: $R_3/R_6$=0.87. The radius of curvature $R_{11}$ of the object-side surface S11 of the sixth lens E6 and the radius of curvature $R_{12}$ of the image-side surface S12 of the sixth lens E6 satisfy: $(R_{11}-R_{12})/(R_{11}+R_{12})$=0.28.

Figure 24A:
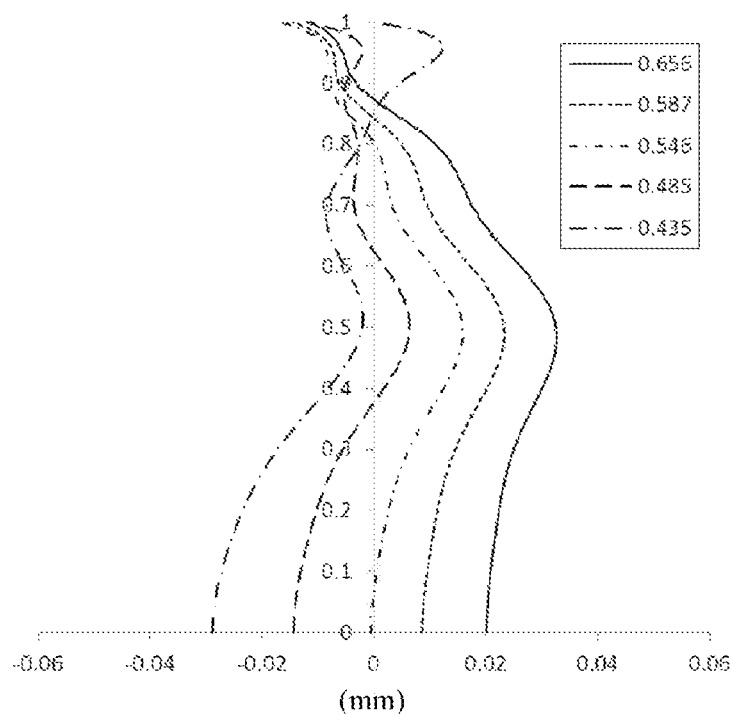
FIG. 24A illustrates a longitudinal aberration curve of the camera lens assembly according to Embodiment 12.
Figure 24B:
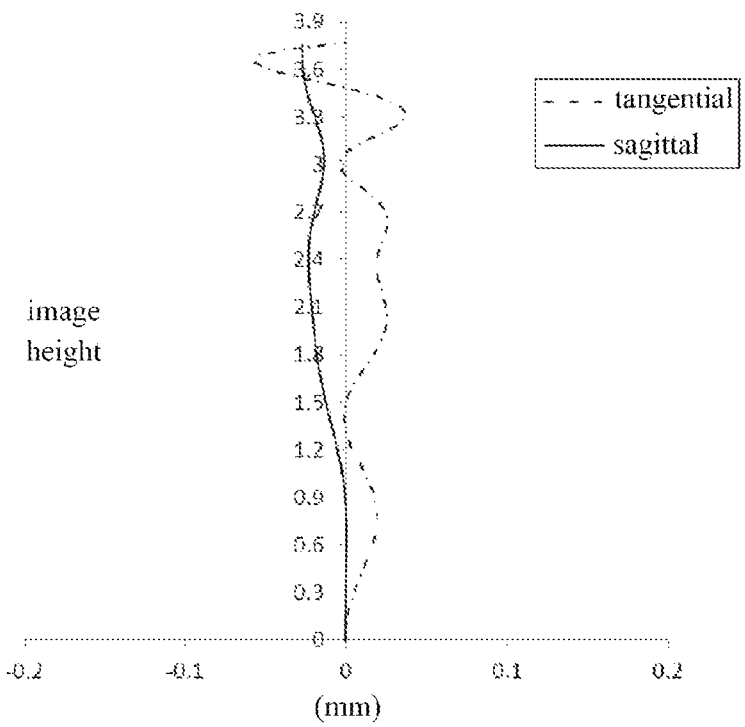
FIG. 24B illustrates an astigmatic curve of the camera lens assembly according to Embodiment 12.
Figure 24C:
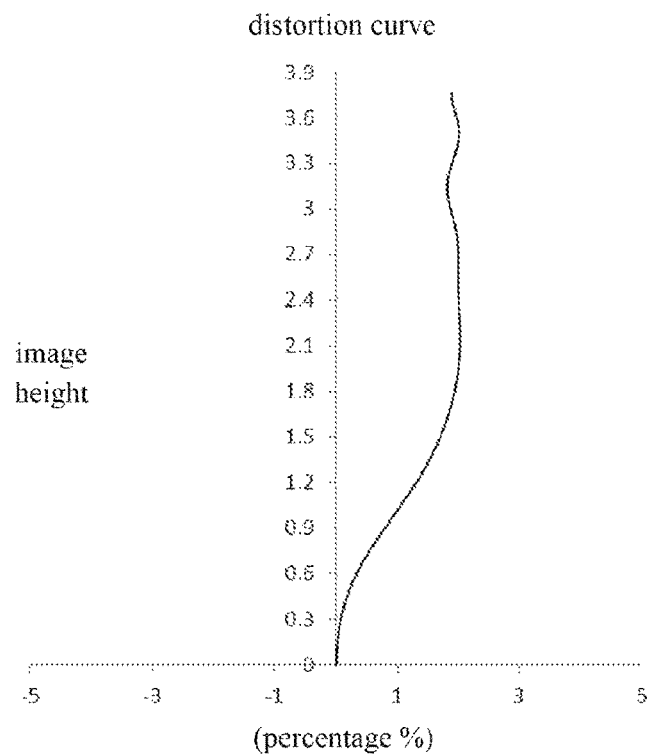
FIG. 24C illustrates a distortion curve of the camera lens assembly according to Embodiment 12.
Figure 24D:
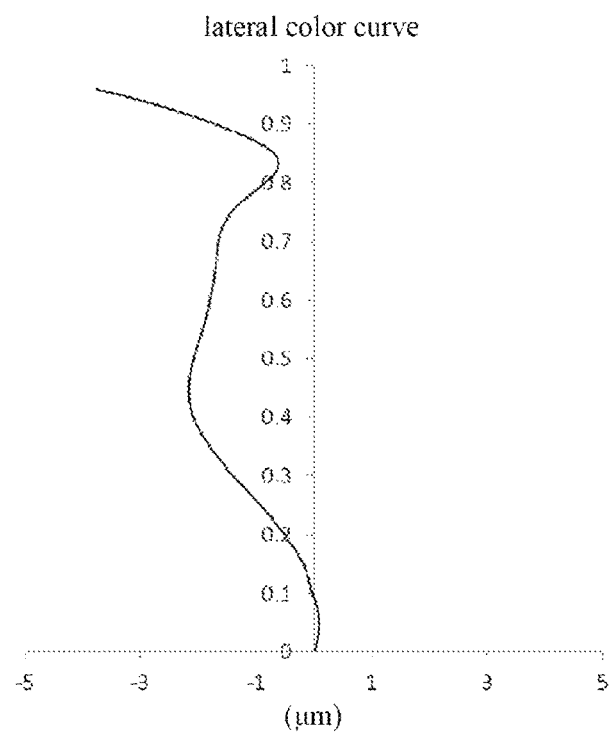
FIG. 24D illustrates a lateral color curve of the camera lens assembly according to Embodiment 12.

FIG. 24A illustrates a longitudinal aberration curve of the camera lens assembly according to Embodiment 12, representing deviations of focal points of light of different wavelengths converged after passing through an optical system. FIG. 24B illustrates an astigmatic curve of the camera lens assembly according to Embodiment 12, representing a curvature of a tangential image plane and a curvature of a sagittal image plane. FIG. 24C illustrates a distortion curve of the camera lens assembly according to Embodiment 12, representing amounts of distortion at different viewing angles. FIG. 24D illustrates a lateral color curve of the camera lens assembly according to Embodiment 12, representing deviations of different image heights on an image plane after light passes through the camera lens assembly. In summary, it can be seen from FIGS. 24A-24D that the camera lens assembly according to Embodiment 12 may obtain a good imaging effect in a situation of ensuring the miniaturization.

Embodiment 13

Figure 25:
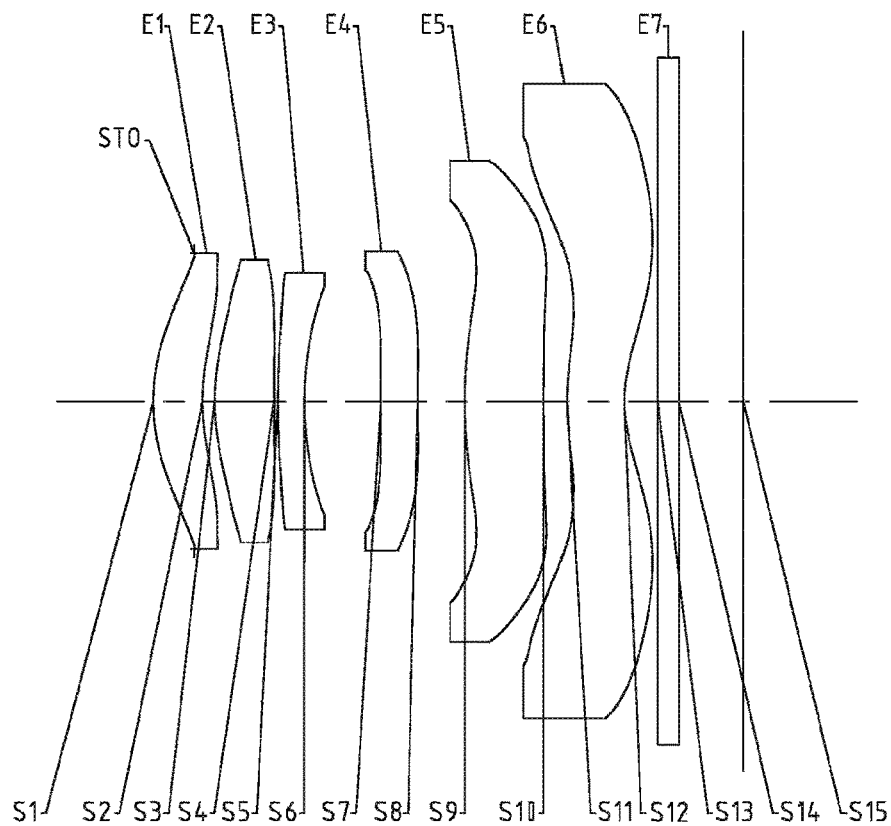
FIG. 25 is a schematic structural diagram illustrating a camera lens assembly according to Embodiment 13 of the present disclosure.

Embodiment 13 of the camera lens assembly according to the present disclosure is described below with reference to FIGS. 25-26D. FIG. 25 is a schematic structural diagram illustrating the camera lens assembly according to Embodiment 13 of the present disclosure. As shown in FIG. 25, the camera lens assembly according to Embodiment 13 includes the first to sixth lenses E1-E6 respectively having an object-side surface and an image-side surface.

Table 37 below shows the effective focal lengths f1-f6 of the lenses, the total effective focal length f of the camera lens assembly, the total track length TTL of the camera lens assembly and the half of the diagonal length ImgH of the

TABLE 36

| surface number | A4 | A6 | A8 | A10 | A12 | A14 | A16 |
|---|---|---|---|---|---|---|---|
| S1 | 1.1330E-01 | -8.4442E-02 | 5.2580E-02 | -2.3090E-02 | 3.7929E-03 | 3.8768E-06 | 0.0000E+00 |
| S2 | 3.9898E-02 | -7.3937E-02 | 2.8210E-02 | -3.1341E-03 | 0.0000E+00 | 0.0000E+00 | 0.0000E+00 |
| S3 | -1.8630E-02 | -2.1047E-02 | 1.2102E-03 | 1.6797E-02 | -6.6670E-03 | 4.7573E-04 | 0.0000E+00 |
| S4 | -3.8337E-02 | 3.0617E-02 | 8.1343E-03 | -3.1964E-02 | 1.6760E-02 | -2.7832E-03 | 0.0000E+00 |
| S5 | -4.2102E-02 | 2.9734E-02 | 3.1108E-02 | -8.7360E-02 | 5.4781E-02 | -1.0643E-02 | 0.0000E+00 |
| S6 | 9.4176E-03 | 2.1702E-02 | -3.1957E-02 | 5.0928E-02 | -6.1059E-02 | 3.7624E-02 | -7.9506E-03 |
| S7 | -3.7761E-02 | -2.8461E-02 | 4.8482E-02 | -2.5484E-02 | -3.7226E-03 | 7.0683E-03 | -1.7827E-03 |
| S8 | -1.6458E-02 | -8.5384E-02 | 1.1000E-01 | -7.1866E-02 | 2.5985E-02 | -4.9328E-03 | 3.7221E-04 |
| S9 | 6.7282E-03 | -7.5371E-02 | 3.4792E-02 | -9.9435E-03 | 1.4845E-03 | -8.2935E-05 | -6.7084E-07 |
| S10 | 5.6654E-02 | -1.4648E-02 | -7.5234E-03 | 4.9574E-03 | -1.2651E-03 | 1.5359E-04 | -7.1518E-06 |
| S11 | -1.5859E-01 | 5.3923E-02 | -1.3956E-02 | 2.6143E-03 | -2.9977E-04 | 1.8545E-05 | -4.7676E-07 |
| S12 | -6.6760E-02 | 2.1536E-02 | -5.7162E-03 | 1.0109E-03 | -1.0365E-04 | 5.5370E-06 | -1.1920E-07 | effective pixel area on the image plane S15 of the camera lens assembly in Embodiment 13.

TABLE 37

| $f_1$(mm) | 17.32 | f(mm) | 4.86 |
|---|---|---|---|
| $f_2$(mm) | 4.46 | TTL(mm) | 5.85 |
| $f_3$(mm) | −8.24 | ImgH(mm) | 3.5 |
| $f_4$(mm) | −90.38 | | |
| $f_5$(mm) | 9.44 | | |
| $f_6$(mm) | −7.29 | | |

The total effective focal length f of the camera lens assembly is selected to be 4.86 mm. In this implementation, the diameter of the entrance pupil diameter EPD may be selected with the total effective focal length f of the camera lens assembly to satisfy: f/EPD=1.67.

Referring to Table 37, the total track length TTL from the object-side surface S1 of the first lens E1 to the image plane S15 and the half of the diagonal length ImgH of the effective pixel area on the image plane S15 satisfy: TTL/ImgH=1.67. The effective focal length $f_3$ of the third lens E3 and the total effective focal length f satisfy: $f_3$/f=−1.69. The effective focal length $f_5$ of the fifth lens E5 and the total effective focal length f satisfy: f/$f_5$=0.51. The effective focal length $f_6$ of the sixth lens and the total effective focal length f satisfy: f/$f_6$=−0.67. The effective focal length $f_1$ of the first lens E1 and the total effective focal length f satisfy: f/$f_1$=0.28. The effective focal length $f_2$ of the second lens E2 and the effective focal length $f_5$ of the fifth lens satisfy: $f_2$/$f_5$=0.47.

Table 38 shows the surface type, the radius of curvature, the center thickness, the material and the conic coefficient of each lens in this embodiment.

TABLE 38

| surface number | surface type | radius of curvature | thickness | material | conic coefficient |
|---|---|---|---|---|---|
| OBJ | spherical | infinite | infinite | | |
| STO | spherical | infinite | −0.4058 | | |
| S1 | aspheric | 2.0316 | 0.4872 | 1.55, 56.1 | −10.4261 |
| S2 | aspheric | 2.3676 | 0.1214 | | −13.1399 |
| S3 | aspheric | 2.3950 | 0.5918 | 1.55, 56.1 | −5.0182 |
| S4 | aspheric | 132.1826 | 0.0342 | | 99.0000 |
| S5 | aspheric | 7.9158 | 0.2581 | 1.67, 20.4 | 30.0123 |
| S6 | aspheric | 3.2046 | 0.7604 | | −11.2462 |
| S7 | aspheric | 34.4736 | 0.3652 | 1.67, 20.4 | −99.0000 |
| S8 | aspheric | 21.8533 | 0.4675 | | −9.4065 |
| S9 | aspheric | 5.1611 | 0.7844 | 1.55, 56.1 | 1.6737 |
| S10 | aspheric | infinite | 0.2266 | | 0.0000 |
| S11 | aspheric | 2.4873 | 0.5688 | 1.55, 56.1 | −1.7568 |

TABLE 38-continued

| surface number | surface type | radius of curvature | thickness | material | conic coefficient |
|---|---|---|---|---|---|
| S12 | aspheric | 1.4073 | 0.3320 | | −4.1963 |
| S13 | spherical | infinite | 0.2100 | 1.52, 64.2 | |
| S14 | spherical | infinite | 0.6400 | | |
| S15 | spherical | infinite | | | |

Table 39 shows the high-order coefficients $A_4$, $A_6$, $A_8$, $A_{10}$, $A_{12}$, $A_{14}$ and $A_{16}$ applicable to the aspheric surfaces S1-S12 of the aspheric lenses in this embodiment.

TABLE 39

| surface number | A4 | A6 | A8 | A10 | A12 | A14 | A16 |
|---|---|---|---|---|---|---|---|
| S1 | 1.3454E−01 | −1.3783E−01 | 1.1448E−01 | −7.0079E−02 | 2.2832E−02 | −2.9379E−03 | 0.0000E+00 |
| S2 | 5.8545E−02 | −1.3713E−01 | 7.2457E−02 | −1.2578E−02 | 0.0000E+00 | 0.0000E+00 | 0.0000E+00 |
| S3 | 5.8281E−03 | −3.3577E−02 | −4.6839E−02 | 7.9174E−02 | −3.3012E−02 | 3.9627E−03 | 0.0000E+00 |
| S4 | 1.9196E−02 | −7.3152E−02 | 6.7932E−02 | −3.2749E−02 | 7.0339E−03 | −5.6865E−04 | 0.0000E+00 |
| S5 | −2.0335E−02 | −4.0708E−02 | 7.8928E−02 | −7.7342E−02 | 3.5932E−02 | −6.0305E−03 | 0.0000E+00 |
| S6 | 2.0385E−02 | −7.2363E−03 | 4.5119E−02 | −7.9655E−02 | 6.7191E−02 | −2.7136E−02 | 4.9264E−03 |
| S7 | −5.5188E−02 | −1.2608E−01 | 3.0587E−02 | −2.4440E−02 | 1.3802E−02 | 5.9061E−03 | −2.0483E−03 |
| S8 | −5.7221E−02 | −2.6753E−02 | 4.8786E−02 | −3.8113E−02 | 1.5858E−02 | −3.0860E−03 | 1.8823E−04 |
| S9 | 2.4329E−02 | −4.3138E−02 | 1.4517E−02 | −1.1782E−03 | −1.4637E−03 | 0.000553831 | −5.81488E−05 |
| S10 | 2.8774E−02 | −1.7553E−03 | −1.3946E−02 | 7.6020E−03 | −2.0708E−03 | 0.000295005 | −1.69238E−05 |
| S11 | −1.8404E−01 | 7.5705E−02 | −2.4455E−02 | 5.7729E−03 | −8.5239E−04 | 6.9831E−05 | −2.4496E−06 |
| S12 | −8.8640E−02 | 3.5723E−02 | −1.1299E−02 | 2.3836E−03 | −2.9616E−04 | 1.9412E−05 | −5.1790E−07 |

Referring to Table 38 and Table 39, the center thickness $CT_1$ of the first lens E1 and the center thickness $CT_2$ of the second lens E2 satisfy: $CT_1$/$CT_2$=0.82. The center thickness $CT_4$ of the fourth lens E4 and the center thickness $CT_6$ of the sixth lens E6 satisfy: $CT_4$/$CT_6$=0.64. The center thickness $CT_5$ of the fifth lens E5 and the center thickness $CT_6$ of the sixth lens E6 satisfy: $CT_6$/$CT_5$=0.73. The radius of curvature $R_1$ of the object-side surface S1 of the first lens E1 and the radius of curvature $R_2$ of the image-side surface S2 of the first lens E1 satisfy: $R_1$/$R_2$=0.86. The radius of curvature $R_3$ of the object-side surface S3 of the second lens E2 and the radius of curvature $R_6$ of the image-side surface S6 of the third lens E3 satisfy: $R_3$/$R_6$=0.75. The radius of curvature $R_{11}$ of the object-side surface S11 of the sixth lens E6 and the radius of curvature $R_{12}$ of the image-side surface S12 of the sixth lens E6 satisfy: $(R_{11}-R_{12})/(R_{11}+R_{12})$=0.28.

Figure 26A:
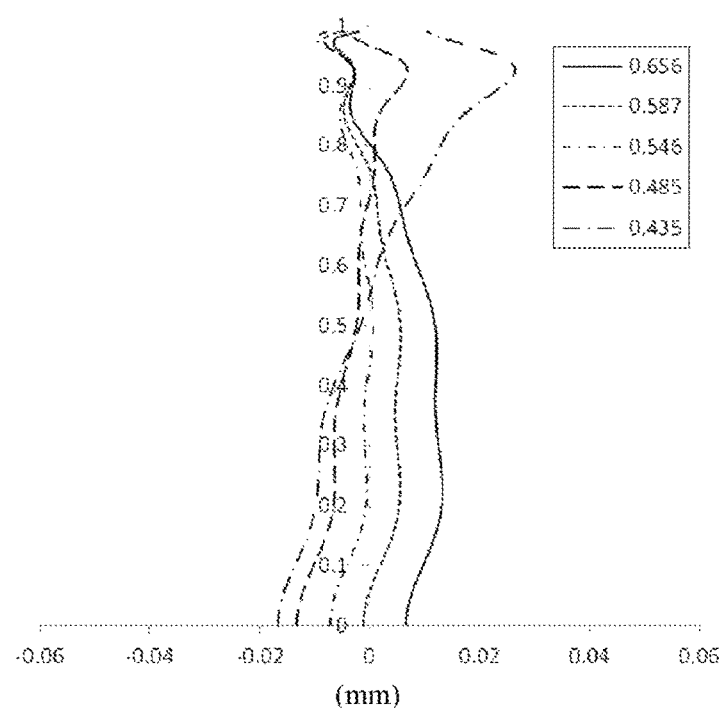
FIG. 26A illustrates a longitudinal aberration curve of the camera lens assembly according to Embodiment 13.
Figure 26B:
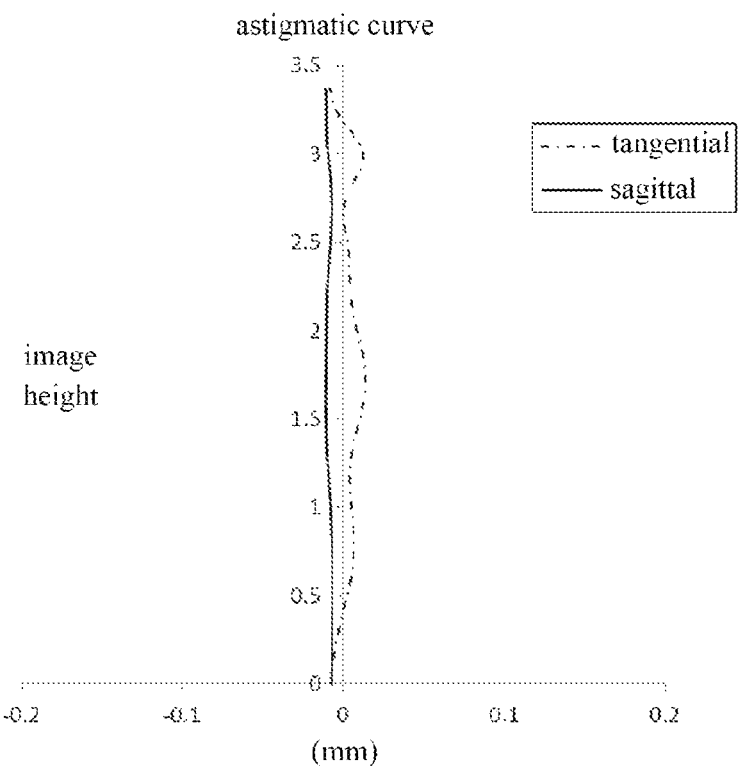
FIG. 26B illustrates an astigmatic curve of the camera lens assembly according to Embodiment 13.
Figure 26C:
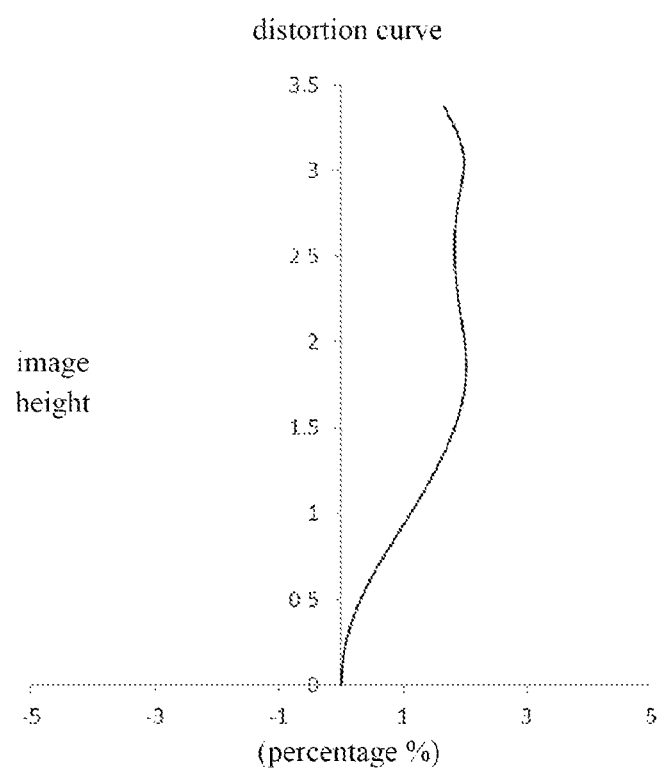
FIG. 26C illustrates a distortion curve of the camera lens assembly according to Embodiment 13.
Figure 26D:
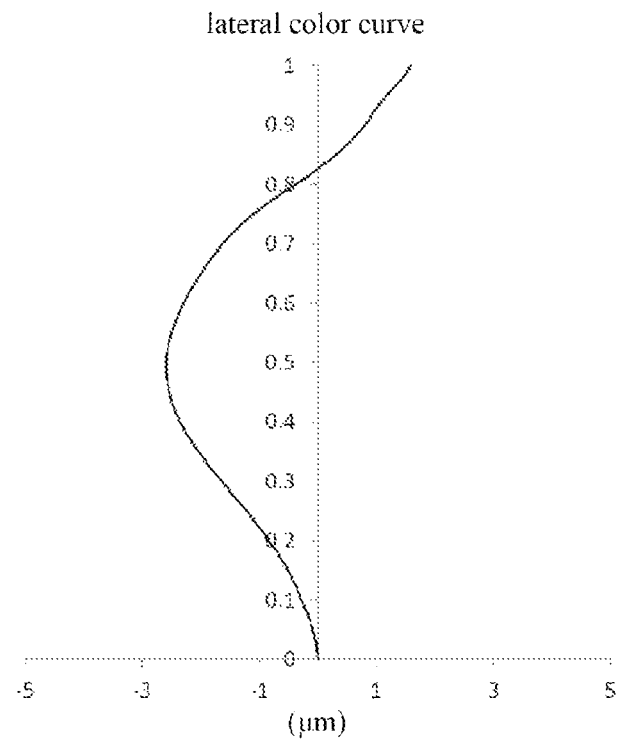
FIG. 26D illustrates a lateral color curve of the camera lens assembly according to Embodiment 13.

FIG. 26A illustrates a longitudinal aberration curve of the camera lens assembly according to Embodiment 13, representing deviations of focal points of light of different wavelengths converged after passing through an optical system. FIG. 26B illustrates an astigmatic curve of the camera lens assembly according to Embodiment 13, representing a curvature of a tangential image plane and a curvature of a sagittal image plane. FIG. 26C illustrates a distortion curve of the camera lens assembly according to Embodiment 13, representing amounts of distortion at different viewing angles. FIG. 26D illustrates a lateral color curve of the camera lens assembly according to Embodiment 13, representing deviations of different image heights on an image plane after light passes through the camera lens assembly. In summary, it can be seen from FIGS. 26A-26D that the camera lens assembly according to Embodiment 13 may obtain a good imaging effect in a situation of ensuring the miniaturization.

Embodiment 14

Figure 27:
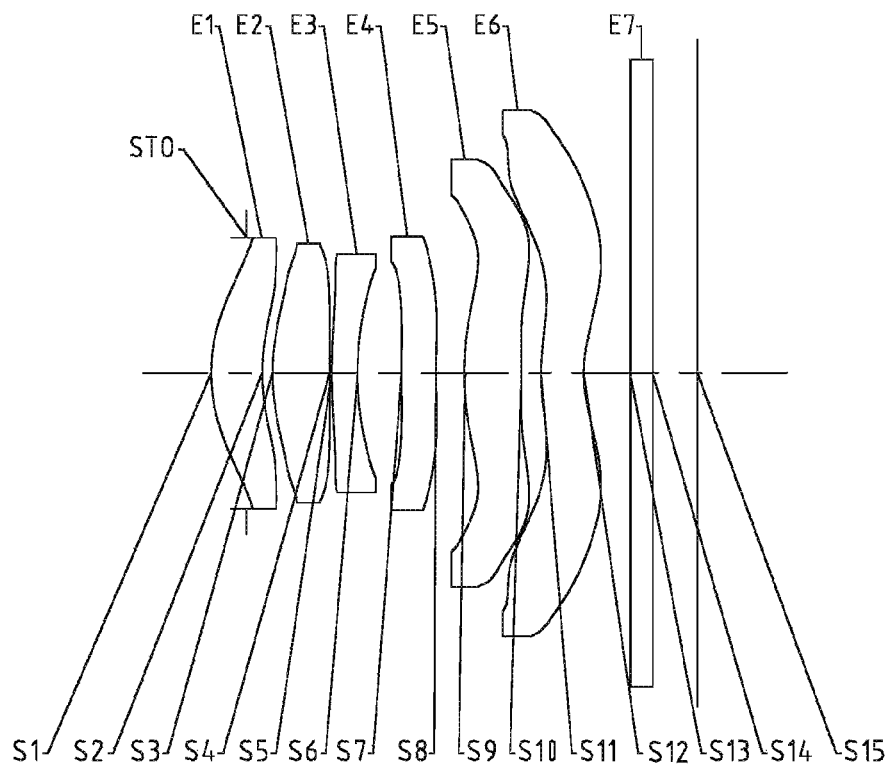
FIG. 27 is a schematic structural diagram illustrating a camera lens assembly according to Embodiment 14 of the present disclosure.

Embodiment 14 of the camera lens assembly according to the present disclosure is described below with reference to FIGS. 27-28D. FIG. 27 is a schematic structural diagram illustrating the camera lens assembly according to Embodiment 14 of the present disclosure. As shown in FIG. 27, the camera lens assembly according to Embodiment 14 includes the first to sixth lenses E1-E6 respectively having an object-side surface and an image-side surface.

Table 40 below shows the effective focal lengths f1-f6 of the lenses, the total effective focal length f of the camera lens assembly, the total track length TTL of the camera lens assembly and the half of the diagonal length ImgH of the effective pixel area on the image plane S15 of the camera lens assembly in Embodiment 14.

TABLE 40

| $f_1$(mm) | 13.01 | f(mm) | 3.71 |
|---|---|---|---|
| $f_2$(mm) | 3.73 | TTL(mm) | 4.54 |
| $f_3$(mm) | −7.53 | ImgH(mm) | 2.93 |
| $f_4$(mm) | −37.94 | | |
| $f_5$(mm) | 6.16 | | |
| $f_6$(mm) | −6.21 | | |

The total effective focal length f of the camera lens assembly is selected to be 3.71 mm. In this implementation, the diameter of the entrance pupil diameter EPD may be selected with the total effective focal length f of the camera lens assembly to satisfy: f/EPD=1.47.

Referring to Table 40, the total track length TTL from the object-side surface S1 of the first lens E1 to the image plane S15 and the half of the diagonal length ImgH of the effective pixel area on the image plane S15 satisfy: TTL/ImgH=1.47. The effective focal length $f_3$ of the third lens E3 and the total effective focal length f satisfy: $f_3$/f=−2.03. The effective focal length $f_5$ of the fifth lens E5 and the total effective focal length f satisfy: f/$f_5$=0.60. The effective focal length $f_6$ of the sixth lens and the total effective focal length f satisfy: f/$f_6$=−0.60. The effective focal length $f_1$ of the first lens E1 and the total effective focal length f satisfy: f/$f_1$=0.29. The effective focal length $f_2$ of the second lens E2 and the effective focal length $f_5$ of the fifth lens satisfy: $f_2$/$f_5$=0.61.

Table 41 shows the surface type, the radius of curvature, the center thickness, the material and the conic coefficient of each lens in this embodiment.

TABLE 41

| surface number | surface type | radius of curvature | thickness | material | conic coefficient |
|---|---|---|---|---|---|
| OBJ | spherical | infinite | infinite | | |
| STO | spherical | infinite | −0.3762 | | |
| S1 | aspheric | 1.5995 | 0.4754 | 1.55, 56.1 | −8.6458 |

TABLE 41-continued

| surface number | surface type | radius of curvature | thickness | material | conic coefficient |
|---|---|---|---|---|---|
| S2 | aspheric | 1.8471 | 0.0957 | | −12.2455 |
| S3 | aspheric | 2.0097 | 0.5339 | 1.55, 56.1 | −5.0249 |
| S4 | aspheric | 120.0358 | 0.0200 | | 99.0000 |
| S5 | aspheric | 6.6971 | 0.2400 | 1.67, 20.4 | 30.1374 |
| S6 | aspheric | 2.8309 | 0.4106 | | −12.5357 |
| S7 | aspheric | 15.9885 | 0.3200 | 1.67, 20.4 | 61.9693 |
| S8 | aspheric | 9.7269 | 0.2656 | | 3.0752 |
| S9 | aspheric | 3.3644 | 0.5296 | 1.55, 56.1 | 0.4904 |
| S10 | aspheric | infinite | 0.1873 | | 0.0000 |
| S11 | aspheric | 2.0850 | 0.3953 | 1.55, 56.1 | −1.6484 |
| S12 | aspheric | 1.2047 | 0.4347 | | −5.1724 |
| S13 | spherical | infinite | 0.2100 | 1.52, 64.2 | |
| S14 | spherical | infinite | 0.4179 | | |
| S15 | spherical | infinite | | | |

Table 42 shows the high-order coefficients $A_4$, $A_6$, $A_8$, $A_{10}$, $A_{12}$, $A_{14}$ and $A_{16}$ applicable to the aspheric surfaces S1-S12 of the aspheric lenses in this embodiment.

TABLE 42

| surface number | A4 | A6 | A8 | A10 | A12 | A14 | A16 |
|---|---|---|---|---|---|---|---|
| S1 | 2.3594E−01 | −3.5195E−01 | 4.4309E−01 | −3.9822E−01 | 1.8447E−01 | −3.3254E−02 | 0.0000E+00 |
| S2 | 1.4199E−01 | −4.4552E−01 | 3.4353E−01 | −8.6724E−02 | 0.0000E+00 | 0.0000E+00 | 0.0000E+00 |
| S3 | 2.4006E−02 | −1.4095E−01 | −1.1742E−01 | 3.9177E−01 | −2.2487E−01 | 3.1272E−02 | 0.0000E+00 |
| S4 | 3.3250E−02 | −1.9217E−01 | 2.9031E−01 | −2.5853E−01 | 1.1653E−01 | −2.1886E−02 | 0.0000E+00 |
| S5 | −2.9075E−02 | −1.2446E−01 | 3.6326E−01 | −6.0039E−01 | 4.3704E−01 | −1.0853E−01 | 0.0000E+00 |
| S6 | 4.6395E−02 | −1.5860E−01 | 8.3067E−01 | −2.0556E+00 | 2.6196E+00 | −1.7110E+00 | 4.7285E−01 |
| S7 | −1.3586E−01 | 1.7261E−01 | −6.0869E−01 | 1.6527E+00 | −2.4819E+00 | 1.8540E+00 | −5.5532E−01 |
| S8 | −1.0187E−01 | −1.6981E−01 | 4.5318E−01 | −5.0570E−01 | 3.1341E−01 | −1.0080E−01 | 0.012493141 |
| S9 | 1.2649E−01 | −3.0527E−01 | 2.4669E−01 | −1.2665E−01 | 3.2282E−02 | −1.3730E−03 | −5.1925E−04 |
| S10 | 1.8935E−01 | −1.6516E−01 | 3.9245E−02 | 1.1613E−02 | −1.1888E−02 | 3.4187E−03 | −3.3805E−04 |
| S11 | −3.5802E−01 | 2.1548E−01 | −1.0022E−01 | 3.3411E−02 | −6.7068E−03 | 7.2429E−04 | −3.3145E−05 |
| S12 | −2.0157E−01 | 1.4351E−01 | −8.8171E−02 | 3.5217E−02 | −8.0178E−03 | 9.4348E−04 | −4.4524E−05 |

Referring to Table 41 and Table 42, the center thickness $CT_1$ of the first lens E1 and the center thickness $CT_2$ of the second lens E2 satisfy: $CT_1/CT_2$=0.89. The center thickness $CT_4$ of the fourth lens E4 and the center thickness $CT_6$ of the sixth lens E6 satisfy: $CT_4/CT_6$=0.81. The center thickness $CT_5$ of the fifth lens E5 and the center thickness $CT_6$ of the sixth lens E6 satisfy: $CT_6/CT_5$=0.75. The radius of curvature $R_1$ of the object-side surface S1 of the first lens E1 and the radius of curvature $R_2$ of the image-side surface S2 of the first lens E1 satisfy: $R_1/R_2$=0.87. The radius of curvature $R_3$ of the object-side surface S3 of the second lens E2 and the radius of curvature $R_6$ of the image-side surface S6 of the third lens E3 satisfy: $R_3/R_6$=0.71. The radius of curvature $R_{11}$ of the object-side surface S11 of the sixth lens E6 and the radius of curvature $R_{12}$ of the image-side surface S12 of the sixth lens E6 satisfy: $(R_{11}-R_{12})/(R_{11}+R_{12})$=0.27.

Figure 28A:
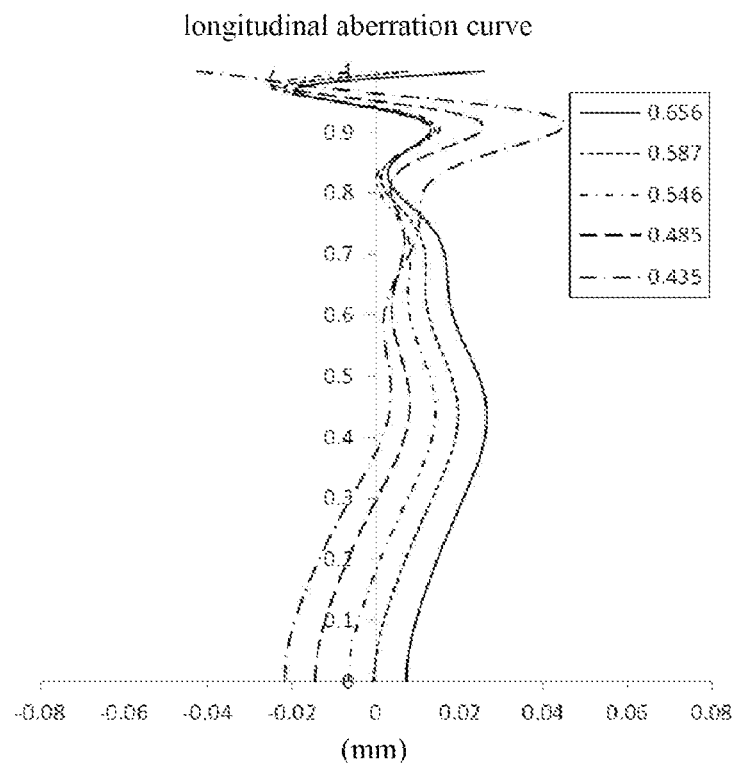
FIG. 28A illustrates a longitudinal aberration curve of the camera lens assembly according to Embodiment 14.
Figure 28B:
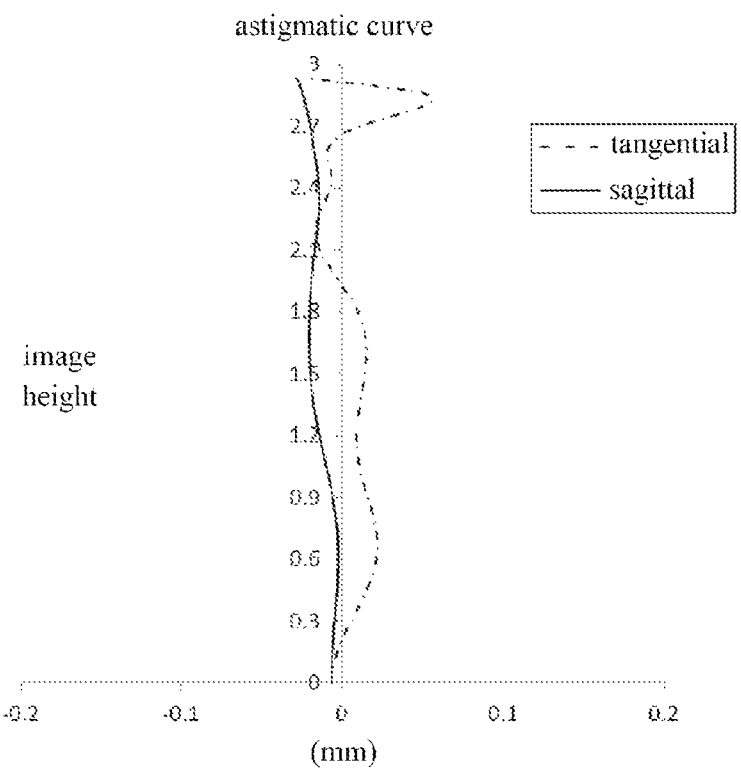
FIG. 28B illustrates an astigmatic curve of the camera lens assembly according to Embodiment 14.
Figure 28C:
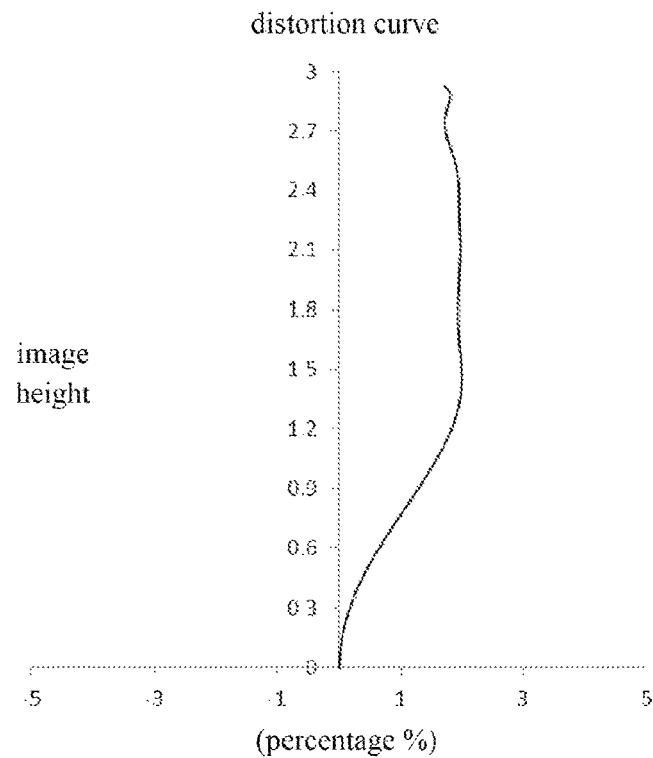
FIG. 28C illustrates a distortion curve of the camera lens assembly according to Embodiment 14.
Figure 28D:
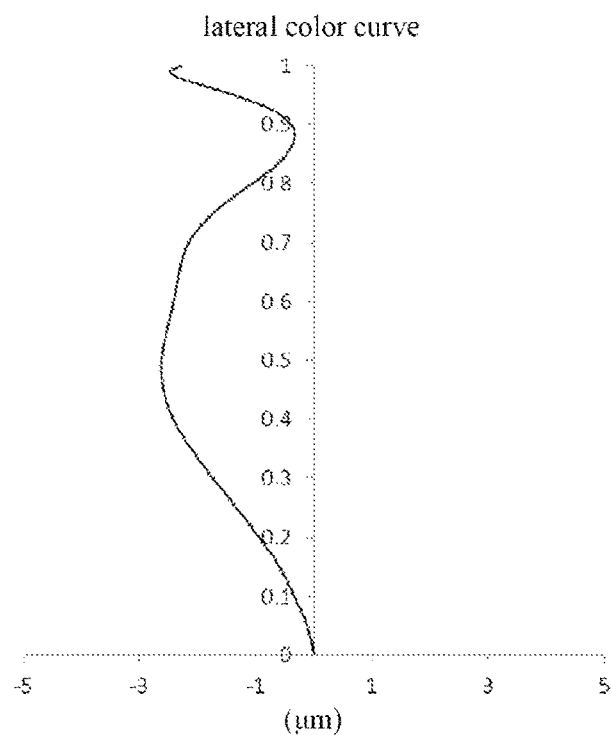
FIG. 28D illustrates a lateral color curve of the camera lens assembly according to Embodiment 14.

FIG. 28A illustrates a longitudinal aberration curve of the camera lens assembly according to Embodiment 14, representing deviations of focal points of light of different wavelengths converged after passing through an optical system. FIG. 28B illustrates an astigmatic curve of the camera lens assembly according to Embodiment 14, representing a curvature of a tangential image plane and a curvature of a sagittal image plane. FIG. 28C illustrates a distortion curve of the camera lens assembly according to Embodiment 14, representing amounts of distortion at different viewing angles. FIG. 28D illustrates a lateral color curve of the camera lens assembly according to Embodiment 14, representing deviations of different image heights on an image plane after light passes through the camera lens assembly. In summary, it can be seen from FIGS. 28A-28D that the camera lens assembly according to Embodiment 14 may obtain a good imaging effect in a situation of ensuring the miniaturization.

The present disclosure further provides a camera device, having a photosensitive element which may be a photosensitive charge-coupled device (CCD) or a complementary metal-oxide semiconductor (CMOS) element. The camera device may be an independent camera device such as a digital camera, or may be a camera module integrated in a mobile electronic device such as a mobile phone. The camera device is equipped with the camera lens assembly as described in each embodiment.

The exemplary embodiments of the present disclosure are described above with reference to the accompanying drawings. It should be appreciated by those skilled in the art that the above embodiments are merely examples taken for the purpose of description, rather than a limitation to the scope of the present disclosure. Any modification and equivalent substitution, etc. made within the teachings of the present disclosure and the scope of protection of the claims shall be included in the scope of protection claimed by the present disclosure.

What is claimed is:

1. A camera lens assembly, comprising a first lens, a second lens, a third lens, a fourth lens, a fifth lens and a sixth lens arranged in sequence from an object side to an image side along an optical axis,
    wherein the first lens, the second lens and the fifth lens have positive refractive powers, and the third lens and the sixth lens have negative refractive powers;
    the fourth lens has a positive refractive power or a negative refractive power;
    a total effective focal length f of the camera lens assembly and an entrance pupil diameter EPD of the camera lens assembly satisfy: $f/EPD \leq 1.7$;
    a radius of curvature $R_3$ of an object-side surface of the second lens and a radius of curvature $R_6$ of an image-side surface of the third lens satisfy: $0.5 < R_3/R_6 < 1.5$; and
    a center thickness $CT_1$ of the first lens and a center thickness $CT_2$ of the second lens satisfy: $0.82 < CT_1/CT_2 < 1.5$.

2. The camera lens assembly according to claim 1, wherein an object-side surface of the first lens is a convex surface, and an object-side surface of the fifth lens is an aspheric surface and has at least one inflection point.

3. The camera lens assembly according to claim 1, wherein the total effective focal length f of the camera lens assembly and the entrance pupil diameter EPD of the camera lens assembly satisfy: $f/EPD \leq 1.56$.

4. The camera lens assembly according to claim 1, wherein an object-side surface and an image-side surface of the sixth lens are aspheric surfaces, and at least one of the object-side surface and the image-side surface has at least one inflection point.

5. The camera lens assembly according to claim 1, wherein a total track length TTL from the object-side surface of the first lens to an image plane and half of a diagonal length ImgH of an effective pixel area on the image plane satisfy: $TTL/ImgH \leq 1.7$.

6. The camera lens assembly according to claim 1, wherein an effective focal length $f_3$ of the third lens and the total effective focal length f satisfy: $-3.0 < f_3/f \leq -1.5$.

7. The camera lens assembly according to claim 1, wherein an effective focal length $f_6$ of the sixth lens and the total effective focal length f satisfy: $-1.5 < f/f_6 < -0.4$.

8. The camera lens assembly according to claim 1, wherein an effective focal length $f_1$ of the first lens and the total effective focal length f satisfy: $f/f_1 \leq 0.7$.

9. The camera lens assembly according to claim 1, wherein a center thickness $CT_4$ of the fourth lens and a center thickness $CT_6$ of the sixth lens satisfy:

$$0.5 < CT_4/CT_6 < 1.5.$$

10. The camera lens assembly according to claim 9, wherein a center thickness $CT_5$ of the fifth lens and the center thickness $CT_6$ of the sixth lens satisfy: $CT_6/CT_5 \leq 1$.

11. The camera lens assembly according to claim 1, wherein a radius of curvature $R_1$ of the object-side surface of the first lens and a radius of curvature $R_2$ of an image-side surface of the first lens satisfy: $R_1/R_2 \leq 1$.

12. The camera lens assembly according to claim 1, wherein a radius of curvature $R_3$ of an object-side surface of the second lens and a radius of curvature $R_6$ of an image-side surface of the third lens satisfy: $0.67 < R_3/R_6 \leq 1.11$.

13. The camera lens assembly according to claim 1, wherein a radius of curvature $R_{11}$ of the object-side surface of the sixth lens and a radius of curvature $R_{12}$ of the image-side surface of the sixth lens satisfy: $(R_{11}-R_{12})/(R_{11}+R_{12}) < 1$.

14. A camera lens assembly, comprising a first lens, a second lens, a third lens, a fourth lens, a fifth lens and at least one subsequent lens arranged in sequence from an object side to an image side along an optical axis,
    wherein the first lens, the second lens and the fifth lens have positive refractive powers, and the third lens and the sixth lens have negative refractive powers;
    the fourth lens has a positive refractive power or a negative refractive power;
    a radius of curvature $R_3$ of an object-side surface of the second lens and a radius of curvature $R_6$ of an image-side surface of the third lens satisfy: $0.5 < R_3/R_6 < 1.5$; and
    an effective focal length f5 of the fifth lens and a total effective focal length f of the camera lens assembly satisfy: $0 < f/f_5 < 1.2$;
    a total effective focal length f of the camera lens assembly and an entrance pupil diameter EPD of the camera lens assembly satisfy: $f/EPD \leq 1.7$; and
    a center thickness $CT_1$ of the first lens and a center thickness $CT_2$ of the second lens satisfy: $0.82 < CT_1/CT_2 < 1.5$.

15. A camera lens assembly, comprising a first lens, a second lens, a third lens, a fourth lens, a fifth lens and at least one subsequent lens arranged in sequence from an object side to an image side along an optical axis,
    wherein the first lens, the second lens and the fifth lens have positive refractive powers, and the third lens and the sixth lens have negative refractive powers;
    the fourth lens has a positive refractive power or a negative refractive power;
    a radius of curvature $R_3$ of an object-side surface of the second lens and a radius of curvature R6 of an image-side surface of the third lens satisfy: $0.5 < R_3/R_6 < 1.5$;
    an effective focal length $f_2$ of the second lens and an effective focal length $f_5$ of the fifth lens satisfy: $0 < f_2/f_5 < 1.5$;

a total effective focal length f of the camera lens assembly and an entrance pupil diameter EPD of the camera lens assembly satisfy: f/EPD≤1.7; and a center thickness $CT_1$ of the first lens and a center thickness $CT_2$ of the second lens satisfy: $0.82 < CT_1/CT_2 < 1.5$.

16. A camera device, comprising the camera lens assembly according to claim 1.

* * * * *